Sept. 12, 1961      P. W. MORGAN      2,999,788
SYNTHETIC POLYMER FIBRID PAPER
Filed Jan. 22, 1959      4 Sheets—Sheet 1
FIG. I
FIG. II
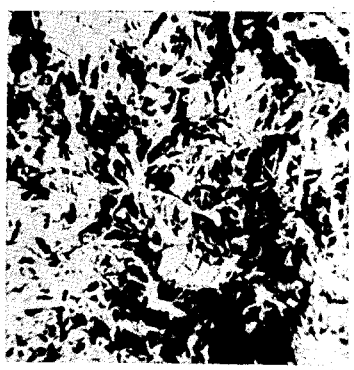
FIG. III
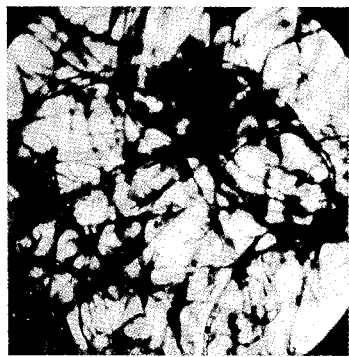
FIG. IV
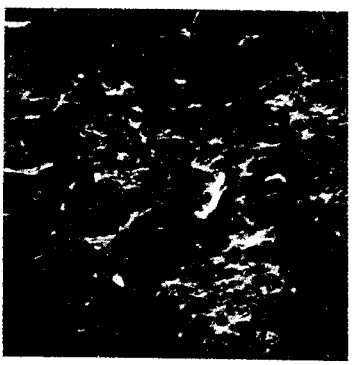
FIG. V
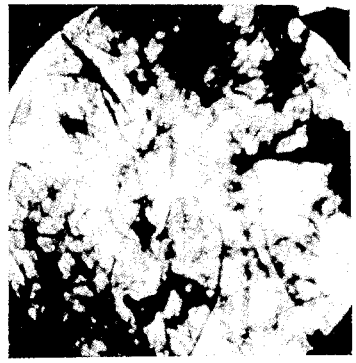
FIG. VI
INVENTOR
PAUL WINTHROP MORGAN
BY *Carl A. Hechmer*
ATTORNEY FIG. VII
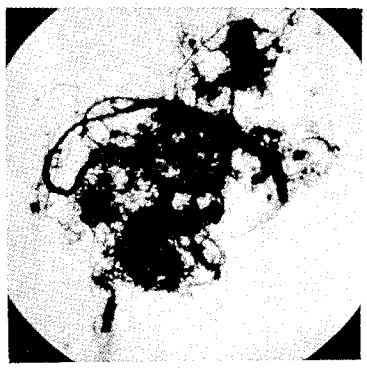
FIG. VIII
FIG. IX
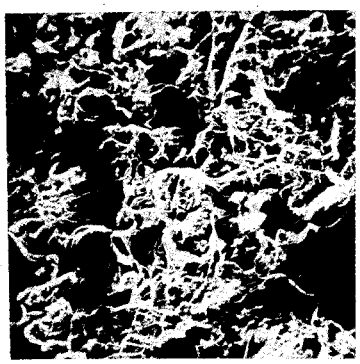
FIG. X
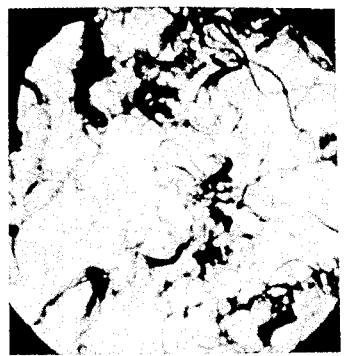
FIG. XI
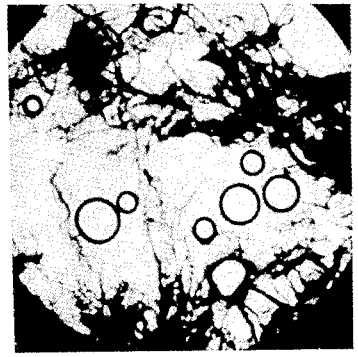
FIG. XII
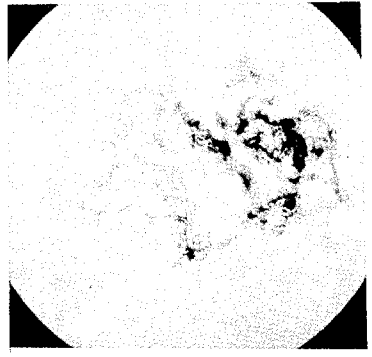
INVENTOR
PAUL WINTHROP MORGAN
BY Carl A. Hechmer
ATTORNEY Sept. 12, 1961 P. W. MORGAN 2,999,788
SYNTHETIC POLYMER FIBRID PAPER
Filed Jan. 22, 1959 4 Sheets-Sheet 3
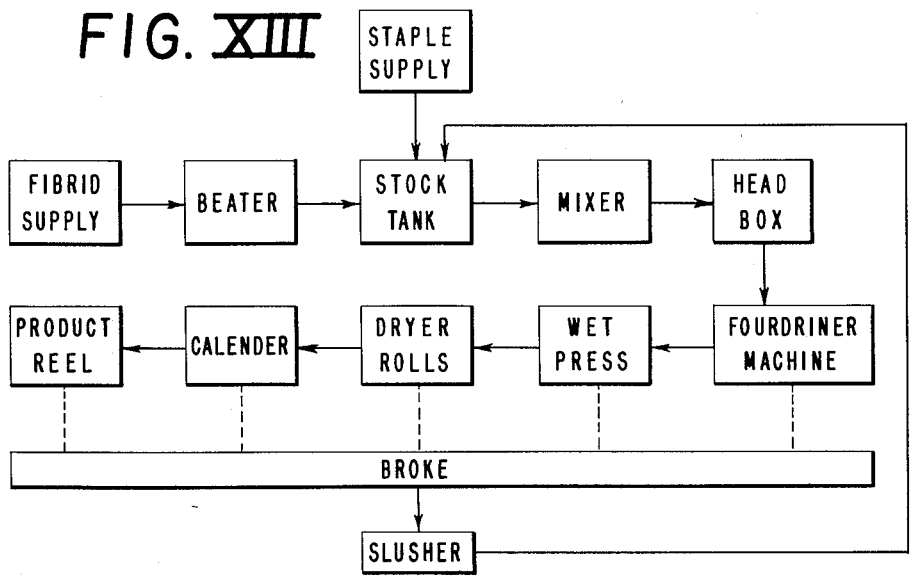
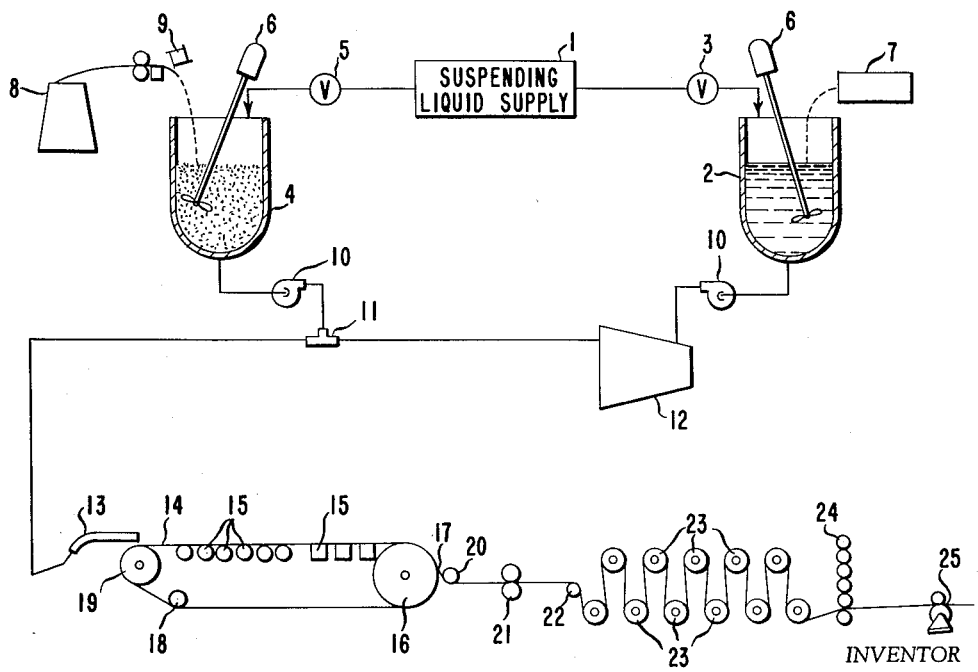
INVENTOR
PAUL WINTHROP MORGAN
BY Carl A. Hechmer
ATTORNEY Sept. 12, 1961  P. W. MORGAN  2,999,788
SYNTHETIC POLYMER FIBRID PAPER
Filed Jan. 22, 1959  4 Sheets-Sheet 4
FIG. XV
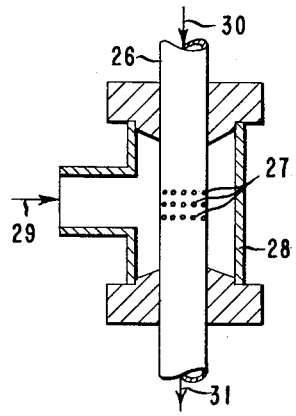
FIG. Ia
INVENTOR
PAUL WINTHROP MORGAN
BY Carl A. Hechmer
ATTORNEY United States Patent Office 2,999,788
Patented Sept. 12, 1961

2,999,788
SYNTHETIC POLYMER FIBRID PAPER
Paul Winthrop Morgan, West Chester, Pa., assignor to
E. I. du Pont de Nemours and Company, Wilmington,
Del., a corporation of Delaware
Filed Jan. 22, 1959, Ser. No. 788,371
92 Claims. (Cl. 162—146)

This invention relates to a composition of matter and to a process for its production. More specifically it relates to a novel and useful non-rigid, wholly synthetic polymeric particle as described more in detail hereinafter which is particularly useful in the production of sheet-like structures.

OBJECTS

It is an object of the present invention to provide a novel, non-rigid, wholly synthetic polymeric particle of matter capable of forming sheet-like structures on a paper-making machine.

Another object is to provide a non-rigid particle of a synthetic polymer useful in the production of non-woven structures.

A further object is to provide a novel sheet-like structure employing as the binding element the non-rigid, wholly heterogeneous synthetic polymeric particle as described in detail hereinafter.

These and other objects will become apparent in the course of the following specification and claims.

STATEMENT OF INVENTION

In accordance with the present invention there is provided a novel and useful non-rigid, wholly synthetic polymeric particle, hereinafter referred to as a "fibrid," which particle is capable of forming paper-like structures on a paper-making machine. To be designated a "fibrid," a particle must possess (a) an ability to form a waterleaf having a couched wet tenacity of at least about 0.002 gram per denier, i.e., about 0.34 lb./in./oz./sq. yd. when a plurality of the said particles is deposited from a liquid suspension upon a screen, which waterleaf, when dried at a temperature below about 50° C., has a dry tenacity at least equal to its couched wet tenacity and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a couched wet tenacity of at least about 0.002 gram per denier, i.e. about 0.34 lb./in./oz./sq. yd. In addition, fibrid particles have a Canadian freeness number between 90 and 790 and a high absorptive capacity for water, retaining at least 2.0 grams of water per gram of particle under a compression load of about 39 grams per square centimeter. By "wholly synthetic polymeric" is meant that the fibrid is formed of a polymeric material synthesized by man as distinguished from a polymeric product of nature or derivative thereof.

FIBRID PROPERTIES

Any normally solid wholly synthetic polymeric material may be employed in the production of fibrids. By "normally solid" is meant that the material is non-fluid under normal room conditions. By ". . . an ability to . . . bond a substantial weight of . . . (staple) fibers . . ." is meant that at least 50% by weight of staple based on total staple and fibrids can be bonded from a concomitantly deposited mixture of staple and fibrids.

It is believed that the fibrid characteristics recited above are a result of the combination of the morphology and non-rigid properties of the particle. The morphology is such that the particle is non-granular and has at least one dimension of minor magnitude relative to its largest dimension, i.e., the fibrid particle is fiber-like or film-like. Usually, in any mass of fibrids, the individual fibrid particles are not identical in shape and may include both fiber-like and film-like structures. The non-rigid characteristic of the fibrid, which renders it extremely "supple" in liquid suspension and which permits the physical entwinement described above, is presumably due to the presence of the "minor" dimension. Expressing this dimension in terms of denier, as determined in accordance with the fiber coarseness test described in Tappi 41, 175A–7A, No. 6 (June) 1958, fibrids have a denier no greater than about 15.

Complete dimensions and ranges of dimensions of such heterogeneous and odd-shaped structures are difficult to express. Even screening classifications are not always completely satisfactory to define limitations upon size since at times the individual particles become entangled with one another or wrap around the wire meshes of the screen and thereby fail to pass through the screen. Such behavior is encountered particularly in the case of fibrids made from soft (i.e., initial modulus below 0.9 g.p.d.) polymers. As a general rule, however, fibrid particles, when classified according to the Clark Classification Test (Tappi 33, 294–8, No. 6 (June) 1950) are retained to the extent of not over 10% on a 10-mesh screen, and retained to the extent of at least 90% on a 200-mesh screen.

Fibrid particles are usually frazzled, have a high specific surface area, and as indicated, a high absorptive capacity for water.

Preferred fibrids are those the waterleaves of which when dried for a period of twelve hours at a temperature below the stick temperature of the polymer from which they are made (i.e., the minimum temperature at which a sample of the polymer leaves a wet molten trail as it is stroked with a moderate pressure across the smooth surface of a heated block) have a tenacity of at least about 0.005 gram per denier, i.e. about 0.85 lb./in./oz./sq. yd.

FIBRID PRODUCTION

Two convenient methods for producing fibrids employed for illustrative purposes in the present invention are:

(A) *Beating a liquid suspension of the shaped structure produced by an interfacial forming process.*—In the interfacial forming process an interphase polymerization is conducted between fast-reacting organic condensation polymer-forming intermediates at an interface of controlled shape between two liquid phases, each of which contains an intermediate, to form a shaped condensation polymer. The process is described in United States Patent 2,708,617. The product may be withdrawn continuously from the interface in the form of a collapsed tube, the walls of which are no greater than about 0.020 inch in thickness, described and claimed in United States Patent 2,798,283, filed December 9, 1953. The tearing or shredding operation may be accomplished by leading the tubular filament, while still wet, into a liquid such as water, which is being violently agitated. A Waring Blendor is well adapted to perform this operation. In another modification of this technique, the thin film formed at the interface is shredded to the fibrid form substantially as rapidly as it forms. This process, described and claimed in copending United States application Serial Number 380, filed January 4, 1960, is useful in preparing fibrids from any condensation polymer, either linear or cross-linked, which can be formed by interfacial forming.

(B) *Adding a solution of a wholly synthetic polymer to a precipitant for the polymer under conditions such that the system has a precipitation number of at least about 100.*—The concept "precipitation number" is defined hereinafter. The technique is referred to hereinafter as "shear precipitation," which may relate to a "slow" or a "fast" system. In "slow" precipitations, if a precipitate forms initially it is subsequently shredded in a liquid medium. "Fast" precipitations occur when the $t$ value for the system (as defined hereinafter) is below about $80 \times 10^{-6}$ seconds while a "slow" precipitation occurs above this value. In the case of "fast" precipitations, the precipitation variables are controlled to maintain the precipitation number (the "$P'_A$" value) of the system between about 100 and about 1,300,000. The $P'_A$ values for the preferred fast precipitation systems are between 400 and 1,000,000. The range of $P'_A$ values between 100 and 80,000 is particularly useful for soft polymer fibrids, i.e. those fibrids formed from polymers having an initial modulus below about 0.9 gram per denier. The term "hard" polymer is applied to those wholly synthetic polymers which have an initial modulus of about 0.9 gram per denier and above.

DEFINITION OF "PRECIPITATION NUMBER"

Precipitation number ($P'_A$ value) is defined by the expression $$P'_A = R_s t$$

in which $R_s$ is the absolute rate of shear in seconds$^{-1}$ and $t$ is the time in microseconds required for the precipitate to form. Thus, $P'_A$ is a dimensionless number which defines the precipitation conditions in the system. As as example of the physical significance of these values, a $P'_A$ number of 2,000,000 corresponds to rapid stirring of a viscous precipitant to which a low viscosity polymer solution is added. The high shear encountered by the polymer as it precipitates under these conditions causes the formation of a dispersion of fine particles, e.g., they are not retained by a 200-mesh screen. At the other extreme, $P'_A$ values as low as 2 correspond to conditions where a very low viscosity precipitant is used for a viscous polymer solution. Thus, even at high rates of shear, not enough force is applied to disperse the polymer solution before a skin forms, resulting in the formation of lumps.

DETERMINATION OF PRECIPITATION NUMBERS

Fibrids are prepared by precipitating polymers from solution in the shear zone, so that the precipitating polymer particles are subjected to relatively large shearing forces while they are in a plastic, deformable state. The variable which appears to play the major role in controlling the nature of the products is the rate of shear, $R$, of the polymer solution as it is converted to an elongated article. This is dependent upon the shearing stress, $S$. The nature of the product is also dependent upon the length of time, $t$, that the solution is in a deformable state (i.e., prior to complete precipitation).

The rate of shear and the shearing stress are related by Newton's viscosity equation $$S = VR \text{ (where V is viscosity)} \quad (1)$$

Using the subscript $s$ for the solution and the subscript $p$ for the precipitant, the following equations are obtained from Equation 1.

$$S_s = V_s R_s \quad (2)$$
$$S_p = V_p R_p \quad (3)$$

At the interface between precipitant and solution droplet $$S_p = S_s \quad (4)$$

Accordingly, Equations 2 and 3 may be equated. On suitable rearrangment one obtains $$R_s = \frac{V_p}{V_s} R_p \quad (5)$$

$R_s$ is referred to as the mechanical factor of shear precipitation and describes the mechanical variables which determine the form of a polymeric precipitate obtained by adding a polymer solution to a stirred precipitant. However, the type of fibrous products formed will also depend on $t$, the time interval during which the precipitate is deformable. The product, $R_s t$, has been designated $P'_A$ (the precipitation number), which is determined by the relationship $$P'_A = \frac{V_p}{V_s} R_p t \quad (6)$$

The following section described the method whereby absolute shear precipitation numbers may be calculated. In this way it is possible to predict quite simply from a few simple measurements whether or not a system will produce fibrids.

By the utilization of known relationships, the following two equations for rate of shear can be developed.

$$R_s \text{ (laminar)} = P_A = 0.005 a^{3/2} b^{-1/2} d_p^{1/2} \frac{V_p^{1/2}}{V_s} (Q)^{3/2} \quad (7)$$

$$R_s \text{ (turbulent)} = P_A = 0.13 a^{6/5} b^{-4/5} d_p^{1/5} \frac{V_p^{4/5}}{V_s} (Q)^{6/5} \quad (8)$$

In these formulas $a$ = length of stirrer blade from axis to tip in centimeters
$b$ = average width of stirrer blade in centimeter
$d_p$ = density of the precipitant in gram/cm.$^3$
$Q$ = r.p.m. of stirrer.

The decision as to the proper equation to use (i.e., whether to use the one for laminar flow or the one for turbulent flow) can be made by calculating the Reynolds' number, $R_e$, for the system. For this work the critical value has been set at 3350, since this is the value at which the calculated $R_s$ is the same regardless of which formula is used. Below this value Equation 7 is used and above it Equation 8 is used.

The values obtained by using these equations express the mechanical factor of the shear precipitation process for preparing fibrids in terms of absolute shear rates inside a solution droplet. The results are expressed in units of second$^{-1}$ and are thus independent of the type of mixing device used. These values replace the P (precipitation number) values reported in the parent application.

The relative P values recorded in the parent application may be converted to absolute values, $P_A$, by the use of the following equations.

$$\text{(Laminar)} \quad P_A = 0.0218 \frac{a}{b} R_e^{1/2} P \quad (9)$$

$$\text{(Turbulent)} \quad P_A = 0.246 \frac{a}{b} R_e^{1/5} P \quad (10)$$

in which
$a$ = length of stirrer blade
$b$ = width of stirrer blade
$R_e$ = Reynolds' number
$= u b d_p / V_p = a b d_p (Q) / 60 V_p \quad (11)$ where
$u$ = velocity of stirrer (cm./sec.)
$d_p$ = density of precipitant
$V_p$ = viscosity of precipitant
$Q$ = r.p.m. of stirrer.

The definition of the mechanical factor in the shear precipitation process renders this factor independent of the piece of apparatus being used. A complete description of the conditions required to produce fibrids is achieved by introducing the time factor, which can be considered as representing the chemical factors in the process introduced by the choice of solvent, precipitant, polymer, and temperature. Thus, the P values reported previously could be converted to P' values by multiplying by $t$.

The value of $t$ is determined by a test in which the liquid proposed for use as a precipitant is added from a burette to the stirred polymer solution from which it is intended to produce fibrids. The volume percent of precipitant present in the solvent/precipitant mixture when a permanent precipitate is first formed is designated as X, which is related to t, as shown by the following section.

$$\frac{100(X-C_s)}{C_p-C_s} = 50(1-\psi) \quad (12)$$

For simplicity the notation Y will be used for the right hand side of Equation 12.

$$Y = \frac{100(X-C_s)}{C_p-C_s} \quad (13)$$

In these two equations the symbols have the following meaning.

$C_s$=volume percentage of precipitant initially present in the polymer solution.
$C_p$=volume percentage of precipitant initially present in the precipitating bath.

$$\psi = \frac{2}{\sqrt{\pi}} \int_0^{\frac{y}{2\sqrt{Dt}}} e^{-z^2} dz \quad (14)$$

For many systems of practical interest $C_s=0$ and $C_p=100$. In such cases $Y=X$, and Equation 12 may be written in the simplified form $$X = 50(1-\psi) \quad (15)$$

In Equation 14 D is the diffusion coefficient. Diffusion is the rate process on which the formation of fibrids is dependent. Thus, t represents the characteristic time required in a given system for the precipitant concentration to build up to the value of X at some specified distance inward from the surface of the polymer droplet. A value of $10^{-6}$ cm.$^2$/sec. has been assigned to D. Taking the average dimensions of fibrids into consideration, the distance, y, which the precipitant must diffuse in the time, t, has been set at 0.1 micron. It is assumed that precipitation will occur instantaneously when the concentration, X, is reached.

Values of t in microseconds (0.000001 second) are selected in the range 1 to 1000. The corresponding values of Y in Equation 12 are then calculated with the aid of "A Short Table of Integrals" by B. O. Peirce (published by Ginn and Company, 1929), using the formulas given above. These values are then plotted. The value of X is determined for a particular system by titration. From this, Y is calculated with the aid of Equation 13, and the value of t is determined from the previously calculated relationship between Y and t.

The value of X is specific for a given system. In a system in which the solvent and precipitant are constant, the relationship between t and the polymer concentration can be determined readily. In many cases the value of X changes very little with polymer concentration. In such systems t is substantially independent of concentration.

For the purposes of this invention, "fast" precipitations are those which are complete in less than about $80 \times 10^{-6}$ seconds. In these systems the Y values are below about 40. In "slow" precipitations a polymer mass sometimes forms initially from which fibrids are formed upon further beating or mechanical shearing. Such beatable precipitates are occasionally obtained at Y values about 40. This is usually accomplished under conditions such that the formation of finely divided particles, which might normally be expected, is avoided by the use of low shear during precipitation. It is sometimes advantageous to transfer these precipitates to a different liquid medium for the subsequent beating action. The only difference between "fast" and "slow" precipitations is that in the "fast" operations fibrids are formed directly without additional beating when the Y value is below about 40. At Y values above about 50 the value of t approaches infinity. Since an infinite time is required for precipitation, it is not possible to produce fibrids directly in this system. This does not mean that it is not possible to produce fibrids from this particular polymer-solvent-precipitant combination. It does mean that fibrids cannot be produced without reducing t. This can be done by such methods as increasing the polymer concentration in the solution, by mixing a precipitant with the solution prior to addition to the sheared precipitant, or by changing the temperature. For example, ethyl acetate can be added to formic acid solutions of 6/6-6 nylon co-polymers before precipitating them in ethyl acetate.

When Y values are above about 40, it is never possible to compensate for the lack of precipitating power by decreasing the shearing force to obtain fibrids directly. However, at values below about 40, the two variables are interdependent.

The precipitant and polymer solution are selected so that the t values are less than $80 \times 10^{-6}$ seconds, i.e., Y is less than 40. Most fibrid-forming processes are operated between t values of $1 \times 10^{-6}$ and $40 \times 10^{-6}$.

IDENTIFICATION OF FIGURES

The invention will be more readily understood by reference to the figures.

FIGURES I to XII are photomicrographs of various structures of the present invention. Transmitted lighting is employed in the views of FIGURES III, V to VIII and X to XII, thereby showing, at least in part, the outline of the field of the microscope. Top lighting is employed in the views of FIGURES I, II, IV and IX. Unless otherwise noted in magnification in each is about 55 times. FIGURE I is the product of Example 1 (magnification about 20 times), Ia being an artist's representiation. FIGURE II shows the product of Example 3 (magnification about 40 times). The product of Example 4 is shown in FIGURE III. The structure of FIGURE IV is the fibrid produced in Example 6 in a dry form. FIGURES V, VI, VII and VIII refer to structures of Example 7 while FIGURES IX (magnification of about 20 times) and X relate to the fibrid of Example 8. The fibrids of Example 9 are shown in FIGURE XI. FIGURE XII shows the fibrid of Example 139.

FIGURE XIII is a flow sheet diagramming a continuous process for producing a sheet in which a suspension containing a mixture of staple and fibrids is deposited on a Fourdrinier machine.

FIGURE XIV illustrates diagrammatically the process of FIGURE XIII, identifying the equipment and principal parts of the Fourdrinier machine as discussed more in detail under the heading "Use of Paper-Making Machinery" below.

FIGURE XV is a device suitable for fibrid production referred to in detail in Example 101.

TEST PROCEDURES

The surface area of hard polymers is determined by a technique based upon the adsorption of a unimolecular layer of a gas upon the surface of the sample while it is being maintained at a temperature close to the condensation temperature of the gas. Because of the excellent bonding properties of fibrids, the surface area measurement is dependent to some extent upon the method of handling the sample prior to making the measurement. Accordingly, the following standardized procedure has been adopted. The first step is to wash the fibrids thoroughly with distilled water to remove all traces of residual solvent. It is preferable to carry out the washing on a coarse sintered glass funnel. During the washing a layer of liquid is maintained over the fibrid mat at all times until the very last wash. The vacuum is disconnected as soon as the water layer passes through the mat as this last wash is completed. The filter cake is then dried at 35° C. for at least twelve hours followed by removal of the last traces of air and liquid by heating at 50° C. for at least one hour under vacuum until a pressure as low as $10^{-3}$ mm. has been reached.

The bulb containing the evacuated sample is immersed in liquid nitrogen and a measured amount of nitrogen gas is then brought into contact with the sample. The amount adsorbed at each of a series of increasing pressures is determined. From these data the volume of adsorbed gas corresponding to the formation of a unimolecular layer of nitrogen on the sample can be deduced, and from the known molecular area of nitrogen, the specific area of the material is calculated. (See: Scientific and Industrial Glass Blowing and Laboratory Techniques," pp. 257–283, by W. C. Barr and V. J. Anhorn, published by Instruments Publishing Company, Pittsburgh, Pennsylvania.)

Unless otherwise indicated, the strength of sheet materials prepared from "hard" polymers is determined by a modification of Tappi test T205–m–53 wherein the pulp slurry is poured onto a 100-mesh screen to make a sheet which is washed with 10 liters of water, removed from the screen, and dried in an oven with air maintained at approximately 100° C. One-half inch strips are cut from the sheet and strength measured on an Instron tester. The values are calculated on the basis of a one inch strip. To determine the wet strength one-half inch strips are cut from the dried sheet and placed in water, where they are soaked for 30 minutes at room temperature. The wet strength is also measured on an Instron tester and the results calculated on the basis of a one-inch width. The couched wet tenacity of a handsheet is measured in the same manner, using the undried handsheet after couching. Couching is performed by placing the sheet and the screen, sheet side down, on blotting paper, covering with one sheet of blotting paper, and rolling five times with a 34 pound standard Tappi couching roller.

The strength of handsheets prepared from "soft" polymers is determined by the following modified tests. Modification is necessary because the structure of these sheets changes on drying. The slurry of fibrids containing a non-ionic wetting agent is deposited on a 100-mesh screen. The sheets obtained are washed with approximately 6 liters of water and immediately rolled off the screen by the couching technique familiar to the paper industry. Strips one-half inch wide are then quickly cut from the sheets and tested immediately while wet on an Instron tester. The sheets are then dried thoroughly at room temperature, reweighed, and the wet strength originally measured calculated on a dry basis. The remainder of the sheet is dried at 120° C. (or, if necessary, at a temperature below the fusion temperature of the polymer) for two hours. After cooling, one-half inch strips are cut from the sheet and the dry tensile strength measured on an Instron tester.

The water absorption of "hard" polymers is measured by evenly distributing, without compression, a two-gram sample of the test material in a Buchner funnel (2½ inch diameter times 1 3/16 inch deep). One hundred ml. of water containing 0.1 gram of sodium lauryl sulfate is poured over the sample and allowed to drain by gravity for about 1 minute. The funnel is then connected to an overflowing reservoir so as to produce a ⅜ inch head of water in the funnel at equalibrium. When water begins to flow into the funnel a No. 11 rubber stopper weighing 67.4 grams is placed on the sample with the large face down. A two-pound weight is placed on the stopper. After ten minutes the petcock is turned to permit the sample to drain. After an additional ten minutes the sample is removed and weighed.

Freeness is determined by Tappi test T227m50. The data obtained from this test are expressed as the familiar Canadian standard freeness numbers, which represent the number of ml. of water which drain from the slurry under specified conditions.

Elmendorf tear strength is measured on the Elmerdorf tear tester according to the procedure described in Tappi test T414m49. The strength recorded is the number of grams of force required to propagate a tear the remaining distance across a 63 mm. strip in which a 20 mm. standard cut has been made.

Tear factor is calculated by dividing the Elmendorf tear strength in grams by the basis weight in g./m.$^2$.

Tongue tear strength is determined in accordance with ASTM D–39.

Burst strength is measured on the Mullen burst tester according to the procedure described in Tappi test T40m53.

Fold endurance is determined by Tappi test T423m50, using the MIT Folding Endurance tester.

Elastic recovery is the percentage returned to original length within one minute after the tension has been relaxed from a sample which has been elongated 50% at the rate of 100% per minute and held at 50% elongation for one minute.

Stress decay is the percent loss in stress in a yarn one minute after it has been elongated to 50% at the rate of 100% per minute.

Initial modulus is determined by measuring the initial slope of the stress-strain curve.

The following examples are cited to illustrate the invention. They are not intended to limit it in any manner.

HARD POLYMER FIBRIDS

EXAMPLE 1

*66 nylon fibrid by beating interfacial structure*

25.15 ml. of an aqueous solution containing 0.2138 gram of hexamethylenediamine per ml. are mixed with 16.35 ml. of an aqueous solution containing 0.2155 gram of sodium hydroxide per ml. and the combined solution diluted to 100 ml. with water. This is carefully poured into a beaker containing 100 ml. of a carbon tetrachloride solution in which 5.88 ml. of adipyl chloride is dissolved, thereby forming two phases. A polymer film of poly(hexamethylene adipamide) i.e. "66 nylon" forms at the interface. This film is drawn out continuously over a wet feed roller at a rate of about 18 ft./min. into a Waring Blendor in which about 200 ml. of ethyl alcohol containing 3 ml. of hydrochloric acid is being stirred rapidly. After the process is continued for 2.5 minutes the product in the Waring Blendor, shown dry in a photomicrograph at a magnification of about 20 times in FIGURE I is collected on a Buchner funnel with a sintered glass bottom and washed well with aqueous alcohol and water.

Two such preparations, combined in 3 liters of water, are poured on an 8" x 8" 100-mesh screen in a hand sheet box, vacuum being applied as soon as the fibrids are properly suspended in the liquid in the hand sheet box. After all of the water has been removed, the sheet is blotted once on the screen. It is then removed from the screen, placed between blotters, and rolled with a steel rolling pin. After the sheet is dried on a paper dryer at 85° C. for approximately 10 minutes, it has a dry tenacity of 0.364 gram/denier at a dry elongation of 46% and a wet tenacity of 0.094 gram/denier at a wet elongation of 33%.

A slurry of the fibrids from which the sheets are made are observed to have a Canadian Standard freeness of 120. The surface area is 8.3 m.$^2$/g. A ratio of wet to dry weight of 11.9 is noted when the weight of a sheet formed on a Buchner funnel with the water just drawn out is compared with the weight of the same sheet dried to constant weight at room temperature.

EXAMPLE 2

*66 nylon fibrid by beating interfacial structure*

The process of Example 1 is modified by collecting the withdrawn film in an 800 ml. beaker containing a solution of 392 ml. of ethyl alcohol and 8 ml. of concentrated hydrochloric acid. After 10 minutes the film is chopped into lengths approximately one inch long which are added to the Waring Blendor containing the solution as described in Example 1, the said Blendor being operated at full speed. After 2 minutes the fibrids formed are filtered off on a fritted glass Buchner funnel.

A 1.8 gram sample of the above is washed well and suspended in approximately 3 liters of water and a sheet formed in a hand sheet box and thereafter finished as described in Example 1. The sheet has a dry tenacity of 0.255 gram/denier at a dry elongation of 27% and a wet tenacity of 0.059 gram/denier at a wet elongation of 18%. The ratio of wet to dry weight is 15.

The fibrids have a surface area of approximately 7.3 m.²/g. An aqueous suspension of these fibrids has a Canadian Standard freeness of 154.

EXAMPLE 3

*610 polyamide fibrid by beating interfacial structure*

The technique of Example 1 is followed, using a solution of 8 ml. of sebacyl chloride ("10 acid") in 632 ml. of carbon tetrachloride as one phase and, as a second phase, a solution formed by mixing 21.62 ml. of an aqueous hexamethylenediamine ("6 amine") solution containing 0.202 gram of diamine per ml. with 15.34 ml. of an aqueous sodium hydroxide solution containing 0.196 gram of sodium hydroxide per ml., and diluting to a total volume of 94 ml. with water. The film, 610 polymer, which is formed at the interface is fed at the rate of 20 ft./min. for 5 minutes directly into the Waring Blendor containing a 50/50 mixture of ethyl alcohol and water containing 10% by weight of hydrochloric acid. When an aqueous suspension of the product is dewatered on a Buchner funnel a cohesive structure is formed. FIGURE II is a photomicrograph, showing the sheet product, aluminum coated for contrast, at a magnification of about 40 times.

EXAMPLE 4

*66 nylon fibrid by beating interfacial structure*

Example 1 is modified to pass the film as a rope-like mass over a bobbin at 12 ft./min. into the Waring Blendor operating at about 80% of full speed. Several five gram batches of fibrids having the appearance of narrow, twisted, irregular ribbons are prepared by this procedure. This suspension has a Canadian Standard freeness of 113. A photomicrograph of the structure in water suspension, at a magnification of about 55 times is shown in FIGURE III. A 3 gram, 8 inch square hand sheet prepared from these fibrids has a dry tenacity of 7.93 lbs./in./oz./yd.² and a maximum tongue tear of 0.187 lb./in./yd.².

A hand sheet of the same size and weight is prepared from a mixture containing 50% by weight of the fibrids prepared as described above and 50% by weight of ⅜ inch, 2 d.p.f. 66 nylon [poly(hexamethylene adipamide)] staple. This sheet has a dry tenacity of 4.62 lbs./in./oz./yd.² and a maximum tongue tear of 0.557 lb./oz./yd.².

The sheet of fibrids and nylon staple is heated to a temperature of 200° C. while being pressed at about 1000 lbs./in.². A high strength (13 lbs./in./oz./yd.²) sheet materials having a relatively smooth surface results. The fibrids appear to have fused uniformly throughout the sheet product.

As exemplified above the interfacial spinning technique produces a structure which can be shredded to form fibrids. Interfacial spinning broadly considered involves bringing a liquid phase comprising one condensation polymer-forming intermediate (e.g., a liquid organic diamine or solution of an organic diamine) and another liquid phase comprising a coreacting polymer-forming intermediate (e.g., a solution of an organic dicarboxylic acid halide) together to form a liquid-liquid interface, controlling the shape of the interface until a shaped polymer has formed, and then withdrawing the polymer from the interface. Preferably, the polymer is withdrawn continuously from the interface as a continuous self-supporting film or filament. Tearing or shredding is preferably performed upon the freshly-made shaped structure. This is conveniently done by leading the film or fiber directly into a suitable shredder, as shown in Examples 1 and 3. Alternatively the interfacially spun structure may be collected between the spinning and shredding operation, as shown in Example 2. Another suitable procedure is to withdraw the film formed at the interface in consecutive batches, which are then shredded or beaten, rather than to remove the interfacially-formed structure continuously. When operating in this manner the interfacially-formed film may be gently agitated to increase its thickness and thereafter shredded in a liquid suspension. In another modification of this process, the thin film formed at the interface is shredded to the fibrid form substantially as rapidly as it forms. Agitation is controlled to avoid dispersing one reactant-containing phase in the other prior to formation of the interfacial film. Suitable conditions are described in Example 5 below.

EXAMPLE 5

*66 nylon fibrid by beating interfacial structure*

200 ml. of an aqueous solution containing 9.27 grams hexamethylene diamine and 6.4 grams sodium hydroxide are placed in a Waring Blendor jar. The Blendor is started at half speed to permit formation of an interfacial film and 11.76 ml. of adipyl chloride dissolved in 400 ml. of carbon tetrachloride is added through a powder funnel inserted in the cover. The addition is made rapidly and the mass of forming polymer stops the stirrer almost immediately. The blades are freed of the product with a spatula and stirring of the mass is continued for 3 minutes producing the fibrid product.

The product is isolated and washed thoroughly with alcohol and water. The particles are of a twisted, ragged and branched filmy structure. Strong sheets are prepared by drawing down the dispersion of particles on a sintered glass funnel and drying the mat. The inherent viscosity of the polymer is 0.80 (m-cresol at 30° C. and 0.5 gram polymer/100 ml. solution).

It is preferred, both to facilitate shredding and to obtain high strength in sheet products, that the interfacially-spun structure be in a highly-swollen condition when it is shredded. This is accomplished by beating without intermediate drying.

The interfacially-formed structure is shredded while suspended in a non-solvent liquid. Suitable shredding or shearing media include water, glycerol, ethylene glycol, acetone, ether, alcohol, etc. A choice of liquid is dependent upon the nature of the interfacially-formed structure. Aqueous organic liquid mixtures, such as water-glycerol or water-ethylene glycol mixtures, are useful in the process. Water alone is particularly desirable for economic reasons and works quite satisfactorily in many cases. Non-aqueous media are sometimes desirable, however, particularly to retard crystallization of the polymer as it is shaped. A relatively wide range of viscosities may be tolerated in the shearing medium.

Shredding of the interfacially-formed structures suspended in the liquid is conveniently performed by turbulent agitation. The design of the stirrer blade used in the Waring Blendor has been found to be particularly satisfactory. Shredding action can be increased by introducing suitable baffles in the mixing vessel, for instance, as used in the commercial mixing devices of the Waring Blendor type. Other types of apparatus, such as disc mills, Jordan refiners, and the like, are suitable. For a device to be suitable for use in this process, it is necessary that it be capable of tearing or shredding the gel structure in the liquid medium to produce fibrous structures with a minimum surface area of above about 2.0 m.²/g. The mechanical action required to produce this is, of course, dependent to some extent upon the gel swelling factor and the physical form of the polymer mass to which the shear is applied.

The shredding process forms a slurry of heterogeneous fibrids. The Canadian Standard freeness numbers of aqeous slurries of the fibrids obtained by shredding are below about 790 and the preferred products of this invention have freeness numbers in the range between about 150 and 500. The freeness and many other characteristics of these slurries are similar to those of cellulose pulps used for making paper. They are, therefore, of particular utility in the manufacture of sheet-like products on paper-making equipment. As shown in the examples above, these sheet-like structures can be made from the fibrids alone or may be formed from a mixture of fibrids and staple. The fibrids bond together to form coherent sheets when settled from liquid suspension, for instance, on a screen. Where mixtures of staple and fibrids are deposited, their wet sheets can be handled. When such sheets, after drying, are subjected to heat and pressure the fibrids may be fused, as shown in Example 4. In this way a very strong and uniform sheet can be produced.

Fibrids can be formed from condensation polymers by the process described above. Fibrids can be formed from any soluble synthetic polymer, including addition polymers, by dispersing a solution of the synthetic polymer in a precipitant therefor, as previously discussed, i.e. "shear precipitation." The remaining examples illustrate this technique. For ease of filtration and other handling operations it is frequently desirable to form fibrids using relatively low turbulence to favor formation of loose web-like structures from which fibrids are separated by tearing or shredding in an agitated non-solvent liquid. Examples 6 and 7 illustrate such an embodiment.

EXAMPLE 6

*Fibrids from addition polymer-shear precipitation-"slow" system*

7.5 grams of a copolymer containing 94% acrylonitrile and 6% methyl acrylate, having an inherent viscosity in N,N-dimethylformamide of 1.45, is dissolved in 92.5 grams of N,N-dimethylformamide. A precipitant bath of 10 ml. of distilled tetramethylene sulfone and 90 ml. of acetone is placed in a 200 ml. tall-form beaker. Five ml. of the polymer solution is poured as a fine stream into the precipitant liquid while this liquid is rapidly agitated with a 5/16 inch wide steel spatula. A translucent web-like mass forms which holds loosely to the spatula. This mass is transferred to a fresh precipitant mixture in a Waring Blendor and shredded. A dispersion of fibrids is obtained which in the dry form has the appearance shown in FIGURE IV.

The fibrids obtained are washed well with water and formed into a damp sheet on a sintered glass Buchner funnel. The damp sheet is pliable and strong and, after rolling between blotters, has a tenacity of 0.02 gram/denier (dry basis). The wet to dry weight ratio for the unrolled sheet is 5.3. These dried fibrids have a surface area of 40.5 m.$^2$/g.

EXAMPLE 7

*Fibrids from a copolyamide-shear precipitation-"slow" system*

A stirring apparatus and precipitant bath is assembled, consisting of the following: a stainless steel beaker 6⅜ inches inside diameter containing 700 ml. of dimethylformamide and 1050 ml. of water; a 40-watt "Vibro Mixer" (made by A.G. für Chemie-Apparatebau of Zurich) set with the shaft vertical and having a flat, unperforated vibrating blade (1 3/16 by 1⅝ inch) horizontal to and 1⅜ inch from the bottom of the beaker and a little to one side of the center. The "Vibro Mixer" control is turned full on and the stirring is controlled through a connected "Powerstat" which is set at 83 to 86 (top of scale is 100). This gives a rapid vertical oscillatory motion to the liquid in the immediate vicinity of the impeller and slow cycling of the main body of the liquid. A 10% (by weight) solution of a copolyamide of 20% caprolactam and 80% hexamethylene sebacamide (inherent viscosity of 1.34 in m-cresol at 30° C. and a concentration of 0.5 gram/100 ml. of solution) in 98% formic acid is introduced as a fine stream from a point one inch above the impeller. Th rate of flow of the polymer solution is 12 to 15 ml./minute and the total volume introduced is 40 to 50 ml. From time to time, the large masses of loose, web-like fibrous precipitate are removed from the stirring liquid with a spatula or a small scoop. The mass of precipitate is shredded in 4 to 6 portions in a Waring Blendor running at full speed for 1 to 2 minutes and using 200 ml. portions of the used liquid precipitant as the shredding medium. The fineness of the fibrids thus obtained may be controlled by the vigor and length of this shredding. The fibrids in the slurry may be washed with water at this point until free of solvents or they may be used directly to make sheets. In the latter case, the sheet is washed with water.

The fibrids have the appearance shown in FIGURE V and a surface area of 5.4 m.$^2$/g.

A hand sheet formed entirely from the fibrids has a dry tenacity of 3.40 lbs./in./oz./yd.$^2$ and a maximum tongue tear of 0.144 lb./oz./yd.$^2$.

A hand sheet prepared from 50% fibrids and 50% ⅜ inch 2 d.p.f. nylon staple fiber (66 nylon) has a tenacity of 4.34 lbs./in./oz./yd.$^2$ and a maximum tongue tear of 0.510 lb./oz./yd.$^2$.

90 grams of the fibrids made by the above process are slurried in 4.6 liters of water and passed through a disc mill with a blade setting of 0.002 inch and a power input of 10 watts. This process refines the fibrids and reduces non-uniformities. Aqueous slurries of these fibrids have a Canadian Standard freeness of 105. A hand sheet prepared from only the refined fibrids has a tenacity of 3.82 lbs./in./oz./yd.$^2$ and a maximum tongue tear of 0.085 lb./oz./yd.$^2$.

When a hand sheet is prepared from a mixture of 50% refined fibrids and 50% nylon staple, as described above, it is observed to have a tenacity of 3.24 lbs./in./oz./yd.$^2$ and a maximum tongue tear of 0.378 lb./oz./yd.$^2$.

The above precipitation technique is followed using 500 grams of cyclohexanone as precipitant into which a solution containing 15% by weight of a copolymer of 20% caprolactam and 80% hexamethylene sebacamide in 98% formic acid is dispersed. FIGURE VI is a photomicrograph taken dry at a magnification of about 55 times of the edge of the loose, web-like fibrous precipitate initially formed. FIGURE VII is a similar view, taken wet, of the final fibrid product. FIGURE VIII is a photomicrograph at a magnification of about 55 times of a suspension of a mixture of fibrids and the nylon staple referred to above illustrating the manner in which the fibrids bond the staple by entanglement.

When a polymer solution at the appropriate concentration is added to a relatively high-shear precipitating zone simultaneously with adequate agitation, i.e. in a "fast" precipitation system, a slurry of fibrids is obtained directly. The amount of shear necessary for this variation, illustrated in the following examples will vary widely, depending particularly upon the nature of the polymer and the rate at which the polymer is precipitated. The necessary shear may be provided by stirring or jetting together the polymer solutions and the precipitant.

EXAMPLE 8

*Fibrids from polypiperazine terephthalamide*

A solution of 8.12 grams of terephthaloyl chloride in 100 ml. of chloroform is added over a 2 minute period with swirling to a cold solution of 4.56 grams of dimethylpiperazine in 100 ml. of chloroform containing 11.2 ml. of triethylamine as acid acceptor. An additional 5 ml. of chloroform is employed in rinsing terephthaloyl chloride into the reaction flask. A clear solution results. After 10 minutes this solution is poured as a fine stream, in batches of ¼ of the total volume, into a mixture of 100 ml. of petroleum ether and 100 ml. of chloroform in a Waring Blendor operating at a Powerstat setting of 50. Fibrids having a surface area above 25 m.$^2$/g. and shown dry at a magnification of about 20× in FIGURE IX are formed. An 8″ x 8″ hand sheet is made from a suspension of the fibrids in 2 liters of water. This sheet has a wet tenacity of 0.006 g.p.d. and a dry tenacity of 0.015 g.p.d. A photomicrograph of fibrids of the same polymer, taken wet, at a magnification of about 55 times is shown in FIGURE X for comparison.

EXAMPLE 9
*Copolyamide fibrids*

Caprolactam, hexamethylenediamine, and sebacic acid are polymerized to form a copolymer melting at 170° C. which contains 80% by weight of caprolactam and 20% by weight of hexamethylene sebacamide units. This copolymer is dissolved in 98% formic acid to produce a solution containing 10% by weight of the polymer. This solution (20 grams) is poured with vigorous stirring into a one-quart Waring Blendor jar containing 300 ml. of high-gravity glycerol. The fibrids obtained are separated from the mixture of glycerol and formic acid and washed with water.

An aqueous slurry containing approximately 0.5% of ¼″ to ½″ 1.5 d.p.f. 66 nylon staple is prepared by stirring the fiber with 4 liters of water containing 0.1% sodium carboxymethyl cellulose and 3 drops of Triton X–100. To this slurry is added an equal weight of the fibrids described in the preceding paragraph to produce a final slurry containing a total of approximately 1% fibers. Hand sheets are prepared by depositing this slurry on a 100-mesh screen. The dried but unpressed sheet has a dry tenacity of 0.18 g.p.d., a tear strength of 800 grams, a tear factor of 9.4, and a bursting strength of 40 p.s.i. The wet strength of the waterleaf is 0.12 g.p.d.

FIGURE XI is a photomicrograph, taken wet, at a magnification of about 55 times of a copolyamide of polyhexamethyleneadipamide and polycaprolactam (60/40). The ring-like shadows are caused by air bubbles on the surface of the suspension.

EXAMPLE 10
*Fibrids from a polyurethane*

A polyurethane with an inherent viscosity of 1.76 in 60/40 trichloroethane/phenol is prepared from 2,5-dimethylpiperazine and the bischloroformate of 1,4-cyclohexanediol. A solution containing 5.9% of this polymer, 3.8% of trifluoroacetic acid, 39.5% formic acid and 50.8% methylene chloride is added to approximately 300 ml. of water in a one-quart Waring Blendor operating at full speed to produce frazzled fibrids approximately 5 microns in diameter. A self-supporting sheet is prepared from these fibrids.

EXAMPLE 11
*Fibrids from acrylonitrile polymers*

55.5 grams of N,N-dimethylformamide containing 10% by weight of polyacrylonitrile with an inherent viscosity of 1.7 in N,N-dimethylformamide is poured into approximately 400 ml. of glycerol using the previously described equipment. A waterleaf with excellent properties is obtained from an aqueous slurry of the fibrids produced.

Repetition of the above except that the polyacrylonitrile is replaced with a copolymer containing 94% acrylonitrile and 6% methyl acrylate results in a heterogeneous mass of fibrids which vary in length from about 1 to about 7 mm. and in width from about 0.1 to about 20 microns. These also form an excellent waterleaf.

EXAMPLE 12
*Fibrids from a polyurea*

A fiber-forming polyurea is prepared by reacting 2,5-dimethylpiperazine with 4,4′-diisocyanatobiphenyl (the diisocyanate derived from benzidine). A sample of this polymer is dissolved in N,N-dimethylformamide to give a 15% solution. Approximately 50 grams of this solution is poured into 30 ml. of cold glycerol contained in a one-quart Waring Blendor with the stirrer operating at full speed. The fibrids obtained are separated by filtration and washed thoroughly with water. After drying the fibrids are observed to have a surface area of approximately 23 square meters per gram.

EXAMPLE 13
*Fibrids from an olefin-sulfur dioxide copolymer*

A fiber-forming copolymer prepared from propylene and sulfur dioxide is dissolved in dimethyl sulfoxide to produce a 5% solution. 80 grams of this solution is poured into 300 ml. of glycerol at room temperature in a one-quart Waring Blendor operating at full speed. The fibrids in this slurry are deposited on a 100-mesh screen to form a sheet with the following properties: dry tenacity=0.10 g.p.d. and wet tenacity=0.07 g.p.d. The surface area of the fibrids is greater than 30 m.$^2$/g.

EXAMPLE 14
*Fibrid from nylon copolymer*

A flake formed from a polymer containing 20% poly (hexamethylene adipamide) and 80% polycaproamide is cut to pass through a ⅜ inch screen. A 15% solution with a viscosity of 150 centipoises is prepared by adding 50 pounds of the polymer to a mixture of 255 pounds of ethylene glycol and 28.3 pounds of water in a 50 gallon tank and stirring at 115° C. for 3½ hours. Precipitant is prepared by mixing 108 gallons of ethylene glycol with 100 gallons of water and cooling to −16° C. This precipitant, which has a viscosity of approximately 10 centipoises at this temperature, is fed into a tank with a 15 gallon holdup at the rate of 3.54 gal./min. After 8–10 gallons have been added to the tank, addition of the polymer solution at a temperature of approximately 110° C. is started at a rate of 4.24 lbs./min. while addition of the precipitant is continued at the original rate. The stirrer in the tank is operating at 4100 r.p.m. and the $t$ value for this system is 1.5. The $P'_A$ value, as calculated in accordance with Equations 13 and 10, is 2950.

Fibrid slurry is removed from the bottom of the tank to maintain a constant volume. Blending is continued until 235 pounds of polymer solution have been used. The temperature of the product slurry rises to −7° C. during the process. A total of 237 gallons of slurry containing 1.7% solids is obtained. This slurry is filtered on an Eimco rotary drum filter and washed with water until substantially free of solvent. The final filter cake contains 17–18% solids. Classification of these fibrids in a Clark pulp classifier shows the following results:

| Screen mesh size: | Cumulative percent retained |
|---|---|
| 30 | 50.5 |
| 50 | 79.3 |
| 100 | 93.3 |
| 150 | 98.8 |

PRECIPITATION NUMBERS (HARD POLYMER FIBRIDS)

Examples 15–100 inclusive below demonstrate various systems showing in tabular form the effect of the variation of precipitation number determinants. The polymer solution of Examples 15 to 51, 95 and 96 is fiber-forming polyhexamethylene adipamide in formic acid. Examples 15 to 25 inclusive, 50 and 51 contain 20% solids by weight; 26 to 40 contain 10% solids by weight; and 40 to 49, 95 and 96 contain 3% solids by weight. The fiber-forming copolymer formed from 94% acrylonitrile and 6% methyl acrylate in N,N-dimethylformamide is the polymer solution of Examples 52 to 76 inclusive, there being 10% by weight solids in 52, 53 and 73 to 75 inclusive; 3% by weight solids in 54 to 56 inclusive; 5% by weight solids in 57 to 64 inclusive; and 7% by weight in 65 to 72 inclusive. The same acrylonitrile/methyl acrylate copolymer dissolved in dimethylsulfoxide is used in Examples 77 to 94 inclusive; 77 and 78 containing 3% and 5% solids by weight respectively; 79 to 85 inclusive containing 7% solids; and 86 to 94 inclusive containing 10% solids. A formic acid solution of fiber-forming copolyamide containing 20% caprolactam and 80% hexamethylene sebacamide is used in Examples 97 to 100 inclusive, the solutions of Examples 97, 98 and 100 containing 20% solids by weight while that of Example 99 contains 5%. The tensile strength of the sheets demonstrates the paper-forming capacity of the particles of each example. Where neither wet nor dry tensile strength is given the system did not produce a fibrid. The nature of the product is given in Table II. In each of Examples 15-100 the fibrids are formed in a one-quart Waring Blendor containing 300 ml. of precipitant. In each example sufficient polymer solution is added at room temperature to form 3-6 grams of fibrid. Water-leaves are formed by depositing the washed fibrids on an 8″ x 8″ 100-mesh screen. Table I follows:

*Table I*

| Ex. No. | Precipitant | Q (r.p.m.) | $d_p$ (g./cc.) | $V_p$ (poises) | $V_s$ (poises) | $R_e$ | X | t | $P'_A$ | Tensile (sheet) Wet | Tensile (sheet) Dry |
|---|---|---|---|---|---|---|---|---|---|---|---|
| 15 | Glycerol | 14,300 | 1.26 | 6.24 | 12.2 | 318 | 17 | 5.6 | 67,800 | 0.02 | 0.07 |
| 16 | do | 14,300 | 1.26 | 6.24 | 12.2 | 318 | 17 | 5.6 | 68,300 | 0.02 | 0.09 |
| 17 | 90/10 glycerol/water | 14,300 | 1.23 | 1.15 | 12.2 | 1,680 | 17 | 5.6 | 28,900 | 0.02 | 0.07 |
| 18 | 80/20 glycerol/water | 14,300 | 1.21 | 0.349 | 12.2 | 5,450 | 17 | 5.6 | 13,500 | 0.01 | 0.06 |
| 19 | 70/30 glycerol/water | 14,300 | 1.18 | 0.143 | 12.2 | 13,000 | 16 | 5.1 | 6,320 | 0.008 | 0.05 |
| 20 | 60/40 glycerol/water | 14,300 | 1.16 | 0.073 | 12.2 | 25,000 | 16 | 5.1 | 3,490 | 0.006 | 0.04 |
| 21 | 50/50 glycerol/water | 14,300 | 1.13 | 0.042 | 12.2 | 42,300 | 16 | 5.1 | 2,240 | 0.005 | 0.02 |
| 22 | 40/60 glycerol/water | 14,300 | 1.10 | 0.027 | 12.2 | 64,100 | 16 | 5.1 | 1,550 | 0.005 | 0.03 |
| 23 | 30/70 glycerol/water | 14,300 | 1.08 | 0.019 | 12.2 | 89,400 | 15 | 4.7 | 1,080 | 0.003 | 0.01 |
| 24 | 20/80 glycerol/water | 14,300 | 1.05 | 0.014 | 12.2 | 118,000 | 14 | 4.7 | 841 | 0.003 | 0.02 |
| 25 | Water | 14,300 | 1.00 | 0.01 | 12.2 | 157,000 | 13 | 4.0 | 540 | 0.002 | |
| 26 | Glycerol | 7,950 | 1.26 | 6.24 | 1.15 | 177 | 19 | 6.5 | 350,000 | 0.02 | 0.06 |
| 27 | do | 11,800 | 1.26 | 6.24 | 1.15 | 318 | 19 | 6.5 | 689,000 | 0.02 | 0.07 |
| 28 | do | 14,300 | 1.26 | 6.24 | 1.15 | 318 | 19 | 6.5 | 839,000 | 0.03 | 0.09 |
| 29 | 90/10 glycerol/water | 14,300 | 1.23 | 1.15 | 1.15 | 1,680 | 21 | 7.8 | 426,000 | 0.01 | 0.05 |
| 30 | 80/20 glycerol/water | 14,300 | 1.21 | 0.39 | 1.15 | 5,450 | 23 | 9.3 | 240,000 | 0.01 | 0.05 |
| 31 | 70/30 glycerol/water | 14,300 | 1.18 | 0.143 | 1.15 | 13,000 | 25 | 11.3 | 141,000 | 0.009 | 0.05 |
| 32 | 60/40 glycerol/water | 14,300 | 1.16 | 0.073 | 1.15 | 25,000 | 26 | 12.3 | 89,300 | 0.01 | 0.07 |
| 33 | 50/50 glycerol/water | 14,300 | 1.13 | 0.042 | 1.15 | 42,300 | 27 | 14.3 | 66,500 | 0.007 | 0.04 |
| 34 | 40/60 glycerol/water | 14,300 | 1.10 | 0.027 | 1.15 | 64,100 | 26 | 12.3 | 39,700 | 0.005 | 0.03 |
| 35 | 30/70 glycerol/water | 14,300 | 1.98 | 0.019 | 1.15 | 89,400 | 25 | 11.3 | 27,500 | 0.01 | 0.05 |
| 36 | 20/80 glycerol/water | 14,300 | 1.05 | 0.014 | 1.15 | 118,000 | 24 | 10.2 | 19,400 | 0.006 | 0.04 |
| 37 | 10/90 glycerol/water | 14,300 | 1.03 | 0.01 | 1.15 | 162,000 | 23 | 9.3 | 13,400 | 0.004 | 0.02 |
| 38 | Water | 14,300 | 1.00 | 0.01 | 1.15 | 157,000 | 22 | 8.5 | 12,200 | 0.01 | 0.05 |
| 39 | do | 11,800 | 1.00 | 0.01 | 1.15 | 130,000 | 22 | 8.5 | 9,690 | 0.003 | 0.03 |
| 40 | do | 9,200 | 1.00 | 0.01 | 1.15 | 101,000 | 22 | 8.5 | 7,140 | 0.003 | 0.02 |
| 41 | 90/10 glycerol/water | 14,300 | 1.23 | 1.2 | 0.3 | 1,610 | 35 | 34 | 7,310,000 | (1) | (1) |
| 42 | 70/30 glycerol/water | 11,800 | 1.18 | 0.143 | 0.30 | 10,770 | 35 | 34 | 1,310,000 | 0.007 | 0.03 |
| 43 | 60/40 glycerol/water | 11,800 | 1.16 | 0.073 | 0.30 | 20,600 | 35 | 34 | 758,000 | 0.005 | 0.03 |
| 44 | 50/50 glycerol/water | 11,800 | 1.13 | 0.042 | 0.30 | 34,900 | 35 | 34 | 479,000 | 0.007 | 00.3 |
| 45 | 40/60 glycerol/water | 11,800 | 1.10 | 0.027 | 0.30 | 52,900 | 35 | 34 | 338,000 | 0.004 | 0.02 |
| 46 | 30/70 glycerol/water | 11,800 | 1.08 | 0.019 | 0.30 | 73,800 | 35 | 34 | 326,000 | 0.005 | 0.002 |
| 47 | 20/80 glycerol/water | 11,800 | 1.05 | 0.014 | 0.30 | 97,400 | 35 | 34 | 195,000 | 0.004 | 0.02 |
| 48 | 10/90 glycerol/water | 11,800 | 1.03 | 0.01 | 0.30 | 134,000 | 35 | 34 | 150,000 | 0.002 | |
| 49 | Water | 11,800 | 1.00 | 0.008 | 0.30 | 162,000 | 35 | 34 | 125,000 | 0.003 | 0.01 |
| 50 | 10/90 ethanol/glycerol | 14,300 | 1.21 | 3.75 | 12.2 | 508 | 23 | 9.3 | 85,000 | 0.03 | 0.11 |
| 51 | 20/80 ethanol/glycerol | 14,300 | 1.17 | 1.34 | 12.2 | 137 | 28 | 15.5 | 26,500 | 0.02 | 0.08 |
| 52 | Glycerol | 14,300 | 1.26 | 6.24 | 3.0 | 318 | 8 | 2.4 | 119,000 | 0.04 | 0.06 |
| 53 | Water | 14,300 | 1.00 | 0.01 | 3.0 | 157,000 | 4 | 1.6 | 877 | 0.01 | 0.01 |
| 54 | Glycerol | 245 | 1.26 | 6.24 | 0.20 | 5.4 | 12.5 | 3.8 | 6,310 | 0.01 | 0.01 |
| 55 | 90/10 glycerol/water | 200 | 1.23 | 1.2 | 0.18 | 23 | 12 | 3.3 | 1,980 | 0.02 | 0.10 |
| 56 | Glycerol | 14,300 | 1.26 | 6.24 | 0.20 | 318 | 12.5 | 3.8 | 2,810,000 | | |
| 57 | do | 8,760 | 1.26 | 6.24 | 0.38 | 195 | 10.5 | 3.2 | 592,000 | 0.06 | 0.09 |
| 58 | do | 2,980 | 1.26 | 6.24 | 0.38 | 66 | 10.5 | 3.2 | 117,950 | 0.11 | 0.14 |
| 59 | Ethylene glycol | 13,550 | 1.11 | 0.17 | 0.38 | 9,560 | 14.5 | 4.5 | 181,170 | 0.05 | 0.11 |
| 60 | do | 4,740 | 1.11 | 0.17 | 0.38 | 3,350 | 14.5 | 4.5 | 51,790 | 0.04 | 0.05 |
| 61 | Carbon tetrachloride | 13,350 | 1.60 | 0.02 | 0.38 | 124,000 | 30.5 | 19 | 136,900 | 0.01 | 0.01 |
| 62 | do | 5,620 | 1.60 | 0.02 | 0.50 | 52,100 | 30.5 | 19 | 33,400 | 0.02 | 0.03 |
| 63 | Isoamyl alcohol | 13,550 | 0.81 | 0.04 | 0.38 | 28,700 | 19 | 6.6 | 80,200 | 0.04 | 0.06 |
| 64 | do | 8,840 | 0.81 | 0.04 | 0.38 | 18,800 | 19 | 6.6 | 48,580 | 0.05 | 0.07 |
| 65 | Glycerol | 11,200 | 1.26 | 6.24 | 0.87 | 249 | 9.5 | 2.9 | 351,350 | 0.14 | 0.19 |
| 66 | do | 4,350 | 1.26 | 6.24 | 1.15 | 97 | 9.5 | 2.9 | 62,960 | 0.05 | 0.10 |
| 67 | Ethylene glycol | 14,000 | 1.11 | 0.17 | 0.87 | 9,880 | 13.5 | 4.2 | 80,740 | 0.14 | 0.11 |
| 68 | do | 9,960 | 1.11 | 0.17 | 0.87 | 9,560 | 13.5 | 4.2 | 74,580 | 0.12 | 0.16 |
| 69 | Ethyl acetate | 7,720 | 0.90 | 0.005 | 1.11 | 170,000 | 41 | 99 | 36,270 | 0.01 | 0.02 |
| 70 | Tetrafluoropropanol | 13,550 | 1.46 | 0.05 | 0.87 | 44,400 | 11 | 3.3 | 22,770 | 0.03 | 0.03 |
| 71 | Acetic acid | 13,550 | 1.05 | 0.01 | 0.87 | 130,000 | 13 | 3.9 | 8,050 | 0.03 | 0.04 |
| 72 | Methanol | 7,000 | 0.79 | 0.006 | 0.87 | 101,000 | 22 | 8.5 | 4,240 | 0.02 | 0.03 |
| 73 | 90/10 glycerol/water | 14,300 | 1.23 | 1.15 | 3.0 | 1,680 | 8 | 2.4 | 50,000 | 0.07 | 0.09 |
| 74 | 80/20 glycerol/water | 14,300 | 1.21 | 0.35 | 3.0 | 5,450 | 7.0 | 2.0 | 19,800 | 0.03 | 0.06 |
| 75 | Ethyl acetate | 14,000 | 0.90 | 0.005 | 2.60 | 308,000 | 39 | 64 | 20,300 | 0.01 | 0.01 |
| 76 | Glycerol | 200 | 1.26 | 6.24 | 94 | 4.4 | 1 | 1 | 2.6 | | |
| 77 | Carbon tetrachloride | 13,800 | 1.60 | 0.02 | 0.21 | 128,000 | 41.5 | ∞ | ∞ | | |
| 78 | Ethylene glycol | 4,680 | 1.11 | 0.17 | 0.63 | 4,680 | 23 | 9.2 | 63,020 | 0.018 | |
| 79 | Glycerol | 5,000 | 1.26 | 6.24 | 0.56 | 111 | 13 | 3.4 | 18,610 | 0.02 | |
| 80 | Isoamyl alcohol | 11,800 | 0.81 | 0.04 | 0.56 | 25,000 | 17.5 | 5.7 | 40,000 | 0.004 | 0.011 |
| 81 | do | 750 | 0.81 | 0.04 | 1.81 | 1,590 | 17.5 | 5.7 | 375 | | |
| 82 | Ethylene glycol | 3,960 | 1.11 | 0.17 | 0.56 | 3,170 | 17.5 | 5.7 | 35,950 | 0.006 | 0.004 |
| 83 | Water | 7,500 | 1.0 | 0.01 | 0.56 | 82,500 | 6.0 | 2.1 | 2,830 | 0.004 | 0.004 |
| 84 | Ethyl acetate | 7,500 | 0.90 | 0.005 | 0.56 | 165,000 | 58.5 | ∞ | ∞ | | |
| 85 | Acetone | 7,500 | 0.79 | 0.003 | 0.56 | 204,000 | 84.0 | ∞ | ∞ | | |
| 86 | Methanol | 12,750 | 0.79 | 0.006 | 6.92 | 188,000 | 23 | 9.2 | 11,900 | 0.011 | 0.006 |
| 87 | do | 3,600 | 0.79 | 0.006 | 6.92 | 53,000 | 23 | 9.2 | 270 | | |
| 88 | Glycerol | 12,000 | 1.26 | 6.24 | 6.92 | 267 | 7.5 | 2.45 | 40,300 | 0.28 | 0.42 |
| 89 | do | 7,900 | 1.26 | 6.24 | 6.92 | 175 | 7.5 | 2.45 | 21,490 | 0.09 | 0.15 |
| 90 | Ethylene glycol | 13,800 | 1.11 | 0.17 | 6.92 | 974 | 13.5 | 4.1 | 3,010 | 0.064 | 0.071 |
| 91 | do | 2,500 | 1.11 | 0.17 | 4.19 | 72.9 | 13.5 | 4.1 | 338 | | |
| 92 | Benzyl alcohol | 749 | 1.05 | 0.06 | 4.19 | 1,540 | 24 | 10 | 370 | | |
| 93 | Water | 13,800 | 1.0 | 0.01 | 6.92 | 152,000 | 5.5 | 2.0 | 330 | | |
| 94 | Acetone | 3,600 | 0.79 | 0.003 | 6.02 | 97,800 | 78.0 | ∞ | ∞ | | |
| 95 | Glycerol | 11,860 | 1.26 | 6.24 | 0.30 | 263 | 35 | 34 | 12,200,000 | | |
| 96 | do | 3,780 | 1.26 | 6.24 | 0.16 | 84.0 | 35 | 34 | 5,410,000 | | |
| 97 | Ethylene glycol | 13,800 | 1.11 | 0.17 | 3.74 | 98,840 | 21.5 | 8.0 | 53,600 | 0.04 | 0.013 |
| 98 | do | 5,000 | 1.11 | 0.17 | 3.74 | 35,300 | 21.5 | 8.0 | 15,700 | 0.03 | 0.08 |
| 99 | Glycerol | 2,000 | 1.26 | 6.24 | 0.12 | 44 | 36.7 | 42.5 | 3.4×10⁵ | 0.003 | 0.01 |
| 100 | do | 11,800 | 1.26 | 6.24 | 3.74 | 444 | 16.9 | 5.0 | 193,500 | 0.009 | 0.06 |

[1] No fibrids.

Table II below describes the nature of non-fibrid products obtained in the examples listed.

*Table II*

Example:   Product
76____Gelatinous lumps.
77____Coarse fibrous particles. Would not bond.
81____Long fibrous chunks; no sheet could be made.
84____Fine precipitate; goes through screen.
85____No precipitate is formed.
87____Fibrous matter coils around stirrer.
91____Weak, brittle sheet.
92____Gel forms.
93____Coarse particle forms.
94____Fine precipitate; goes through screen.
95____Fine precipitate; goes through screen.
96____Fine fibrous precipitate; goes through screen.

EXAMPLE 101

*Fibrid preparation using a T-tube*

The apparatus used for forming the fibrids is illustrated in FIGURE XV. It consists of a tube 26 (inside diameter 2 mm.) in which holes 27 are drilled. There are three rows of holes each containing 12 holes. Each hole is 10 mils in diameter and the rows of holes are 2 mm. apart. The portion of the tube containing the holes is jacketed with manifold 28 having an inlet 29. The distance from the entrance end of the tube 30 to the first row of holes is 4.2 centimeters, total length of the tube being 10 centimeters. The precipitant, an 80/20 mixture of N,N-dimethylformamide and water, is introduced at 30 under a pressure of 575 p.s.i. The rate of throughput of the precipitant is 200 ml./sec. As soon as the precipitant begins to leave the bottom end of the tube, the polymer solution, a 15% solution of a 94/6 acrylonitrile/methyl acrylate copolymer in N,N-dimethylformamide, is introduced at 29 under a pressure of 400 p.s.i. The solvent-precipitant mixture obtained at 31 contains 1.8% by weight of fibrids. This product is filtered and washed with water. When redispersed in water these fibrids have a Canadian Standard freeness of 680. When the fibrids are deposited from this aqueous slurry on a 100-mesh screen a sheet with a dry strength of 0.14 g.p.d. and a rewet strength of 0.08 g.p.d. is obtained.

TYPICAL SHEETS PREPARED FROM HARD POLYMER FIBRIDS

The preceding examples have illustrated a variety of polymers, solvent, precipitants, and physical conditions for preparing fibrids according to the process of this invention. These examples have listed some of the properties of the fibrids and the properties of various sheet products made from them. The following examples give a more comparative picture of the properties of fibrids prepared under comparable conditions and also list data for the unpressed wet sheet strength of water-leaves prepared from fibrids, illustrating their important bonding characteristics. The fibrids of these examples are prepared by precipitating approximately 40 grams of a 10% solution of the polymer in approximately 300 ml. of precipitant at room temperature in a one-quart Waring Blendor can with the stirrer operating at full speed. The slurry formed is poured into 4 liters of water and the fibrids are deposited from this slurry onto a 100-mesh screen to make a sheet which is thereafter washed with 10 liters of water, removed from the screen, and dried in an oven with air maintained at approximately 100° C. The wet strength of ½ inch strips, which have been soaked in water for 30 minutes at room temperature, is measured on an Instron tester and calculated for a 1 inch width. Surface area, water absorption, and freeness of aqueous slurries are determined on samples of fibrids taken from the slurry, and in cases of surface area and water absorption, they are dried and fluffed.

*Table III (system identity)*

| Ex. | Polymer | Solvent | Precipitant |
|---|---|---|---|
| 102 | 6-6 nylon | Formic acid | Water. |
| 103 | Polyamide from m-phenylenediamine and isophthalic acid. | Dimethylacetamide/pyrrolidine. | Glycerol. |
| 104 | Polyamide from 2,5-dimethylpiperazine and terephthalic acid. | Formic acid | Do. |
| 105 | Copolymer containing 94% acrylonitrile and 6% methyl acrylate. | N,N-dimethylformamide. | Do. |
| 106 | ___do___ | ___do___ | Glycerol at 55° C. |
| 107 | Polyacrylonitrile | ___do___ | Glycerol. |
| 108 | Copolymer containing 20% caprolactam and 80% hexamethylene sebacamide. | Formic acid | Do. |
| 109 | Poly(ethylene terephthalate). | Trifluoroacetic acid. | Do. |

*Table IV (product properties)*

| Example | Freeness | Surface area (m.²/gram) | Absorbency gram H₂O/gram | Wet sheet strength (g.p.d.) |
|---|---|---|---|---|
| 102 | 420 | 8.9 | 10.9 | 0.01 |
| 103 | 487 | 49.2 | 7.9 | 0.04 |
| 104 | 382 | 24.9 | 7.9 | 0.03 |
| 105 | 362 | 7.9 | 12.4 | 0.10 |
| 106 | 482 | 8.5 | 15.6 | 0.08 |
| 107 | 578 | 18.5 | 9.3 | 0.14 |
| 108 | 237 | 6.5 | 5.8 | 0.12 |
| 109 | 600 | 4.9 | 9.6 | 0.03 |

PROPERTIES OF TYPICAL HARD POLYMER FIBRIDS

Table V below lists properties of some of the fibrid products of the above examples.

*Table V*

| Example | Surface area (m.²/gram) | Water absorption (g./g.) | Freeness (Canadian std.) |
|---|---|---|---|
| 15 | 5.0 | 6.28 | 233 |
| 25 | 2.9 | | |
| 26 | 9.3 | 4.64 | 239 |
| 27 | 9.3 | 2.81 | 199 |
| 38 | 7.0 | 8.76 | 605 |
| 39 | 4.5 | 7.74 | 650 |
| 40 | 6.3 | 9.05 | 705 |
| 41 | 4.5 | 7.32 | 605 |
| 52 | 14.2 | | 250 |
| 53 | | | 755 |
| 54 | 18.4 | 5.63 | 420 |
| 55 | 13.9 | | |
| 56 | 34.3 | 7.70 | 129 |
| 64 | 28.0 | 16.4 | 236 |
| 67 | 57.9 | 4.75 | 117 |

"SOFT" POLYMER FIBRIDS

The following examples illustrate the preparation of fibrids from soft polymers. All employ "fast" precipitation systems except Example 139 as noted. Examples 111 to 126 inclusive illustrate the effect of variation of precipitation numbers determinants upon the product. Examples 111 to 118 inclusive use 10% polymer solutions whereas 119, 120, and 122 employ 15% solutions. The polymer is a segmented elastomer prepared by condensing 124.5 grams (0.12 mol) of poly(tetramethylene oxide) glycol having a molecular weight of about 1000 and 10.50 grams (0.06 mol) of 4-methyl-m-phenylene diisocyanate with stirring in an anhydrous atmosphere for 3 hours at steam bath temperatures. 30.0 grams (0.12 mol) of methylene bis(4-phenyl isocyanate) dissolved in dry methylene dichloride is added to the hydroxyl-terminated intermediate and the mixture is stirred for 1 hour on a steam bath to produce an isocyanate-terminated derivative which, after cooling, is dissolved in 400 grams of N,N-dimethylformamide. A polymer solution containing about 28% solids is formed on addition of 3.0 grams (0.06 mol) of hydrazine hydrate dissolved in 26 grams of N,N-dimethylformamide.

The polymer solution so prepared is diluted to the desired solids content (usually about 10%) and 50 grams is added to approximately 300 ml. of precipitant in a one-quart Waring Blendor operating at 14,000 r.p.m. The fibrids obtained are deposited on a 100-mesh screen to form a sheet.

EXAMPLE 129

*Fibrids from a segmented copolyetherester elastomer*

60 parts of a sample of dried poly(tetramethylene oxide) glycol with a molecular weight of about 960 is mixed with 40 parts of dimethyl terephthalate, ethylene

*Table VI*

| Ex. No. | Precipitant | Q (r.p.m.) | $d_p$ (g./cc.) | $V_p$ (poises) | $V_s$ (poises) | $R_o$ | X | t | $P'_A$ | Tensile (sheet—wet) |
|---|---|---|---|---|---|---|---|---|---|---|
| 111 | Methanol | 14,000 | 0.79 | 0.0055 | 35 | 221,000 | 31.5 | 22 | 495 | 0.01 |
| 112 | do | 240 | 0.79 | 0.0055 | 35 | 3,790 | 31.5 | 22 | 4.6 | (1) |
| 113 | Ethanol | 14,000 | 0.79 | 0.01 | 15.5 | 122,000 | 21.5 | 8.3 | 771 | 0.04 |
| 114 | do | 250 | 0.79 | 0.01 | 15.5 | 2,170 | 21.5 | 8.3 | 5.8 | (1) |
| 115 | 50/50 acetone/water | 240 | 0.90 | 0.013 | 35 | 1,830 | 8 | 2.6 | 0.8 | (1) |
| 116 | 60/40 glycerol/water | 14,000 | 1.16 | 0.073 | 15.5 | 24,500 | 4.5 | 1.6 | 838 | 0.006 |
| 117 | Glycerol | 230 | 1.26 | 6.24 | 15.5 | 5.1 | 4.5 | 1.7 | 32.8 | (2) |
| 118 | Ethanol | 250 | 0.79 | 0.01 | 114 | 2,170 | 21.5 | 8.3 | 0.7 | (1) |
| 119 | Water | 250 | 1.0 | 0.01 | 114 | 2,750 | 3 | 1.4 | 0.1 | (1) |
| 120 | do | 11,000 | 1.0 | 0.008 | 0.13 | 151,000 | 4.5 | 1.6 | 11,000 | 0.01 |
| 121 | Glycerol | 14,000 | 1.26 | 6.24 | 114 | 311 | 4.5 | 1.7 | 2,160 | 0.03 |
| 122 | 80/20 glycerol/alcohol | 14,000 | 1.17 | 1.34 | 41 | 1,340 | 5 | 1.8 | 3,060 | 0.01 |
| 123 | Glycerol | 14,000 | 1.26 | 6.24 | 41 | 311 | 4.5 | 1.7 | 5,970 | 0.02 |
| 124 | 50/50 glycerol/water | 11,000 | 1.13 | 0.042 | 0.13 | 32,600 | 4.5 | 1.6 | 47,700 | 0.04 |
| 125 | 30/70 glycerol/water | 11,000 | 1.08 | 0.019 | 0.13 | 68,800 | 4.5 | 1.6 | 25,000 | 0.05 |
| 126 | Glycerol | 14,000 | 1.0 | 6.24 | 15.5 | 247 | 4.5 | 1.6 | 13,300 | 0.04 |

1 Long coils wrap around stirrer.
2 Gelatinous mass.

EXAMPLE 127

*Fibrids from a polyether condensation elastomer*

A condensation elastomer is prepared by charging a mixer with 1731 parts by weight of poly(tetramethylene oxide) glycol having a molecular weight of 3024, 2.29 parts of water, and 229 parts of 4-methyl-m-phenylene diisocyanate. The charge is heated and mixed for 2 hours at 80° C. and then allowed to cool during a period of 30 minutes to 70° C. 17.2 parts of water are then added and mixing is continued for 30 minutes at 70–85° C., 15 minutes at 85–103° C., and for 10 minutes at 103–130° C. 9 parts of the polymer so formed and 1 part of polyacrylonitrile are dissolved in sufficient N,N-dimethylformamide to produce a solution containing approximately 10% solids. The polymer from 50 grams of this solution is precipitated in glycerol. The fibrids obtained are deposited on a 100-mesh screen to produce a sheet which, after drying for approximately 2 hours at 100° C. in an air oven, as a dry tenacity of 0.03 g.p.d., an elongation of 23%, and an initial modulus of 0.51 g.p.d.

EXAMPLE 128

*Fibrids from a copolyester condensation elastomer*

Sheet products with modified properties can be produced by blending fibrids from two or more condensation elastomers. For example, a copolyester with an initial modulus of approximately 0.2 and an inherent viscosity in 60/40 trichloroethylene/phenol of 1.07 is prepared from a molar excess of ethylene glycol and a mixture of the dimethyl esters of terephthalic and sebacic acids representing a ratio of 60 parts of terephthalic acid to 40 parts of sebacic acid, as described in Example II of U.S. 2,623,033. A 10% solution is prepared by dissolving this elastic copolyester in trifluoroacetic acid. 50 grams of this solution is precipitated in 300 ml. of glycerol at room temperature in a Waring Blendor operating at approximately 14,000 r.p.m. An equal volume of a slurry containing an equal weight of the fibrids of the condensation elastomer of Example 111 in an N,N-dimethylformamide/glycerol mixture is blended with the slurry of copolyester fibrids. The blend is deposited on a 100-mesh screen to produce a sheet product. After drying in an air oven at 100° C. for approximately 2 hours, the sheet has a dry tenacity of 0.04 g.p.d., an elongation of 262%, and an initial modulus of 0.03 g.p.d.

glycol in excess of 2 mol equivalents (based on dimethyl terephthalate) and a catalyst mixture comprising 0.15% calcium acetate monohydrate and 0.05% antimony oxide [based on the combined weights of dimethyl terephthalate and poly(tetramethylene oxide) glycol]. This mixture is placed in a reactor equipped with a nitrogen bleed tube leading below the surface of the mixture, a thermometer for determining the reaction temperature, and a fractionating column. Heat is supplied to distil methanol very rapidly during the exchange reaction. After the major portion of the methanol has been removed, the heating is continued at the rate necessary to keep the bottom of the fractionating column at a temperature approximating the boiling point of ethylene glycol. After the theoretical quantity of methanol has been removed, ethylene glycol is distilled off until the glycol-terephthalic acid mol ratio is 2:1 or less, the reaction temperature being about 230–235° C. The elastic copolyetherester obtained has an inherent viscosity of 1.0 in m-cresol.

50 grams of a 10% m-cresol solution of the above elastic copolyester is precipitated in 300 ml. of acetone at room temperature in a one-quart Waring Blendor operating at approximately 14,000 r.p.m. The slurry of fibrids deposited on a 100-mesh screen form a sheet with good drape and tactile properties.

Using trifluoroacetic acid as a solvent and glycerol as a precipitant, fibrids are obtained from this copolymer which form sheets with a dry tenacity of 0.01 g.p.d.

EXAMPLE 130

*Elastomer fibrids bonding elastomer staple*

A solution of the condensation elastomer of Example 111 in N,N-dimethylformamide is dry-spun to produce a 10-denier per filament 600 denier yarn. These yarns are cut wet to staple fibers having lengths in the range of ⅛ inch to ¼ inch. The fibers are dispersed with the aid of an alkylphenoxy poly(ethylene oxide) non-ionic wetting agent (sold under the trademark "Triton X–100" by Rohm & Haas Co.) to produce a slurry containing 0.06% of the fibers. This slurry is bended with a slurry of the condensation elastomer fibrids of Example 111. The final slurry contains 0.1% by weight of suspended solids, 5% of which are the elastomer staple fibers and 95% of which are the elastomer fibrids. This slurry is deposited on a 100-mesh screen to produce a sheet, which has the following properties after drying at 120° C. These are compared to a 100% fibrid control prepared and dried under the same conditions.

Table VII

| Sample | Tensile strength-g.p.d. | Elongation percent | Tongue tear grams | Basis weight g./m.² |
|---|---|---|---|---|
| 100% fibrid control | 0.029 | 253 | 254 | 244 |
| 5% staple fibers | 0.038 | 315 | 345 | 240 |

EXAMPLE 131

*Fibrids from a polyether segmented condensation elastomer*

Poly(tetramethylene oxide) glycol with a molecular weight of approximately 700 is reacted with two molar equivalents of methylene bis(4-phenyl isocyanate) with stirring in an anhydrous atmosphere for 1 hour at 80° C. The isocyanate-terminated polyether obtained is dissolved in N,N-dimethylformamide and reacted with a small molar excess of hydrazine hydrate (slightly more than 2 mols of hydrazine hydrate per mol of isocyanate-terminated polyether) dissolved in N,N-dimethylformamide. The reaction mixture contains approximately 15% by weight of polymer. This solution is diluted with sufficient N,N-dimethylformamide to produce a 7.5% solution, which has a viscosity of 1600 centipoises. 130 grams of this solution is added with vigorous stirring to 400 ml. of glycerol in a one-quart Waring Blendor. The fibrids obtained are deposited on a 100-mesh screen to form a sheet, which, after drying for 30 minutes at 120° C., has a good drape and handle, a tenacity of 0.22 g.p.d., a tongue tear strength of 690 g., and a basis weight of 245 g./m.².

EXAMPLE 132

*Large scale preparation of soft polymer fibrids and sheet products*

A condensation elastomer prepared as described in Example 111 is dissolved in N,N-dimethylformamide to form a 15% solution. A red pigment (Watchung Red RT-428D) is then mixed with this solution at a concentration of 2.1 parts of pigment per 100 parts of elastomer. The pigmented solution is then diluted with N,N-dimethylformamide to an elastomer concentration of 11%. This solution, which has a viscosity of 1700 centipoises, is fed into a bank of 6 one-quart Waring Blendors at a total rate of 625 ml. per minute simultaneously with 4400 ml. per minute of a precipitant comprising a mixture of 14 parts of N,N-dimethylformamide and 86 parts of glycerine. The solution and precipitant streams are divided on entering each Blendor by means of a manifold, so that each liquid enters as 20 individual streams. The Blendors are operating at top speed, so that the converging streams are thoroughly beaten to continuously form a fibrid slurry, which is withdrawn continuously from an outlet in the wall of each Blendor. The effluent slurry contains approximately 1.37% solids. The equipment is run continuously for five hours to produce approximately 45 lbs. of fibrids slurried in a mixture of glycerine and N,N-dimethylformamide.

The solvent/precipitant mixture is removed from the slurry by repeated decantation followed by redispersion of the floating fibrid cake in water. When substantially all of the organic liquids are removed, the fibrids are diluted with water to a consistency of 0.4%. An alkylphenoxy poly(ethylene oxide) non-ionic wetting agent (0.1% by weight) is added to maintain the dispersion. This suspension, which has a Canadian Standard freeness of 615, is pumped to the head box of a 32-inch Fourdrinier machine. The machine is operated at speeds between 8 to 16 feet per minute. The wire shake is varied between 375 and 460 cycles per minute. The steam pressure in the drier roll is varied between 20 and 30 p.s.i.g. Soft, fabric-like sheets with basis weights between 78 and 210 g./m.² are obtained. Formation of the sheet on the screen is good, as is the drainage. String-up of the sheet between the wire, wet press, and drier section is easy and uniform sheets are produced. A sample of this sheet has a dry tenacity of 0.077 g.p.d., an elongation of 200%, a tongue tear strength of 177 g., a basis weight of 166 g./m.², and a thickness of 19 mils.

(The Waring Blendor is modified in this experiment by removing the nut which holds the blade of the shaft, welding a small nut to the under side of the blade, and remounting the blade on the shaft so that the end of the shaft does not protrude above the top surface of the blade.)

EXAMPLE 133

*Fibrid from a segmented copolyetherester elastomer*

A condensation elastomer is prepared as described in Examples 111–126, except that the polyether glycol is replaced by a polyester with a molecular weight of 1490 prepared from 1,4-dimethyltetramethylene glycol and adipic acid. 100 grams of a 10% solution of the polymer dissolved in hexamethylphosphoramide is added to 300 ml. of glycerol at room temperature in a one-quart Waring Blendor operating at approximately 14,000 r.p.m. The slurry of fibrids in the solvent/precipitant mixture is added with stirring to approximately 3.5 liters of water containing 2 drops of an alkylphenoxy poly(ethylene oxide) non-ionic wetting agent. A sheet is formed by depositing the fibrids on a 100-mesh screen in a handsheet box. The sheet is washed with about 6 liters of water, removed quickly after washing, and a strip tested at once on the Instron. The sheet is then dried at 100–120° C. and reweighed for calculating the wet strength on a dry basis. The sheet has an initial wet tenacity (dry basis) of 0.003 g.p.d., a dry tenacity of 0.013 g.p.d., an elongation of 116%, an initial modulus of 0.017 g.p.d., a basis weight of 246 g./m.², and a thickness of 16 mils.

The polymer used to prepare these fibrids has an initial modulus of approximately 0.05 g.p.d., and an inherent viscosity in hexamethylphosphoramide of 0.48.

EXAMPLE 134

*Fibrid from a segmented copolyetherester elastomer*

A condensation elastometer is prepared as described in Example 129 except that the poly(tetramethylene oxide) glycol has a molecular weight of 1600. 100 grams of a 10% solution in trifluoroacetic acid of this elastomer, which has an initial modulus of approximately 0.12 g.p.d., is added to 300 ml. of glycerol at room temperature in a one-quart Waring Blendor operating at approximately 14,000 r.p.m. The slurry of fibrids in the solvent-precipitant mixture is poured into approximately 3.5 liters of water. Approximately 2 drops of an alkylphenoxy poly(ethylene oxide) non-ionic wetting agent are added to the dispersion and the fibrids deposited on a 100-mesh screen. The sheet obtained is washed and tested immediately while wet on an Instron tester as described in the preceding example. The sheet is then dried thoroughly at room temperature, reweighed, and the wet strength originally measured calculated on a dry basis. The remainder of the sheet is dried a 120° C. for two hours. After cooling, ½ inch strips are cut from the sheet and a dry tensile strength measured on an Instron tester. Other properties are measured on the dry sheet. The sheet has an initial wet tenacity (dry basis) of 0.002 g.p.d., a dry tenacity of 0.01 g.p.d. an elongation of 29%, an initial modulus of 0.06 g.p.d., a basis weight of 260 g./m.², and a thickness of 28 mils.

EXAMPLE 135

*Fibrids from a copolyamide elastomer*

An elastic N-isobutyl-substituted copolyamide is prepared as described in U.S. 2,670,267. 25 ml. of a 10% formic acid solution of this polymer, which has an initial modulus of approximately 0.5 g.p.d., is added to 300 ml. of a mixture of 50 parts of acetone and 50 parts of 1% aqueous sodium carboxymethylcellulose solution at room temperature in a Waring Blendor operating at approximately 14,000 r.p.m. This slurry of fibrids in a mixture of solvent and precipitant is then mixed with 3.5 liters of water. Four batches so prepared are combined and the mixture poured into a handsheet box. The fibrids are allowed to rise to the top and the water drained off. Fresh water is added and the procedure repeated. The water is again added and the fibrids deposited on the 100-mesh screen to form a sheet, which is removed immediately from the screen. Test strips are cut and tested and the remainder of the sheet dried and tested as described in the previous example. The properties observed are an initial wet tenacity (dry basis) of 0.002 g.p.d., a dry tenacity of 0.03 g.p.d., an elongation of 28%, an initial modulus of 0.29 g.p.d., a burst strength of 13.8 p.s.i., an Elmendorf tear strength of 218 grams, a tear factor of 0.3, and a basis weight of 695 g./m.$^2$.

EXAMPLE 136

*Fibrids from an elastic modified nylon*

A condensation elastomer is prepared as described in U.S. 2,430,860. 100 grams of a 10% formic acid solution of this polymer, which has an initial modulus of approximately 0.05 g.p.d., is added to 300 ml. of 50/50 glycerol/water mixture at room temperature in a one-quart Waring Blendor operating at approximately 14,000 r.p.m. The slurry of fibrids obtained is poured into approximately 3.5 liters of water. Approximately 2 drops of an alkylphenoxy poly(ethylene oxide) non-ionic wetting agent are added and the fibrids deposited on a 100-mesh screen. The sheet obtained is washed with approximately 6 liters of water and immediately rolled off the screen. Test strips are quickly cut and tested and the remainder of the sheet dried and tested as described in the previous example. The sheet has an initial wet tenacity (dry basis) of 0.002 g.p.d., a dry tenacity of 0.07 g.p.d., an elongation of 31%, an initial modulus of 0.66 g.p.d., a basis weight of 284 g./m.$^2$, and a thickness of 28 mils.

EXAMPLE 137

*Fibrids from plasticized poly(methyl methacrylate)*

100 grams of a 10% acetone solution of poly(methyl methacrylate) plasticized with n-butyl phthalate (75% polymer and 25% plasticizer) is added to 300 ml. of a 50/50 glycerol/water mixture at room temperature in a one-quart Waring Blendor operating at approximately 14,000 r.p.m. The slurry obtained is poured into approximately 3.5 liters of water. Approximately 2 drops of an alkylphenoxy poly(ethylene oxide) non-ionic agent are added and the fibrids are deposited on a 100-mesh screen. The sheets obtained are washed with approximately 6 liters of water and immediately rolled off the screen. Test strips are quickly cut and tested and the remainder of the sheet dried and tested as described in the previous example. The sheet has an initial wet tenacity (dry basis) of 0.002 g.p.d., a dry tenacity of 0.006 g.p.d., an elongation of 207%, an initial modulus of 0.08 g.p.d., and a basis weight of 868 g./m.$^2$.

EXAMPLE 138

*Fibrids from plasticized vinyl chloride polymers*

100 grams of a 10% N,N-dimethylformamide solution of poly(vinyl chloride) plasticized with dioctyl phthalate (75% polymer and 25% plasticizer) is added to 300 ml. of glycerol at room temperature in a one-quart Waring Blendor operating at approximately 14,000 r.p.m. The slurry obtained is poured into approximately 3.5 liters of water, approximately 2 drops of an alkylphenoxy poly(ethylene oxide) non-ionic wetting agent are added, and the fibrids deposited on a 100-mesh screen. The sheet obtained is washed with approximately 6 liters of water and immediately rolled off the screen. Test strips are quickly cut and tested as described in the previous example. The sheet has an initial wet tenacity (dry basis) of 0.002 g.p.d., a dry tenacity of 0.02 g.p.d., an elongation of 33%, an initial modulus of 0.16 g.p.d., an Elmendorf tear strength of 256 grams, a burst strength of 12.7 p.s.i., a tear factor of 0.42, and a basis weight of 603 g./m.$^2$.

EXAMPLE 139

*Soft polymer fibrids—"slow" system*

A precipitant liquid consisting of 93.5 parts of dioxane and 96.5 parts of ethyl ether is placed in a tall beaker. In a separate vessel, a solution of a synthetic elastomer of the same composition as that described in Examples 111–128 was prepared using dimethylformamide as a solvent. The solution contains 7.5% by weight of polymer. The precipitant liquid is stirred at a moderate speed with a glass rod while a fine stream of 20.43 parts of the polymer solution is poured into the precipitant. A translucent fibrous mass forms on the rod. This mass is cut into pieces with a spatula and shredded in a Waring Blendor containing 78.9 parts of ethanol and 63 parts of glycerin. The rheostat control of the speed of the Waring Blendor is set between 70 and 80. The shredding action is continued for 0.8 minute. A slurry of fibrids of finely fibrous coiled branch structures is obtained. These are shown (55X) in FIG. XII.

The fibrids are freed of a part of the shredding solvent by filtration, and the mixed solvent is then removed by washing with water containing a small amount of dispersing agent. The washed fibrids are formed into a coherent sheet by pouring the aqueous slurry on a sintered glass Buchner funnel and drawing off the water uniformly. The damp sheet is easily self-supporting and is removed and dried at 100° C. on a 100-mesh screen. The dry sheet is washed free of detergent and dried. It is soft, pliable, porous, and nontacky. It is elastic but does not have the coldness of rubber sheeting. The dry tenacity of the sheet is 1.0 lb./in./oz./sq. yd. (0.059 gram per denier).

FIBRID SHEET SPECIALTIES

As shown in the previous examples an important characteristic of fibrids is their cohesiveness or bonding strength in sheet products. This is quite evident in both wet and dry sheets, particularly when the sheets are compared with the products of the prior art. For example, the wet tenacity of sheets prepared from staple fibers is usually less than $4 \times 10^{-4}$ gram/denier. In contrast to this, sheets prepared from "hard" polymer fibrids have a minimum couched wet tenacity of about 0.002 gram/denier, and a minimum dry strength, before pressing, of about 0.01 gram/denier. A wet strength of as high as 0.02 gram/denier is not unusual for these products. The values expressed in grams/denier may be converted to values expressed as lbs./in./oz./yd.$^2$ by multiplying by 17. In the section of examples which follows, unusual and/or particularly desirable sheet products formed with fibrids both hard and soft are illustrated.

EXAMPLE 140

*Sheet product containing polyurethane fibrids*

A polyurethane is prepared from hexamethylenediamine and ethylene bischloroformate by interfacial polycondensation at room temperature. The hexamethylenediamine is dissolved in water and is reacted with an equimolar quantity of ethylene bischloroformate in 100% concentration as a liquid. Sodium carbonate is added to the aqueous diamine solution as an acid acceptor. Two molar parts of acid acceptor are employed for every mol of diamine in the solution. The polymerization proceeds at room temperature with mild agitation, and a polymeric product with inherent viscosity of 0.7 is obtained in the form of gross chunks which are washed after filtration. 10 parts of the polymer are then dissolved in 40 parts by weight of 98% formic acid. This thick solution is thereafter extruded, at room temperature through a No. 17 square cut hypodermic needle into a Waring Blendor operating at top speed, and containing 378 parts of glycerin and 100 parts of water. Long fine fibrids form which are washed with 20,000 parts of water on a 100-mesh screen, transferred to a flask and dispersed in 1,000 parts of water. From these fibrids a waterleaf is prepared and observed to have a couched wet tenacity of 0.01 grams per denier, a water absorption of 9.9 grams per gram of fibrid, and a surface area of 12.0 square meters per gram. The slurry of fibrids has a Canadian freeness of 380. When a composite waterleaf containing 70% staple fibers and 30% of these fibrids is prepared, excellent sheets are obtained. In a typical preparation, 0.9 parts of the fibrids prepared as above are combined with 2.1 parts of ¼" three denier per filament 66 nylon staple fibers and dispersed in one liter of cold water with a Vibromixer using dispersing agent Triton X–100. The slurry of fibrids and fibers is mixed gently with a spatula and poured onto a sheet mold with a 100-mesh screen. The water is sucked off and the sheet removed from the sheet mold and dried at 80° C. and then pressed at 208° C. This sheet has a dry tensile strength of 10.0 lbs./in./oz./yd.² and a tongue tear strength of 0.70 lbs./oz./yd.².

LAYERED STRUCTURES

Fibrids may be deposited on non-woven fabrics or other sheet material including fibrid-bonded structures, and, in such applications, the fibrids upon deposition bond themselves to the porous base layer so strongly that delamination cannot be achieved without destroying the continuity of at least one of the layers. Highly desirable layered waterleaf structures are thus obtained comprising a plurality of layers wherein the last one of two adjacent layers contains fibrids, the said layers being integrally bonded together by fibrids. In the formation of such products, when successive layers are deposited one on top of another, the presence of fibrids in at least one of each pair of adjacent layers causes all of the layers to become associated with one another so that they may not be delaminated without destroying or pulling apart the individual layers themselves. A preferred embodiment comprises structures containing a plurality of layers each of which contains fibrids either with or without staple fibers derived from synthetic and natural polymers.

EXAMPLE 141

Chamois-like product

A copolymer of ethylene terephthalate and ethylene isophthalate in the molar ratio of 80 to 20 having an inherent viscosity of 0.69 in tetrachloroethane/phenol (66/100 by weight) as a 0.5% solution, is prepared as a 10% solution in N-methyl-2-pyrrolidone. This solution at a temperature of 75° C. is then metered to a centrifugal pump-type fibridator simultaneously with a precipitant solution. The centrifugal pump-type fibridator is made by modifying a standard centrifugal pump (Worthington ¾ inch CMG42 made by the Worthington Pump Machinery Corp. of Harrison, N.J.) is modified by cutting two ¼" pipe taps in the casing at points diametrically opposite one another and radial to the impeller shaft. A feed line which sprays onto the impeller through 5 holes of 0.030 inch in diameter is connected to each tap. A valve for throttling purposes is attached to the inlet opening of the pump. A line connection is made to permit pumping of the precipitant solution to the outlet portion of the pump. The conventional inlet opening of the pump now serves as the outlet of the fibridator. The precipitant solution is fed to the fibridator through what would normally be the outlet opening of the centrifugal pump. The precipitant solution consists of 65 parts of glycerol and 35 parts of water at 27° C. The precipitated fibrous polymer is drawn off as a slurry having a consistency of 1% at a rate of 75 pounds per hour of solids. The washed fibrous material obtained in the above manner is designated as polyester fibrids.

5.4 grams of spontaneously elongatable poly(ethylene terephthalate) fibers (described in Belgium Patent No. 566,145) of 3 dpf and previously cut to ¼" length are slurried in water together with a slurry of the above polyester fibrids containing 0.4 gram solid fibrous particles. The thoroughly mixed slurry of fibers and polyester fibrids is then deposited in a sheet mold in the form of a substrate waterleaf. The wet waterleaf is held in the bottom of the sheet mold by placing on top of it a screen having openings of ½ square inch in size. A wood block is placed on top of the screen. A second slurry thoroughly mixed containing 0.15 gram of the above polyester fibrids and 0.15 gram of the elastomer fibrids of Example 111 is gently poured on top of the wood block so that as pouring continues the wood block floats to the top without disturbing the formation of the substrate waterleaf. When the total amount of the fibrid slurry is poured into the sheet mold, the wood block and the metal screen are removed gently so as not to disturb materially the original formation of the substrate waterleaf. The top slurry is then drawn off under vacuum through the substrate layer thus depositing a very thin top layer of a blend of polyester fibrids and elastomer fibrids.

This layered waterleaf structure is dried at 120° C. for 45 minutes and then heated for 3 minutes at 200° C. without restraint in order to fuse the binder to the fibers in the sheet product thus obtained. The sheeting product obtained by this technique is soft and supple. It resembles very closely the natural chamois product in that one of its surfaces is fuzzy and soft while the other surface is smoother, abrasion resistant, and not so fuzzy. The physical properties of the sheet appear in Table VIII.

*Table VIII*

| | |
|---|---|
| Thickness (mils) | 29 |
| Basis weight (oz./yd.²) | 3.88 |
| Tensile strength (lbs./in./oz./yd.²) | 3.00 |
| Tongue tear strength (lbs./oz./yd.²) | 0.57 |
| Pliability | good |
| Hand | soft |

The product also resists delamination.

The composition of the ingredients in the above example need not be restrictive. Several other combinations of compositions of both the substrate and the top layer are possible. Also, other drying and setting conditions can be used.

This example demonstrates modifying one surface of the fibrous sheet structure for the purpose of eliminating or reducing fuzziness and pilling and also improved abrasion resistance of the surface in question.

EXAMPLE 142

Poly(ethylene terephthalate) structure

A 10% solution of a nominal 55/45 ethylene terephthalate/ethylene isophthalate copolymer in trifluoroacetic acid is added to a mixture of 375 ml. of ethylene glycol and 25 ml. of water at room temperature in a Waring Blendor operating at approximately 14,000 r.p.m. The fibrids produced are blended with ¼" two denier poly(ethylene terephthalate) staple fibers to form a 0.05% consistency slurry of an 80/20 fiber/fibrid blend. This blend is deposited on an 8" x 8" 100-mesh screen to produce a 3-gram sheet. Baffles are placed in the sheet mold to maintain sheet formation and 6 grams of the same fibrids in a 0.1% consistency slurry are deposited on this waterleaf. The composite sheet is dried at 90° C. for 10 minutes and then pressed momentarily at 140° C. and 750 p.s.i., using a polytetrafluoroethylene film to contact the screen side and aluminum foil to contact the all-fibrid side of the sheet. A flexible sheet with one smooth glossy side and one side resembling paper or a non-woven structure is obtained. This pressed sheet has the following properties: tenacity=8.2 lbs./in./oz./yd.², tongue tear strength=0.14 lb./oz./yd.², Mullen burst strength=21 p.s.i. per oz./yd.$^2$, thickness=9 mils, and basis weight=5.9 oz./yd.$^2$.

EXAMPLES 143–152

Plasticized polyvinyl chloride-coated substrates

The following polyvinyl chloride composition with varying amounts of plasticizer is made up:

100 parts poly(vinyl chloride)
15 parts calcium carbonate
7 parts pigment
3 parts "Mark M" stabilizer (Argus Chemical Co.)
45, 30 and 15 parts dioctyl phthalate.

The plasticized poly(vinyl chloride) fibrids are prepared by adding a 20% solution of the compounded poly(vinyl chloride) dissolved in tetrahydrofurane to a jacketed Waring Blendor jar containing 250 ml. glycerol, 150 ml. water and 10 drops of a surface-active agent ("Triton X–100") at 5° C. while stirred at full speed. These fibrids are then used to prepare a coated substrate of which the following is an example.

A 6-gram 8" x 8" waterleaf of 50% ⅜" 70/34 poly(ethylene terephthalate) fibers and 50% of plasticized poly(vinyl chloride) fibrids is deposited on a 200-mesh screen in a sheet mold. A baffling system is placed in the headbox of the sheet mold so that a slurry containing 9 grams of plasticized poly(vinyl chloride) fibrids can be poured into the headbox without disturbing the already deposited waterleaf. The fibrids are then deposited on top of this waterleaf. The waterleaf is washed thoroughly and then dried in a 120° C. oven for 30 minutes. When this structure is placed between aluminum foil and pressed at 150° C. and 400 p.s.i. for 15 seconds, a vinyl-coated substrate having the appearance and properties of the better commercial-coated fabrics is obtained.

strates have a slightly pebbly surface. When high tenacity rayon tire cord fibers are used in the substrate, the tensile strength of the coated structure is approximately ½ (2.03 lbs./in./oz./yd.$^2$) that of the poly(ethylene terephthalate) and poly(hexamethylene adipamide) structures, while the tear strength is approximately that of the poly(hexamethylene adipamide) structure. The porosity of all of the pressed structures is very low. The porosity of the coated poly(ethylene terephthalate) fiber substrates is 0 while that of the others is in the range of 0.01 to 0.35 c.f.m./in.$^2$ at 10 p.s.i.

The unpressed structures, although having considerably lower tensile strengths than the pressed structures, are important from the standpoint of their porosity and pleasing appearance. The tear strength of the unpressed coated poly(ethylene terephthalate) fiber substrates is in the same range as the pressed structures. It is possible to practically double the tensile strength of the unpressed structures by drying the wet waterleaves in a 135° C. oven instead of a 120° C. oven for 30 minutes.

EXAMPLE 153

Poly(vinyl chloride) coated fabric

A plasticized poly(vinyl chloride) coated rigid structure which is useful where a scratch-resistant surface is required such as luggage, certain types of paneling, etc., is prepared in the following manner:

Two 40 gram waterleaves of 80% "Vinylite VYHH" (a copolymer of vinyl chloride and vinyl acetate containing 85–8% vinyl chloride and having an average molecular weight of 10,000 marketed by Carbide & Carbon Chemical Company) fibrids and 20% 3/8" 70/34 poly(ethylene terephthalate) fibers are deposited on separate 8" x 8" 200-mesh screens. A 19 gram coating of

Table IX

PLASTICIZED POLYVINYLCHLORIDE COATED SUBSTRATES
[Nine gram coating on an 8" x 8" substrate]

| Ex. No. | Basis weight, oz./yd.$^2$ | Parts plasticizer per 100 parts polyvinylchloride | Sur. coat., grams | Substrate | | | Pressed at 150° C. and 400 p.s.i. | | | | | Unpressed, dried at 120° C. for 30 min. | | | | |
|---|---|---|---|---|---|---|---|---|---|---|---|---|---|---|---|---|
| | | | | Weight of fibrid, grams | Weight and fiber | Thickness, mil. | Porosity, c.f.m./sq. in. at 10 p.s.i. | Mullen burst, p.s.i./oz./yd.$^2$ | Max. tongue tear, lbs./oz./yd.$^2$ | Tensile strength, lbs./in. per oz./yd.$^2$ | Thickness, mil. | Porosity, c.f.m./sq. in. at 10 p.s.i. | Mullen burst, p.s.i./oz./yd.$^2$ | Max. tongue tear, lbs./oz./yd.$^2$ | Tensile strength, lbs./in. per oz./yd.$^2$ |
| 143 | 12.4 | 45 | 9 | 3 | 3 g. ⅜" A* | 13.5 | 0 | 15.8 | 0.270 | 5.38 | 34 | 14 | 7.7 | 0.157 | 1.12 |
| 144 | 14.1 | 45 | 9 | 6 | 3 g. ⅜" A* | 15 | 0 | 14.4 | 0.168 | 4.50 | 38 | 20 | 6.8 | 0.207 | 1.11 |
| 145 | 12.3 | 30 | 9 | 3 | 3 g. ⅜" A* | 13.5 | 0 | 16.7 | 0.200 | 5.48 | 40 | 31 | 10.3 | 0.179 | 1.16 |
| 146 | 11.9 | 30 | 9 | 3 | 3 g. ⅜" A* | (¹) | (¹) | (¹) | (¹) | (¹) | 34 | 22 | 13.2 | 0.260 | 2.04 |
| 147 | 14.9 | 30 | 9 | 6 | 3 g. ⅜" A* | 15 | 0 | 14.4 | 0.196 | 5.25 | 45 | 25 | 9.5 | 0.257 | 1.31 |
| 148 | 10.7 | 45 | 9 | 3 | 3 g. ⅜" B* | 13.5 | 0.03 | 19.5 | 0.407 | 4.69 | 32 | 10.5 | 9.4 | 0.193 | 0.95 |
| 149 | 14.2 | 45 | 9 | 6 | 3 g. ⅜" B* | 16 | 0.01 | 15.0 | 0.263 | 4.38 | 40 | 24 | 6.3 | 0.195 | 0.97 |
| 150 | 12.7 | 30 | 9 | 3 | 3 g. ⅜" B* | 14 | 0.29 | 21.3 | 0.387 | 4.77 | 41 | 32 | 6.0 | 0.144 | 0.82 |
| 151 | 14.6 | 30 | 9 | 6 | 3 g. ⅜" B* | 16 | 0.01 | 16.3 | 0.226 | 5.22 | 47 | 30 | 9.5 | 0.166 | 1.16 |
| 152 | 11.2 | 45 | 9 | 3 | 3 g. ⅜" C* | 13.5 | 0.35 | 11.5 | 0.325 | 2.03 | 33 | 28 | 1.2 | 0.142 | 0.61 |

A*, poly(ethylene terephthalate); B*, poly(hexamethylene adipamide); C*, high tenacity rayon tire cord.
¹ Dried at 135° C. for 30 min. instead of at 125° C.

In Table IX are listed some of the vinyl-coated substrates that are prepared. The amount of dioctyl phthalate has little effect on the tensile and tear strengths of the structures, but, as expected, there is an increase in stiffness with decreasing amounts of plasticizer. The structures prepared from poly(vinyl chloride) containing 45 and 30 parts of dioctyl phthalate per 100 parts of poly(vinyl chloride) are in the range of commercial-coated fabrics, whereas, the one containing only 15 parts of dioctyl phthalate per 100 parts poly(vinyl chloride) gave structures which are stiffer.

The tensile strength of the pressed coated substrates is in the same range (4.5 to 5.5 lbs./in./oz./yd.$^2$) for both the poly(ethylene terephthalate) and poly(hexamethylene adipamide) fiber substrates. Tear strengths of the coated poly(hexamethylene adipamide) fiber substrates are better than those of the corresponding poly(ethylene terephthalate) fiber substrates. The coated poly(ethylene terephthalate) fiber substrates have a smooth surface, whereas, the coated poly(hexamethylene adipamide) fiber subplasticized poly(vinyl chloride) fibrids is deposited on top of one of these waterleaves. Both waterleaves are dried in a 120° C. oven for 30 minutes. The two waterleaves are then placed with the plasticized poly(vinyl chloride) fibrid side up between "Ferrotype" plates (high gloss metal plates) into an 8" x 8" mold. The mold is placed in a press and molded at 160° C. and 250 p.s.i. for 5 minutes. The mold is cooled while still under 250 p.s.i. pressure. A cold formable sheet with mirror surfaces is obtained.

EXAMPLE 154

Leather replacement

A leather-like layered structure is made by depositing 3 layers in a standard 8" x 8" paper-making sheet mold. The first layer consists of 2 grams of poly(hexamethylene adipamide) fibrids. The second layer consists of 2 grams of poly(hexamethylene adipamide) fibrids and 2 grams of the polyurea elastomer fibrids of Example 111. The third layer consists of 5 grams of the same polyurea elastomer fibrids. The resulting sheet is removed from the sheet mold and oven dried at 120° C. This sheet gives a structure which resembles leather in that the first layer consisting of poly(hexamethylene adipamide) fibrids only gives a smooth dense top layer approximating the skin side of leather while the third layer consisting only of the polyurea elastomer fibrids gives a rough porous structure approximating the flesh side of leather. It is very resilient and well laminated.

The sheet prepared in this example is pressed in a standard laboratory press in which one platen is heated while the other platen is cold. In pressing the hot platen temperature varies from 180° C. to 200° C. while the cold platen temperature varies from room temperature to 60° C. When the sheet is pressed, the skin side (100% nylon side) is in contact with the hot platen and the flesh side (100% polyurea elastomer side) is in contact with the cold platen. Pressure varies from 500 to 1000 p.s.i. Time in pressing varies from 1 to 30 seconds depending on thickness of sheet. This pressing technique fuses the skin side, thus giving greater strength and at the same time preserves the rough flesh side appearance of the polyurea elastomer fibrids.

EXAMPLE 155

*Nylon tricot backed elastomer fibrids*

This example illustrates the formation of a "coated" fabric or "two-layer" structure by depositing a composition containing fibrids on a fabric base.

A slurry of elastomer fibrids prepared as described in Example 111 is deposited on a stretched 1 oz./yd.$^2$ poly(hexamethylene adipamide) tricot. After the excess liquid is removed the tricot is relaxed, and a layered structure is obtained which does not tend to delaminate. After drying in an air oven at 100° C. for approximately 2 hours, the composite structure exhibits the excellent toughness of poly(hexamethylene adipamide) fabrics coupled with the soft surface characteristics associated with the elastomer fibrids. The modified fabric is well suited for use as an upholstery fabric. Layered structures of this kind permit the desirable suede-like hand of the elastomer fibrid to be conferred on sheets which have especially high tear strength due to the underlying tricot fabric.

REINFORCED PLASTICS FORMED FROM FIBRIDS

Fibrids can be employed to produce fiber reinforced plastic sheets in a continuous process. Such sheets are particularly desirable because of the uniform distribution of reinforcing fibrids which can be obtained by employing fibrids in such processes. Furthermore, the plastic sheets can be prepared with completely random distribution and directionality of the reinforcing fibers. In particular, outstandingly desirable sheets can be prepared by the process of monodispersing fibers of short length together with fibrids in a dispersing medium containing a wetting agent, said fibers being present in the amount of 5 to 50% of the total weight of solids in the dispersion, and then depositing the intimately mixed solids from dispersion onto a papermakers screen and subsequently drying and consolidating this deposit until the fibrids lose their identity. Example 156 below illustrates production of such a material.

EXAMPLE 156

*Glass reinforced poly(methylmethacrylate)*

A 15% solution of poly(methylmethacrylate) in methyl ethyl ketone is fibridated into a 50/50 mixture of glycerine and standard denatured alcohol in a Waring Blendor operated at high speed. The fibrids are collected on a filter and 6350 grams thereof dispersed together with 2570 grams glass fibers (coated with a gelatin finish designated No. 707 and marketed by Owens-Corning Fiberglas Co.) of 9 microns diameter (a solids ratio of 72% fibrids and 28% glass) in 2000 lb. of water. The fiber-fibrid slurry is gently stirred for 60 minutes with a propellor type stirrer in a 1000 gal. tank. Reinforced plastic sheet having a basis weight of 3.6 oz./yd.$^2$ is prepared on a Fourdrinier machine in which the wet press roll is set at a minimum load to remove as much water as possible without damaging the fibers. Due to the gelatin finish of the glass fibers used, the use of a wetting agent is not required. The waterleaf is then processed into 2 different products:

(A) Compression molded, i.e., the sheet is formed on a compression molding apparatus designed to form the above-described dumbell-like bar under heat and pressure.

(B) Injection molded in a one ounce Watson-Stillman apparatus, by feeding this apparatus with ¼-inch square pieces cut from the dry waterleaf, made on a stairstep dicing machine.

The processing conditions and the attained physical properties are listed in Table X below.

*Table X*

| | A | B |
|---|---|---|
| Molding conditions {Temp., °C | 190 | 220 |
| {Pressure in 10$^3$ p.s.i. | 0.9 | 19 |
| Tensile strength in 10$^3$ p.s.i. | 8.6 | 11.1 |
| Tensile modulus in 10$^5$ p.s.i. | 8.9 | 11.8 |
| Flex strength in 10$^3$ p.s.i. | 15.2 | 20.5 |
| Flex modulus in 10$^5$ p.s.i. | 8.6 | 11.5 |
| Yield strength in 10$^3$ p.s.i. | 6.5 | |
| Elongation in percent | 1.8 | 1.2 |
| Izod impact in ft. lbs./inch notch | | 1.2 |

SHEETS CONTAINING FIBRIDS FROM VINYL POLYMERS

A particularly desirable embodiment of the present invention is one wherein the fibrids are formed from the class of synthetic addition polymers consisting of the group: (1) copolymers containing 2 to 80% acrylonitrile and (2) polymers and copolymers containing at least 80% vinyl chloride, characterized by a high level of bonding capacity for fibers from acrylonitrile polymers in the manufacture of paper-like products wherein the fibrous masses are bonded by polymer flux means and the resulting structure has excellent resistance to chemicals and ultraviolet light.

EXAMPLE 157

*Terpolymer fibrid bound sheet*

A quantity of an aqueous dispersion of a terpolymer comprising the reaction product of 35 parts acrylonitrile, 60 parts butyl acrylate and 5 parts methacrylic acid, produced in accordance with the teaching in United States Patent 2,787,603, is tray dried in an oven until substantially free of moisture. The dried polymer is dissolved in sufficient dimethyl formamide to form a 7% solution.

One part of the 7% solution of the terpolymer in dimethyl formamide is introduced as a fine stream into 12 parts of water at about 70° F. while the water is being vigorously agitated. Upon entering the turbulent water, the polymer is precipitated from the solution in the form of fibrids. By means of a 100-mesh screen, the fibrids are filtered from the mixture of water and dimethyl formamide. While still on the screen, the fibrids are washed with water. A slurry is prepared by dispersing 0.2 part of the above described fibrids in 100 parts of water.

Separately, a fiber slurry is prepared by thoroughly dispersing 0.2 part of ¼ inch, 2 denier polyacrylonitrile staple fibers in 100 parts of water containing 0.05 part of Triton X-100 octyl phenol polyglycol ether, a non-ionic wetting agent.

Thirty parts of the fiber slurry and 70 parts of the fibrid slurry are uniformly blended to form a slurry containing 30 parts of fibers and 70 parts of fibrids. The blended slurry is filtered on a paper-makers 100-mesh screen with the aid of vacuum, using sufficient volume of the slurry to deposit about 3.5 ounces per square yard of the fiber/fibrid mixture (dry weight basis) on the screen. The resulting vacuum-drained sheet is removed from the screen and dried on a paper drier heated to about 250° F. Microscopic examination reveals that the staple fibers in the dried sheet are randomly dispersed amongst the mass of interlocked fibrids.

The dried sheet is pressed between two thin release sheets of polytetrafluoroethylene coated glass fabric for one minute at 830 pounds per square inch in a hydraulic press with both platens heated to about 375° F. During the heating and pressing operation, the fibrids are fused to form a matrix for the fibers. It is important that the temperature be sufficient to fuse the fibrids into a matrix and insufficient to destroy the fibrous character of the fibers.

When cooled to room temperature, the consolidated sheet is ready for use as an electrical insulation material in hermetically sealed motors for refrigeration systems, wherein the insulation is exposed to lubricating oils and refrigerants of the class consisting of chloralkanes, chlorofluoroalkanes and bromoalkanes. The electrical insulation material of this example inhibits the objectionable copper plating that occurs in some refrigeration systems using the refrigerants mentioned above.

The product of this example has the following properties:

Weight _____ 3.5 ounces/sq. yd.
Thickness _____ 5.0 mils
Dielectric strength (using ¼″ electrode, 60 cycle current as per ASTMD–149–55T) _____ 1200 volts/mil thickness
1″ strip tensile:
  Strength machine direction _____ 25 lbs.
  Trans. machine direction _____ 25 lbs.
Elongation to break:
  Machine direction _____ 20%
  Trans. machine direction _____ 25%
1″ strip crease tensile:
  Strength (#10 roller)
  Machine direction _____ 25 lbs.
  Trans. machine direction _____ 25 lbs.
Elmendorf tear strength:
  Machine direction _____ 95 g.
  Trans. machine direction _____ 105 g.

The tensile, tear and elongation tests of this example are carried out by the methods described in Federal specification Textile Test Methods, CCC–T–191b, dated May 15, 1951.

In Examples 158–168 below, each of the fibrids prepared from polymeric compositions in Table XI is made by pouring during a period of about 2 minutes about 30 grams of the polymer solution, at the concentration indicated in Table XII, as a thin even stream into about 400 ml. of the polymer precipitant, also identified in Table XII, while the precipitant is being stirred in a 1-quart Waring Blendor at 12,330 revolutions per minute. Thirty parts of the washed fibrids so formed are then blended with 70 parts of ¼″ length, 2.5 denier per filament staple formed from a copolymer containing 94% acrylonitrile and 6% methyl acrylate in an aqueous slurry containing 0.05% solids. This furnish is then poured into the headbox of a sheet mold to produce a 3-gram sheet. Vacuum is applied to the reservoir of the sheet mold before the gate valve releasing the water from the headbox is opened. When the gate is opened the waterleaf is deposited rapidly on an 8″ x 8″ 100-mesh screen. The screen with its waterleaf is placed between blotting paper, where the water is removed by rolling with a steel rolling pin. The sheet is then removed from the screen and dried in a sheet drier for 10 minutes at a surface temperature of 100° C. and thereafter pressed between ⅛″ thick films of polytetrafluoroethylene at the conditions as determined by experiment to obtain the optimum physical properties for that sheet to give a basis weight of about 2.0 ounces per square yard. The pressing conditions and the dry tenacities of the products are given in Table XIII.

Table XI

| Ex. | Monomer Identity | Percentage monomers |
|---|---|---|
| 158 | AN[1]/styrene | 30/70 |
| 159 | AN/methyl styrene | 30/70 |
| 160 | AN/methyl acrylate | 75/25 |
| 161 | AN/n-butylacrylate/methacrylic acid | 63/32/5 |
| 162 | AN/isobutylene | 80/20 |
| 163 | AN/vinylidene chloride | 30/70 |
| 164 | AN/n-butyl acrylate/methyl methacrylate | 35/60/5 |
| 165 | VCl[2] | 100 |
| 166 | VCl/vinyl acetate | 97/3 |
| 167 | ___do___ | 87/13 |
| 168 | VCl/vinylidene chloride | / |

[1] Acrylonitrile.
[2] Vinyl chloride. (These fibrids have a Canadian Standard Freeness of 268, a water absorptive capacity of 6.7 grams/grm and a surface area of 10 m.²/gram. They form a handsheet with a dry tenacity of 0.36 gpd and a rewet tenacity of 0.09 gpd.)

Table XII

| Ex. | Solvent | Percent solids in sol'n. | Precipitant |
|---|---|---|---|
| 158 | Methyl ethyl ketone | 15 | Water. |
| 159 | ___do___ | 15 | Do. |
| 160 | Dimethylformamide | 10 | Glycerine. |
| 161 | ___do___ | 6 | Ethylene glycol. |
| 162 | ___do___ | 10 | Ethylene glycol/H₂O (87/13). |
| 163 | ___do___ | 10 | Glycerine. |
| 164 | Acetone | 6 | Water. |
| 165 | Methyl ethyl ketone | 10 | Glycerine. |
| 166 | ___do___ | 10 | Ethylene glycol. |
| 167 | ___do___ | 20 | Glycerine/H₂O (50/50). |
| 168 | Dimethylformamide | 15 | Glycerine/H₂O (75/25). |

Table XIII

| Ex. | Temp. ° C. | Pressure (p.s.i.) | Dry tenacity, lb./in./oz./yd.² |
|---|---|---|---|
| 158 | 160 | 600 | 8.3 |
| 159 | 160 | 600 | 8.3 |
| 160 | 130 | 500 | 8.9 |
| 161 | 135 | 600 | 8.1 |
| 162 | 170 | 600 | 9.4 |
| 163 | 130 | 500 | 7.9 |
| 164 | 135 | 600 | 7.4 |
| 165 | 170 | 600 | 7.6 |
| 166 | 170 | 600 | 7.3 |
| 167 | 150 | 600 | 7.5 |
| 168 | 160 | 600 | 7.5 |

EXAMPLE 169

A mixture of 67 grams of a copolymer of acrylonitrile and styrene 30/70% by weight, 602 grams of N,N-dimethylformamide and 6.7 grams of Daxad 11 (a condensation polymer of sodium naphthalene sulfonate and formaldehyde made by Dewey and Alney Chemical Co. of Cambridge, Mass.) are stirred at room temperature until the polymer dissolves. Some solution is then poured in a thin even stream into a 1-quart Waring Blendor can containing 390 ml. of ethylene glycol and 10 ml. of water at room temperature. The Waring Blendor is operated at 100 volts. The resulting mixture of fibrids is filtered and washed with water. It has a Canadian standard freeness of 90. The washed fibrids are blended with various proportions of 1.0 denier per filament staple fibers made from the copolymer acrylonitrile/methyl acrylate (94/6%) and hand sheets made as in Examples 158–168. The hand sheets are dried on a sheet drier at 95° C. The dry sheets are then fused (without pressing) for 30 seconds at 195° C. in a circulating air oven. This time and temperature of fusing has been determined to give the optimum tensile strength to the hand sheets. The results are given below in Table XIV.

Table XIV

| Sheet composition | | Fused sheet properties | | |
|---|---|---|---|---|
| Percent fibrids | Staple length (inches) | Tenacity, lb./in./oz./yd.² | Elongation, percent | Tongue tear, lb./oz./yd.² |
| 20 | ¼ | 4.6 | 6.3 | 0.38 |
| 30 | ¼ | 6.2 | 10.6 | 0.44 |
| 40 | ¼ | 7.1 | 11.6 | 0.33 |
| 50 | ¼ | 7.9 | 13.5 | 0.25 |
| 40 | ⅛ | 7.1 | 11.6 | 0.33 |
| 40 | ½ | 7.9 | 13.6 | 0.46 |
| 40 | ¾ | 7.1 | 12.5 | 0.59 |

All fused sheets have a basis weight of 2 oz./yd.² and a Sheffield porosity of greater than 70 cubic feet/minute/sq. in. at 10 p.s.i. The latter is measured on a Porosimeter made by the Sheffield Corporation of Dayton, Ohio. Such fused sheets are softer than pressed sheets and have the appearance and handle of non-woven fabrics rather than papers. The use of 40 to 50% by weight of the fibrids is preferred where maximum tensile properties are desired. For the purpose of making fused sheets the fibrids having a freeness of no greater than about 350 are preferred.

FIBRIDS IN CELLULOSIC PAPER

EXAMPLE 170

*Fibrids blended with cellulosic papermaking pulps*

A 10% solution (20 grams) of 66 nylon in formic acid is poured into 300 ml. of a 0.3% sodium carboxymethyl cellulose solution in a one-quart Waring Blendor operating at full speed. The fibrids obtained are blended with 2 grams of kraft pulp suspended in 4 liters of water and the blend deposited on a 100-mesh screen. The sheet is washed thoroughly with water and removed from the screen by the customary couching technique. The sheet is then calendered at 90° C. until it is reduced to an 8 mil sheet with the following properties: tenacity (dry)=0.26 g.p.d., (wet)=0.03 g.p.d., elongation (dry)=13%, (wet)=9%. The wet and dry elongation of the sheet and its wet tenacity are much higher than a sheet prepared in the same manner from the kraft pulp alone.

FIBRIDS CONTAINING INSOLUBLE PARTICLES

EXAMPLE 171

*Fibrids containing asbestos*

Caprolactam, hexamethylenediamine and adipic acid are copolymerized to form a copolymer which contains 80% caprolactam and 20% (by weight) hexamethylene adipamide units. This copolymer (flake) is ball milled for ½ hour or longer with ⅓ its weight of Poaminco asbestos fiber grade A (Arthur H. Thomas Company, Philadelphia, Pa.) that has been micronized to an average length of about 0.001". The mixture of polymer and asbestos (212 grams) is added to a solution of 54 grams of anhydrous CaCl₂ in 846 grams of methanol and the mixture heated at reflux to give a viscous solution. A 15 ml. portion of the solution is slowly poured into 50% (by volume) aqueous glycerine at room temperature in a Waring Blendor operating at 110 volts. The fibridation is repeated and the combined fibrids washed in a sheet mould with water.

An aqueous slurry containing approximately 2.1 grams of ¼" 3 d.p.f. 66 nylon staple is prepared by stirring the fibers previously wet with 5% aqueous Triton X-100 with 4 liters of water. To this slurry is added 0.9 gram of the fibrids produced above to produce a final slurry containing fibers and fibrids in a 70/30 ratio. Hand sheets are prepared by depositing this slurry on a 100-mesh screen (8" x 8"). The sheets are dried at 90° C. The dried sheets are pressed at 188° C. and 600 p.s.i. for 15 seconds to afford a paper (0.008" thick containing 25% asbestos) with a tensile strength of 15.5 lbs./in./oz./yd.².

Handsheets made in a similar manner but with no asbestos have a tensile strength of 15.4 lbs./in./oz./yd.².

Similar results are obtained when fibrids of the copolyester polyethylene terephthalate/isophthalate (80/20 by weight) containing 25% asbestos are used to bond fibers of polyethylene terephthalate. Similar results are obtained with short glass fibers, wood pulp and the like, in the fibrids.

EXAMPLE 172

*Fibrids containing sand*

35 grams of sand (80–100 mesh) are added to 20 grams of a 15% solution of a copolyamide (made of caprolactam and hexamethylene adipamide 60/40 by weight) in methanol/CaCl₂ 96/4 as a solvent. The mixture is stirred and added in a thin even stream to 1 liter of 70% aqueous glycerol at room temperature that is agitated strongly in a Waring Blendor. The resulting fibrids are washed twice with water and then re-dispersed in one gallon of water in a large Waring Blendor at high speed. This is then added to an aqueous dispersion containing 4.5 grams of 66 nylon filaments, 6 d.p.f., ½" length, and a hand sheet formed on a screen. The hand sheet is dried on a sheet drier at 90° C. After pressing at 170° C. at 2400 p.s.i. for 25 minutes the smooth (non-abrasive) sheet has a tensile strength of 1530 p.s.i. Analysis of the final fused sheet shows a composition of 82.5% sand, 7.0% of the polymer from the fibrids, and 10.5% of the polymer from the cut filaments. The sand is uniformly dispersed throughout the fused structure. This product can be used for all types of construction applications.

Using the above technique similar high loadings of inert fillers such as bronze powder, metal filings, pigment, electroluminescent phosphors and the like, are incorporated in the fibrids in amounts up to 90% yielding strong novel structures which have the additive uniformly dispersed throughout.

In general, up to about 90% of any solid particulate substance having a particle size smaller than about 30 mesh, and which is insoluble in the polymer solvent used in the preparation of fibrids can be incorporated in the fibrids in this manner. Such products are not obtainable by other means as for example, casting of films which requires much smaller particle size and also does not offer the uniformity of disperson that is obtained by this method.

THERMOSETTING RESIN FIBRIDS

EXAMPLE 173

*Polyepoxide resin fibrids*

A solution consisting of 7 grams of an epoxide resin (Epon 1009 made by the Shell Chemical Corporation, 380 Madison Avenue, New York 17, N.Y., with a postulated structure as follows:

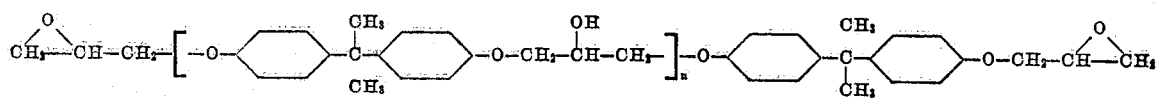

having a melting point of 145–155° C.), 0.1075 grams of methylene dianiline (as a curing agent for the epoxide resin) and 14 grams of tetrahydrofuran is prepared and poured as an even stream into 400 ml. of a 0.25% aqueous solution of carboxymethyl cellulose at 12° C. that is stirred in a Waring Blendor being operated at 70 volts. The fibrids are washed with water in a sheet mold and re-slurried to give a 0.3% dispersion. This is mixed with a dilute dispersion of 66 nylon filaments (1.5 d.p.f., ¼" length) and a hand sheet prepared containing 70% fibers and 30% fibrids. After drying and then pressing at 175° C. at 640 p.s.i. for 60 seconds the sheet has a tensile strength of 11.3 lbs./in./oz./yd.$^2$ and a basis weight of 2.14 oz./yd.$^2$.

Strong sheets are also formed from the fibrids alone.

EXAMPLE 174

Alkyd resin fibrid

A 50% solution of a solid diallyl phthalate prepolymer (Dapon 30 made by the Food Machinery and Chemical Corp. of Nitro, W. Va.) containing 1% of the catalyst di-t-butyl perphthalate (based on polymer) is fibridated into ethylene glycol in a Waring Blendor. The fibrids are washed and re-slurried.

20 cc. of 20% sodium hexamethaphosphate and 4 cc. of Triton X-100 are stirred into 6 liters of water. To this is added 58 grams of fibrids made above and subsequently 29 grams of chrome-finished glass fibers. The mixture is stirred 5 minutes at high speed and at room temperature. The mixture is deposited on a laboratory hand sheet mold in the usual manner, removed from the screen, and dried at 60° C. in a circulating air oven. The hand sheet is then compression molded at 170° C. with 100 p.s.i pressure in an 8" x 8" mold for 10 minutes and cooled under pressure. The sheet has the following properties:

| | |
|---|---|
| Tensile strength | 8,200 p.s.i |
| Tensile elongation | 0.86% |
| Tensile modulus | 1,300,000 p.s.i |
| Flexural strength | 17,000 p.s.i. |
| Flexural modulus | 1,500,000 p.s.i |
| Izod impact strength | 3.1 ft./lbs./in. of notch. |

This composition is well suited for use as automotive panel, refrigerator doors, and the like.

All manner of thermosetting resins can be used to make the fibrids of this invention. They of course should be solid at the temperatures of fibridation and must be soluble when made by the shear precipitation process. In many instances it is advantageous to include a polymerization catalyst in the fibrid to facilitate the final curing.

Epoxide resins are of great utility. Such resins have an ether oxygen atom linked to 2 vicinal carbon atoms and can be made by the reaction of an epi halohydrin with a polyhydric phenol and/or a polyhydric alcohol such as ethylene glycol, propylene glycol, and the like. Phenolic resins, such as phenol-formaldehyde resitoles of all types and partially polymerized polyester resins, in particular the alkyd type, may be used. Also suitable are partially polymerized products from addition type monomers with a functionality greater than 2 either alone or as co-monomers such as acrylic or methacrylic esters of a polyhydric alcohol (e.g., glycol methacrylate), divinyl sulfide, vinyl allyl ketone, allyl methacrylate, divinyl ether, and divinyl acetylene.

SHEETS FORM LOW PRESSURE FUSION

In general, non-woven structures containing fibrids show a considerable degree of tensile strength without the application of heat or pressure, because of the unique and advantageous bonding properties of fibrids. However, as has already been shown, the strength of such sheets can be increased by combination of heat and pressure treatment. However, it is also possible to obtain sheets of high strength by fusion-bonding, i.e. fusing the fibrids, without pressure. Such treatment gives non-woven structures which are characterized generally by a high degree of softness, bulk and porosity. They resemble non-woven fabrics rather than paper and are suitable for such uses as apparel interliners, disposable draperies and surgical masks. Fused papers from crimped fibers are exceptionally interesting because of their soft and pleasant handle.

Fusion bonding can be carried out by passing the dried sheet between a bank of infrared heaters, by drawing the sheet over a heated calender roll without pressure, by heating individual sheets in an extended condition in the interior of an oven and by other similar process treatments. The sheets can also be fused in a press employing a minimum of contact pressure, and under such circumstances sheet shrinkage is minimized.

Fusing temperatures will, of course, be determined by the melting points of the fibrous components in the sheet structure. In general, fusion temperature is desirably at least 30° below the melting temperature of the polymer used in the preparation of the staple fiber component. For many composite sheets containing polyamide, polyester or acrylic polymer fibrids, fusion temperatures between 180° C. and 230° C. are preferred.

EXAMPLE 175

Fused copolyamide fibrids

A hand sheet containing 70% by weight of the copolyamide paper binder described in Example 14 and 30% of ¼" length 1.5 denier per filament 66 nylon staple fibers is heated in an oven at 220° C. for 30 seconds without pressure. The resulting sheet has a tensile strength of 8.5 lbs./in./oz./yd.$^2$, an elongation of 45%, a tongue tear strength of 0.29 lb.in./oz./yd.$^2$, and it is softer and more flexible than calendered sheets of the similar composition.

EXAMPLE 176

Fused copolyester fibrids

A composite polyester waterleaf is prepared using fibrids formed by precipitating 30 grams of a 10% solution of a copolyester containing 80% polyethylene terephthalate and 20% polyethylene isophthalate in trifluoroacetic acid using as a precipitant a mixture of 350 ml. of glycerol and 50 ml. of water in a Waring Blendor operated at 14,000 r.p.m. A sheet is prepared containing 40% by weight of this fibrid and 60% by weight of ¾" 3 denier per filament polyethylene terephthalate fiber staple. The fibrids and staple fibers are slurried together in the usual manner, and a hand sheet is formed on a 100-mesh screen. The sheet is dried at 120° C. and then placed in an oven at 225° C. for 30 seconds. The fused structure has a tensile strength of 11.1 lbs./in./oz./yd.$^2$ with an elongation of 38% at breakage, a tongue tear strength of 1.3 lb./oz./yd.$^2$, and Mullen burst strength of 36 lbs./sq.in/oz./yd.$^2$.

EXAMPLE 177

Fused acrylic fibrids

A fused structure following the technique of the previous example is prepared using the acrylic polymer fibrids of Example 6 and 50% one denier per filament ¼" acrylic staple fiber from a fiber-forming copolymer of 94% acrylonitrile and 6% methyl acrylate. The fused structure has a tensile strength of 7.9 lbs./in./oz./yd.$^2$ and an elongation of 14%.

THIN PAPERS

Fibrids are particularly desirable for the preparation of thin strong papers from wholly synthetic fibers. Fibrids, of course, can be used to make papers of any weight, and some of the most valuable applications of fibrids are concerned with heavy papers for high strength uses. In addition, however, the same advantageous features shown by fibrids in other applications are found to be retained when very light weight papers are made. In particular, wholly synthetic fibers and fibrids can be combined to make thin strong papers, i.e. papers with a basis weight below about 1.0 oz./yd.$^2$. Papers of this extremely low weight are unusual and in the past have been found to have a limited utility because of their low wet strength retention. Cellulosic pulp papers retain only 2 to 3% of their dry strength when wetted, although if treated with resins, such papers sometimes can be found to have a 20% retention of the dry strength on wetting. However, by the use of fibrids, the 20% level of wet strength retention is a minimum, and, when papers of this low weight are calendered as shown in the examples below, wet strength retention of at least 40% is achieved. Papers of this type, for example those made from polyamide fibrids and polyamide fibers, with a basis weight of about 0.08 oz./yd.$^2$, provide an excellent soft, strong, abrasion resistant wrapper for sanitary fabrics suitable for applications where gauze is now used.

EXAMPLE 178

*Thin sheet using copolyamide fibrid*

Fibrids are prepared by adding 30 grams of a 10% solution of a copolyamide of 80% caprolactam and 20% hexamethylenediamine adipamide in a mixture of 93% methanol and 7% calcium chloride in an even stream to a mixture of 350 ml. of glycerol and 50 ml. of water in a 1-liter Waring Blendor operating at highest speed. The fibrids obtained are filtered and washed with water until free of organic liquids. They are redispersed in water in a Waring Blendor and diluted to a consistency of 0.2%.

1.5 denier 66 nylon filaments are cut with a paper cutter to ¼″ lengths. The physical properties of these filaments are: tenacity 4.4 g.p.d., elongation 28%, and modulus 14 g.p.d. 0.4 gram of these fibers are then wetted with 10 ml. of a 5% solution of a nonionic wetting agent and added to 3.5 liters of water in a beaker. The fibers are suspended in the water with the aid of a Vibromixer (made by A. G. für Chemie-Apparaturbau of Zurich).

100 ml. of the fibrid suspension are then added to the fibrous suspension. This furnish is then poured into the headbox of a sheet mold holding about 2 liters of water to produce a slurry of desired composition at a total consistency (solids content) of about 0.01%. Vacuum is applied to the reservoir of the sheet mold before the gate valve releasing the water from the headbox is opened. When the gate is opened, the waterleaf is deposited rapidly on an 8″ x 8″ 100-mesh screen. After the sheet is formed, a screen is placed on top of it and the waterleaf washed thoroughly with water. It is then removed from the screen and dried in a sheet drier between paper towels for 5 minutes at a surface temperature of 90° C. Thereafter it is pressed under a pressure of 625 p.s.i. at 200° C. between 0.005 inch aluminum foils for 15 seconds. The sheet product, containing 33⅓ fibrids by weight, has a basis weight of 0.43 oz./yd.$^2$, a tensile strength of 12.8 lbs./in./oz. yd.$^2$ and a tear strength of 0.79 lb./oz./yd.$^2$. When the fibrid content of the sheet is reduced to 30% by weight, the basis weight of the sheet increases to 0.46 oz./yd.$^2$ and the tensile strength is 8.0 lbs./in./oz./yd. at an elongation of 23%.

The above structure is modified by the use of 3 denier, ½″ long staple of 66 nylon having a tenacity of 4.6 g.p.d., an elongation of 18% and an initial modulus of 11 g.p.d. and a fibrid content of 50%. The fibrid is fused without pressure at 210° C. for 30 seconds. The thin sheet product has a basis weight of 0.5 oz./yd.$^2$, a tensile strength of 6.03 lbs./in./oz./yd.$^2$ and a tear strength of 0.65 lb./oz./yd.$^2$.

EXAMPLE 179

*Acrylic staple-copolyamide fibrid*

A thin sheet is prepared using as binder 30% weight of the fibrids of Example 178 and as the staple component a synthetic fiber of 96% acrylonitrile 6% methylacrylate, ⅛ inch in length, having a denier of 0.79, a tenacity of 4.5 g.p.d., an elongation of 10.6% and an initial modulus of 99.9 g.p.d. The sheet is pressed under 450 p.s.i. at 180° C. for 8 seconds. The sheet has a basis weight of 0.28 oz./yd.$^2$, a tensile strength of 6.8 lbs./in./oz./yd.$^2$, a wet tensile at 70° F. of 2.65 lbs./in./oz./yd.$^2$, a thickness of 0.6 mil, a tongue tear of 0.28 lb./oz./yd.$^2$, a Mullen burst strength of 17 p.s.i./oz./yd.$^2$ and an elongation of 7.5%.

When the above procedure is modified to provide a binder content of 25% by weight of fibrids and the fusion of fibrids is accomplished without pressure at 200° C. over an 8 second interval, the product has a basis weight of 0.66 oz./yd.$^2$, a tensile strength of 6.4 lbs./in./oz./yd.$^2$, a wet tensile strength at 70° F. of 2.24, a thickness of 5.0 mils, a tongue tear of 0.23 lb./oz./yd.$^2$, a Mullen burst strength of 20 p.s.i./oz./yd.$^2$ and an elongation of 8.5%.

EXAMPLE 180

*Acrylic staple-acrylic fibrids*

A one denier, ¼″ long staple of the acrylonitrile copolymer described in Example 179, together with PFX-36 (a polyoxyethylene dispersant) is dispersed in a suspending vessel to form an aqueous dispersion containing 0.023% fibers. In another suspending vessel, fibrids from a coplymer from 70% styrene and 30% acrylonitrile are dispersed in water to a concentration of 0.033%. The two dispersions are fed through a mixing T to form a liquid containing the solids in a rtaio of 70% fibers to 30% binder to a paper-making machine in which the 70 x 70 mesh screen travels at a speed of 7 feet per minute. The fibers are deposited as a web on the 30″ wide Fourdrinier wire and much of the H$_2$O is removed as the wire passes over vacuum boxes and the suction couch rolls. After the couch roll, the web of fibers and binder is peeled from the wire and transferred to the moving felt of the wet-press section. The moving endless felt carries the web between press rolls where additional H$_2$O is pressed from the sheet. The sheet is then transferred from the felt to a series of steam heated drying cans, where the remaining water is driven off. The dried sheet leaving the last drying can passes between six 3,000 watt radiant heating panels operated at about 40% of rated voltage. The six radiant panels are arranged in banks of three which are located at a distance of 4″ on either side of the sheet passing between them. The fused paper has a basis weight of 0.29 oz./yd.$^2$, a tensile strength of 1.9 lbs./in./oz./yd.$^2$, an elongation of 2.0%, and a tongue tear strength of 0.22 lb./oz./yd.$^2$.

A sheet made on the paper-maker's machine in the same manner but having a basis weight of 0.42 oz./yd.$^2$ has a tensile strength of 4.3 lbs./in./oz./yd.$^2$, an elongation of 3.6% and a tongue tear strength of 0.29 lb./oz./yd.$^2$.

EXAMPLE 181

*Polyester staple-polyester fibrid*

The copolyester fibrids of Example 176 is used as a binder (25% by weight) for ¼″ long 0.5 denier per filament staple of poly(ethyleneterephthalate) having a tenacity of 3.4 g.p.d., an elongation of 60% and an initial modulus of 50 g.p.d. Fibrid fusion is under a pressure of 700 p.s.i. at 190° C. for 120 seconds between sheets of poly (tetrafluoroethylene). The sheet product has a basis weight of 0.11 in./oz./yd.$^2$ and a tensile strength of 9.9 lbs./in./oz./yd.$^2$ The above examples demonstrate that the present invention provides fully synthetic thin papers of high strengths. For some of the utilities of such structures, a slight modification at times improves their aesthetic appearance. Thus a patterned paper can be made by depositing the waterleaf on a patterned screen. By blocking off some spots of a paper-maker's screen, for instance with paint, the waterleaf produced on this screen will show holes corresponding to those spots. This is shown in the following example:

EXAMPLE 182

*Thin sheet—patterned*

A hand-sheet mold screen is covered with parallel strips of masking tape approximately 3⁄32″ wide. This first layer of parallel masking tape strips is covered by a second layer of parallel masking tape strips of the same width, intersecting the first layer at an angle of about 50°, but with a different distance between the strips, creating, when sprayed with enamel paint, a parallelogram patterned screen in which two opposite sides of the parallelogram are about $\%_{16}''$, the other two sides $\%_{32}''$. A 0.3 oz./yd.² 66 nylon fibrid paper made in this sheet mold showed this desired patterned effect. Due to a fine "grid" of fibers across the small holes, this paper has an excellent clingability and considerably less resilience as compared to ordinary paper. The paper folds well around sanitary napkins, cotton, or other soft materials and "binds" somewhat to it. The directionality induced through the pattern adds to the strength of this wrapper making it comparable in pounds per inch strength to conventional sanitary napkin wrappers with basis weight 0.5 oz./yd.².

The technique may also be used to make very bulky, light weight papers. Such products are made by deeply embossing two light weight papers and laminating those two sheets back to back using adhesive or quilting techniques. By this method, a structure having a density of only 0.01 gram/cc. can be formed. Such structures are useful as inner liners, as stuffing materials, and as thermal and electrical insulation media. Where the synthetic polymer is wholly combustible, they are useful as cigarette papers.

FOAM SLURRIES

In the preparation of non-woven sheet products by the use of the fibrids of the present invention, it has been found to be advantageous to employ a "foam" dispersion of staple fibers to obtain a high degree of sheet uniformity. This is particularly useful when the staple fibers are strongly hydrophobic, unusually long or highly crimped. When such fibers are dispersed in a foam, such as a "soapy" foam, instead of being formed into the conventional water slurry, the staple fibers are deposited on the screen in a highly uniform web. The deposition of webs from a foam dispersion yields increased orientation of the staple fibers perpendicular to the plane of the sheet. In spite of this increased degree of perpendicular orientation, it is possible, when fibrids are also present in the dispersion, to obtain a high degree of bonding with a resulting high degree of strength in the waterleaf.

In general, one satisfactory method of operating employing this particular process is to combine water, foaming agent such as octylphenyl polyglycol ether, soap, or liquid synthetic detergents with the fibers which are to be dispersed. The above combination of components is subjected to sufficient agitation to convert substantially all of the water from a continuous phase to a foam. In this process, the fibrous materials are uniformly dispersed through the foam. The foam with the fibers and fibrids dispersed therein can desirably be poured into a paper-forming box having a screen in the bottom and containing sufficient water over the screen to cover it with about two inches of water. As soon as the aqueous foam containing the fibers is poured into the box, the water and foam can then be exhausted from the bottom in the normal manner, whereby the fibers and fibrids are uniformly deposited into a strongly bonded waterleaf on a screen in a three-dimensional arrangement. Conventional paper-making machines can also be used in this process in a similar manner.

EXAMPLE 183

*Waterleaf deposited from foam*

The following composition is prepared:

| | Parts by wt. |
|---|---|
| Polyvinyl chloride (Geon 101) | 5.0 |
| Di(2 ethyl hexyl) phthalate | 2.8 |
| Pigments and fillers | 2.0 |
| Epoxidized soya bean oil (Paraplex G-62) | 2.9 |
| Methyl ethyl ketone | 87.3 |
| | 100.0 |

The above composition is prepared by grinding the pigments and fillers in the di(2 ethyl hexyl) phthalate and the epoxidized soya bean oil. The polyvinyl chloride is dissolved in the methyl ethyl ketone at about 60° C. The pigment-plasticizer mill base is thoroughly mixed in the polyvinyl chloride solution. One part of the polyvinyl chloride solution at about 60° C. is poured as a fine stream into about 40-50 parts of water at about 25° C. while the water is vigorously agitated. Upon entering the turbulent water, the fine stream of pigmented and plasticized polyvinyl chloride is rapidly precipitated from solution as fibrids. The fibrids are well frazzled and of irregular shape. By means of a 100-mesh screen, the fibrids are filtered from the mixture of water and methyl ethyl ketone. While still on the screen, the fibrids are washed with water until substantially free of methyl ethyl ketone.

To 1,000 parts of water is added 2 parts of "Triton" X-100 (octylphenyl polyglycol ether), 72 parts of the water wet fibrids (23.6 parts dry fibrids) and 4.4 grams of crimped polyethylene terephthalate fiber ½" long and 3.5 denier per filament having 8-9 crimps per inch. The water containing the foaming agent, fibers and fibrids is vigorously agitated to convert the water to a foam with the fibers and fibrids dispersed throughout. The foamed fiber-fibrid dispersion is poured into a paper forming box while a vacuum is being applied to the bottom of the box. The fibrids and fibers are immediately deposited uniformly on the screen in the form of a web, the fibers and fibrids being uniformly distributed amongst each other. The web is removed from the screen and dried. The dry web is pressed for 3 minutes at 350° F. at a pressure of about 75-100 pounds per square inch to fuse or weld the fibrids together without destroying the fibrous character of the fibers. The product is a fiber reinforced plastic sheet about 21 mils thick and weighing about 20 ounces per square yard. It is useful as an upholstery material.

As illustrated above, in the preparation of waterleaves and other non-woven structures containing a mixture of fibrids and staple fibers, particularly useful products are obtained when the staple fibers are in a crimped condition. Such crimping can be achieved by many well known mechanical, thermal, or chemical treatments. Mechanical crimp can be induced into the staple fibers in the form of a tow prior to cutting the fibers into staple length or equally well by proper treatment of the staple fibers themselves after cutting. Many natural staple fibers can also be used, such as wool and cotton, which have a natural crimp. In addition, it is possible to employ staple fibers which because of sensitivity to thermal or chemical treatment can be caused to develop crimp at a particular stage in processing, for example staple fibers of non-homogeneous cross-section can be made in such a way that, by the application of a moderate degree of heat, they exhibit differential shrinkage resulting in crimp. Similar phenomena can be used to cause crimping of fibers by treatment with steam or aqueous solutions. All these kinds of staple fibers can be employed in conjunction with fibrids to give a composite sheet containing crimped staple fibers. Such composite sheets are advantageous and desirable because the presence of the crimped staple fibers gives a desirable bulkiness and flexibility to the fibrid-bonded sheet both in the composite sheet without fusion and in the consolidated products.

FIBRID VS. BEATEN STAPLE SHEETS

EXAMPLE 184

*Fibrid vs. prior art*

Wet spun, 3-denier polyacrylonitrile textile filaments are chopped to about ¼" to 1" length, slurried with water to a consistency of 1% and beaten in a 1-pound Valley laboratory beater with 10 pounds on the bedplate arm as described in Example 1 of United States Patent 2,810,646. A handsheet prepared from these structures is too weak to be tested wet and too weak to be couched. Upon air drying at room temperature the structure has a tensile strength of below 0.0005 g.p.d. (estimated).

Another sample of the same wet spun filaments is dissolved in dimethylformamide to give a 13% by weight solution, and from this solution fibrids are formed by shear precipitation into glycerol, using a Waring Blendor operated at full speed. The fibrids are collected, washed and redispersed in water to form a hand-sheet with a couched wet tenacity of 0.0032 g.p.d.

Fibrids can be formed by sheer precipitation from any soluble, synthetic, preferably fiber-forming polymer as well as from any condensation polymer which can be formed by interfacial spinning. As previously mentioned it is convenient in considering such polymers to classify them as "hard" and "soft" polymers.

"HARD" POLYMERS

Suitable hard polymers include acrylonitrile polymers and copolymers, such as those formed by acrylonitrile with methyl acrylate or vinyl chloride; polyacrylic and polymethacrylic esters, such as poly(methyl methacrylate) poly(vinyl chloride) and copolymers of vinyl chloride with vinyl esters, acrylonitrile, vinylidene chloride, and the like; vinylidene chloride polymers; polymers and copolymers from hydrocarbon monomers, such as styrene, ethylene, propylene and the like, especially copolymers of these monomers with acrylonitrile and/or vinyl chloride; polymers from cyclic acetals; polychlorotrifluoroethylene; poly(vinyl alcohol); partially hydrolyzed poly(vinyl esters); polyamides, such as poly(hexamethylene adipamide), poly(ethylene sebacamide), poly(methylene bis[p-cyclohexylene]adipamide), polycaprolactam, and copolyamides, such as those formed from a mixture of hexamethylenediamine, adipic acid, and sebacic acid, or by a mixture of caprolactam, hexamethylenediamine, and adipic acid; polyurethanes; polyureas; polyesters, such as poly(ethylene terephthalate); polythiolesters; polysulfonamides; polysulfones, such as the ones prepared from propylene and sulfur dioxide; polyoxymethylene; and many others. Copolymers of all types may be used. Derivatives of the polymers, such as the halogenated polyhydrocarbons, are also suitable. Fibrids can be prepared from polymers which are tacky at room temperature, such as poly(vinyl acetate) by chilling the soltuion and precipitant below the temperature at which the polymer becomes tacky and/or by incorporating antitack agents in the precipitant.

"SOFT" POLYMERS

Representative "soft" polymers are the plasticized vinyl polymers and the condensation elastomers. The plasticized vinyl polymers are prepared by mixing any suitable plasticizer with a compatible vinyl polymer. The ester type of plasticizer has been found to be quite satisfactory. Plasticized vinyl chloride polymers, including copolymers with vinyl acetate and vinylidene chloride, have been found to be particularly suitable. Fibrids may be made from suitable synthetic rubbers, by the methods applicable to the tacky hard polymers. The properties may then be modified by certain curing procedures. Modified addition polymers such as chlorosulfonated polyethylene are also suitable.

A wide variety of low modulus condensation elastomers are available for preparing fibrids. A condensation elastomer will usually form shaped articles having a tensile recovery above about 75% and a stress decay below about 35%.

Segmented condensation elastomers are prepared by starting with a low molecular weight polymer (i.e., one having a molecular weight in the range from about 700 to about 2500), preferably a difunctional polymer with terminal groups containing active hydrogen, and reacting it with a small coreactive molecule under conditions such that a new difunctional intermediate is obtained with terminal groups capable of reacting with active hydrogen. These intermediates are then coupled or chain-extended by reacting with compounds containing active hydrogen. Numerous patents have been issued in which the low molecular weight starting polymer is a polyester or polyesteramide and the coreactive small molecule is a diisocyanate. A large variety of coreactive active hydrogen compounds is suggested in these patents for preparing the segmented condensation elastomers. Among the most practical chain-extending agents are water, diamines, and dibasic acids.

U.S. 2,692,873 describes similar products in which the starting polyesters have been replaced by polyethers of a corresponding molecular weight range. More recent developments have shown that a number of suitable macromolecular compounds, such as polyhydrocarbons, polyamides, polyurethanes, etc., with suitable molecular weights, melting point characteristics, and terminal groups, can serve as the starting point for preparing segmented elastomers of this type. It has also been found possible to replace the diisocyanate with other difunctional compounds, such as diacid halides, which are capable of reacting with active hydrogen. In addition, elastic copolyetheresters are obtained by condensation of a polyether glycol, an aliphatic glycol, and an aromatic dibasic acid or suitable derivative.

Other types of condensation elastomers are also suitable. U.S. 2,670,267 describes N-alkyl-substituted copolyamides which are highly elastic and have a suitable low modulus. A copolyamide of this type, obtained by reacting adipic acid with a mixture of hexamethylenediamine, N-isobutylhexamethylenediamine, and N,N'-isobutylhexamethylenediamine produces an elastomer which is particularly satisfactory for the purposes of this invention. U.S. 2,623,033 describes linear elastic copolyesters prepared by reacting a glycol with a mixture of aromatic and acyclic dicarboxylic acids. Copolymers prepared from ethylene glycol, terephthalic acid, and sebacic acid have been found to be particularly useful. Another class of condensation elastomers is described in U.S. 2,430,860. The elastic polyamides of this type are produced by reacting polycarbonamides with formaldehyde.

POLYMER SOLUTIONS

Useful solvents or solvent mixtures for preparing solutions to be used in the direct preparation of fibrids by the one-step "shear precipitation" or "fast precipitation" process of this invention should dissolve at least about 5% by weight of the polymer, copolymer, or polymer mixture. When solutions containing concentrations below this level are used, the fibrids obtained on precipitating the polymer tend to be too fine and too small to be useful in such applications as the preparation of sheet products. Most fibridations have been carried out at concentrations below 50%. "Slow" precipitations work most satisfactorily using solutions containing 1–18% polymer. Solutions usually have viscosities between about 10 and about 30,000 centipoises.

POLYMER SOLVENTS

A large variety of organic liquids is suitable for preparing the polymer solutions. The particular solvent chosen will depend upon toxicity, cost, the polymer being used, type of fibrid desired, and the like. As is usual, the best balance between cost and optimum product will be selected. The solvents which have been found most widely useful are polar solvents, such as N,N-dimethylformamide, N,N-dimethylacetamide, m-cresol, formic acid, sulfuric acid, and water. Plasticized vinyl polymers are frequently soluble in common organic solvents, such as acetone, chloroform, and mixtures of chloroform with alcohols, such as methanol. Another useful group of liquids includes those which dissolve the polymer at high temperatures but which are non-solvents at temperatures in the neighborhood of room temperature. Thus, it is possible to use these liquids as both solvents and precipitants by controlling the temperature, as, for instance, ethylene glycol used with polyamides, tetramethylene sulfone used with poly(ethylene terephthalate), and xylene used with polyethylene.

POLYMER PRECIPITANTS

A liquid is suitable as a precipitant if it dissolves no more than about 3% by weight of the polymer. It is preferable, but not absolutely essential, that the precipitant be miscible with the polymer solvent in the proportions used. Some degree of miscibility is, of course, essential. Suitable precipitants are water, glycerol, ethylene glycol, ether, carbon tetrachloride, acetone/hexane and dioxan/hexane mixtures, triethanolamine, etc. Water-miscible precipitants are preferred and aqueous organic mixtures, particularly water-glycerol mixtures, are an important group of precipitants. Glycerol alone or aqueous solutions containing small amounts (i.e., up to about 20%) of water have been found to be the best precipitants for the condensation elastomers, although ethylene glycol has been found to give substantially equivalent results. Aqueous sugar solutions may also be used as precipitants for all types of polymers. For example, the condensation elastomers may be precipitated in sucrose or dextrose solution. The lower alcohols may also be used as precipitants for the condensation elastomers.

Mixtures of solvents and precipitants, such a dilute aqueous solutions of the solvent, have also been found to be useful. For example, polymers dissolved in hydrotropic salt solutions may be precipitated in water or dilute salt solutions. Water alone is desirable for economic reasons and it can be used as a precipitant. Particularly desirable results are obtained when a thickener, such as sodium carboxymethylcellulose, has been added to the water. If fibrids with improved drying characteristics and better affinity for hydrophobic materials are desired, it is preferable to use a nonpolar hydrophobic medium as the precipitant.

Precipitants are operable over a wide range of viscosities, e.g., from about 1 to about 1,500 centipoises. The viscosity of the precipitating medium may be controlled over a wide range by changing the temperature or by the use of additives, including thickeners such as poly(vinyl alcohol). Relatively viscous precipitating media are preferred. The effectiveness of the shearing action provided by the stirrer is enhanced by decreasing the viscosity of the solution and/or increasing the viscosity of the precipitant. Another method of increasing the effectiveness of the shearing medium is to add insoluble particulate material, such as sand or lead shot.

ADDITIVES

Either the precipitant or the solution, or both, may contain additives for modifying the types of slurries and/or the nature of the sheet products obtained. Thus, the precipitant and/or the solution may contain fibrids from the same or different polymers. The precipitant and/or the solution may also contain, in place of, or, in addition to, the fibrids claimed herein, synthetic and/or natural staple fibers, such as those from nylon, poly(ethylene terephthalate), or polyacrylonitrile, staple fibers from cellulose, glass fibers, asbestos, etc. The precipitant and/or the solution may also contain dyes, antistatic agents, surfactants, fillers, such as silica or titanium dioxide, pigments, antioxidants, etc. The addition of these substances to the polymer solution prior to precipitation can produce a marked increase in the tensile strength, tear strength, and tear factor of sheets prepared from the fibrids, when compared to the unmodified sheets. Very interesting and different products may also be obtained by dissolving a mixture of polymers and co-precipitating them. Another modification involves the use of a polymer solution as a precipitant for a solution of a different polymer. Separation of the fibrids is accomplished readily when the polymers are incompatible.

PRECIPITATION NUMBER APPLICABILITY

The lack of dependence of the $P'_A$ values on the nature of the precipitating apparatus can be demonstrated with the aid of a simple $t$ tube. This consists of a straight tube through which the precipitant is passed at high speed. For the case of laminar flow in the tube the precipitant assumes a parabolic flow distribution at equilibrium. The flow velocity is highest in the center of the tube and zero at the wall. The shear rate, on the other hand, is zero at the center and highest at the wall. This highest shear can be expressed by the formula $$R_v = \frac{4\bar{u}}{r_0} \tag{16}$$

in which $\bar{u}$ is the average velocity of the precipitant and $r_0$ is the radius of the tube. (See L. Prandtl and O. G. Tietjens referred to previously.) From this it can be determined that $$P'_A = \frac{V_p}{V_s} \frac{\bar{u}}{r_0} 4t \tag{17}$$

where $V_p, V_s$ and $t$ have the same meaning that they had before.

In utilizing this apparatus the polymer is injected through a hole in the wall of the tube, so that it hits the precipitant at the zone of highest shear, where fibrid formation takes place. The efficiency of this operation can be improved by the use of a modified tube (shown in FIGURE IV), which has about 30 holes distributed around the circumference of the tube.

The general applicability of the $P'_A$ values can be shown in the following manner. A 5% solution of a 94/6 acrylonitrile/methyl acrylate copolymer in N,N-dimethylformamide is precipitated in ethylene glycol in a Waring Blendor under conditions such that the $P'_A$ value is 21,100/sec. Using the same $P'_A$ value and the same solution and precipitant viscosity values for substitution in Equation 17, the flow conditions required to provide the same rate of shear are calculated. When the experiment is run in the tube, as required by the calculations, the fibrids obtained are very similar in appearance to those produced in the Waring Blendor. The properties of the two samples are compared in the following table.

| Property | Waring Blendor | Tube |
|---|---|---|
| Wet sheet tenacity (g./d.) | 0.011 | 0.012 |
| Surface area (m.²/g.) | 56.5 | 63.5 |
| Water absorbency (g./g.) | 7.6 | 10.0 |

The calculation for the tube is based on the assumption of laminar flow. This equation applies only at Reynolds numbers below 2,000. If the Reynolds numbers are higher than this, which can occur quite readily at high throughput, it is necessary to use a different equation, since turbulent flow occurs. The calculations may be based on a layer of laminar flow next to the wall of the tube and a turbulent region in the center of the tube. Thus, the solution entering the side of the tube passes through a layer of laminar shear zone before passing into the turbulent region. Under these circumstances, it is necessary to evaluate the thickness, $h$, of the laminar boundary layer and the depth of penetration, $p$, of a polymer solution droplet into the tube in the time, $t$, (i.e., how far it will travel before precipitation):

$$h = \frac{68.4 r_0}{R_e^{7/8}} \tag{18}$$

$$p = \frac{q 4t}{d^2} \tag{19}$$

where $r_0$ = radius of the tube in cm.
$R_e$ = Reynolds number
$q$ = polymer solution flow through one injection hole in cc./sec.
$d$ = diameter of the injection hole in cm.
$t$ = precipitation time From this, two equations are derived for precipitation under conditions of turbulent flow of precipitant through the tube. If $p$ is greater than or equal to $h$, then $$P'_A = \frac{V_p \bar{u}}{V_s r_0} R^{3/4} \left(0.0282 \frac{h}{p} + 0.0048 t\right) \quad (20)$$

If $p$ is less than $h$, $$P'_A = \frac{V_p \bar{u}}{V_s r_0} R^{3/4} 0.033 t \quad (21)$$

In these equations R is the Reynolds number defined by $$R = \frac{\bar{u} r_0 d_p}{V_p} \quad (22)$$

where $d_p$ is the density of the precipitant. Equations 20 and 21 apply if the Reynolds number is above 2,000.

It is possible to use some non-solvent liquids as solvents for preparing the polymer solutions by the simple expedient of raising the temperature. Fibrids can then be formed by adding the hot polymer solutions to the sheared precipitant, which is usually at room temperature or slightly below. Under these circumstances, the solvent and precipitant can be the same liquid at different temperatures, although it has usually been found under practical operating conditions that it is desirable to dilute the precipitant with some other non-solvent liquid. This technique has been demonstrated in the examples, as, for example, the precipitation of hot ethylene glycol solutions of copolyamides in a water-ethylene glycol precipitant mixture.

Surprisingly, the calculation of $P'_A$ numbers can be carried out in the same manner as has been demonstrated for precipitation of solutions at room temperature. The one important difference is that the diffusion involved here is that of heat rather than of precipitant. The mathematical development of the final equations is identical in both cases, except that the heat diffusion coefficient $\theta$, is substituted for the chemical diffusion coefficient, D, in calculating of X from Equations 12 and 15. It is, of course, necessary to substitute the temperature, T, for the concentration, C, in Equation 12.

An important factor to be noted is that $\theta$ is approximately 100 times as great as D. Thus, the temperature difference between the solution and the precipitant is the determining factor rather than the actual chemical composition of the bath. However, the viscosity of the precipitant still continues to be important in determining the extent of shear, which is still a vital factor in determining the nature of the precipitate which is obtained.

The following table provides data to illustrate the effects of this phenomena. In these examples 10% solutions of a polymer containing 20% caprolactam and 80% hexamethylenesebacamide in ethylene glycol at a temperature of 132° C. is precipitated in a glycol, water mixture bath. Examples 185, 186 and 187 contain 90%, 80% and 50% glycol respectively.

The preferred products of this invention are obtained when polymers are precipitated from solution under conditions such that the $P'_A$ values are between about 100 and 1,300,000. The preferred fibrids obtained from "soft" polymers are precipitated from solution under conditions such that the $P'_A$ values are between about 100 and 80,000. 6-6 nylon fibrids are preferably precipitated under conditions providing $P'_A$ values between 100 and 1,000,000; the preferred conditions for nylon copolymers are $P'_A$ values between 400 and 1,000,000. Acrylonitrile copolymer fibrids are formed best when $P'_A$ is between 500 and 1,000,000.

The sheet-forming fibrids desired are generally not obtained at very low solution viscosities (i.e., below about 0.3 poise at room temperature; below about 0.01 for heated solutions), where the rate of precipitation is so slow that the stirring disperses the solutions to form fine particles. Furthermore, fibrids are not obtained directly at very low stirring rates, e.g., of the order of 100-500 r.p.m. When these low stirring rates are used with viscous solutions, the polymer tends to wrap around the stirrer and form a mass which rotates with the stirrer and which must thereafter be dispersed by extended or more vigorous agitation.

It is quite evident that the $P'_A$ value is very useful when working with a given polymer-solvent precipitant combination. For example, if the particles obtained from a given combination of precipitation conditions are too fine, it is clear that $P'_A$ must be reduced. This may be accomplished by increasing the solution viscosity (e.g., by increasing the solution concentration), by decreasing the rate of stirring, or by decreasing the precipitant viscosity (e.g., by dilution with a suitable liquid of lower viscosity). The useful range of polymer concentration may sometimes be extended to a higher level by heating the solution to reduce its viscosity.

PRECIPITATING EQUIPMENT

Shearing action is dependent to some extent upon the design of the stirrer and the vessel in which precipitation occurs. Suitable shearing action for preparing the fibrids of this invention may be obtained by the use of a stirrer having the stirrer paddle or blade at an angle to the plane of rotation of the paddle or blade. The design of the stirrer blade used in the Waring Blendor has been found to be particularly satisfactory. Turbulence can be increased by introducing suitable baffles in the mixing vessel. This design is used in the commercial devices of the Waring Blendor type. The combination of stirrer action and container design generally used in the practice of this invention produces percipitating conditions which combine turbulence with adequate shear. Fibrid properties may be controlled or modified through manipulation of the precipitating conditions. Fibrids with a particularly desirable morphology are obtained from crystallizable hard polymers when precipitation occurs in a shear zone which is also turbulent. It is also possible to produce oriented fibrids by the proper control of precipitating conditions. The water absorbency of fibrids from a given polymer may also be varied by changing the precipitation conditions. Unusual fibrids, such as sheath-core structures, can be obtained by precipitating a solution in a precipitant in which is dissolved another polymer.

Modified stirring devices may be used if they provide

Table XV

| Ex. No. | Bath temp. °C. | Q (r.p.m.) | $d_p$ (g./cc.) | $V_p$ (centipoises) | $V_s$ (centipoises) | $R_e$ | X | t | $P'_A$ | Tensile (sheet) | |
|---|---|---|---|---|---|---|---|---|---|---|---|
| | | | | | | | | | | Wet | Dry |
| 185 | 1.3 | 13,800 | 1.101 | 34 | 6.02 | 4,200 | 3.06 | 0.0141 | 7,500 | 0.02 | 0.05 |
| 186 | 3.1 | 13,800 | 1.089 | 21 | 6.02 | 6,730 | 3.10 | 0.0142 | 4,920 | 0.005 | 0.02 |
| 187 | 7.5 | 13,800 | 1.064 | 5.85 | 6.02 | 24,000 | 3.21 | 0.0143 | 1,805 | 0.006 | 0.02 |
| 188 | −20.0 | 13,800 | 1.089 | 85 | 6.02 | 1,662 | 2.63 | 0.0132 | 11,250 | 0.008 | 0.03 | conditions yielding P'_A numbers falling within the area required for fibrid formation. For example, the stirrer shaft may be fitted with a circular disc in place of the conventional blade or paddle. A modification of this device is one in which the polymer solution is introduced through a hollow shaft stirrer to the disc rotating in a precipitating medium. The solution is delivered from the shaft to the perimeter of the disc by channels and is injected into the precipitant at the region of highest shear. Another method of introducing the solution is to do it with the aid of a high-velocity air stream.

The operation of this invention is not limited to the use of stirring devices. Other types of apparatus may also be used provided they produce sufficient shear. For example, the solution may be sheared between solid surfaces which are in relative motion. Examples of this are shearing devices which use counter-rotating discs or a single rotating disc and a stationary disc. These discs may be supplied with abrasive surfaces if desired. The solution may be introduced through one disc and the precipitant through the other. The spacing between the discs may be adjusted to control the degree of shear. By proper control of conditions it may be possible to use a single high-speed spinning disc and introduce polymer solution and precipitant at appropriately spaced points on the disc. An apparatus similar to the disc type is one in which uniform shear stress is applied throughout by rotating one cylinder within another one.

Fibrids may also be produced by jetting solutions into precipitants under the proper conditions. One form of such an apparatus would involve the use of cocurrent jets to combine solution and precipitant streams at high relative velocity. For example, a large blast burner may be used in which solution is fed through the central hole and water fed through the outer rim of holes. The solution and precipitant is mixed in a converging section of pipe designed to increase the velocity of the flowing precipitant stream and attenuate the precipitating particles. Another modification involves the use of a pneumatic atomizer, using live steam as the atomizing gas. The stream serves to form the fibrids and also to remove solvent. An ordinary garden hose nozzle can also be modified suitably to prepare fibrids.

Jets can also be used to form fibrids with unusual structures or properties. For example, hollow fibrids or fibrids containing a core of a different polymeric material could be obtained from an apparatus embodying three concentric jets. In order to make the hollow fibrids, for example, air is admitted to the central jet. In order to make sheath-core fibrids, two different polymer solutions would be ejected from the two central jets. In either case, the precipitant is released from the outside jet.

One particularly simple fibridation equipment is known as the tube fibridator. This consists of a straight tube through which the precipitant is passed at a high speed. The polymer solution is injected through a hole in the wall of the tube so that it hits the precipitant at a zone where a high rate of shear is present. Such a tube fibridation device has several advantages. It is suitable for continuous operation and is mechanically compact and simple, and it contains no moving parts. The tube fibridator has a high degree of efficiency. A relatively small tube can produce large quantities of fibrids in continuous operation. Such tube fibridators are versatile. They work for many systems with different solutions, different polymers and different precipitants. In general, the principle of the tube is merely that the polymer solution is injected into the precipitant at the zone of highest shear.

Fibrids obtained using the tube fibridator have been found to be fully the equivalent of other fibrids prepared by other shear processes in every property. Example 101 of this application illustrates the preparation of fibrids employing a tube fibridator. In particular, fibrids may be prepared using a tube fibridator from copolymers based on acrylonitrile, copolyesters, copolyamides such as mixtures of 6 nylon with 610 nylon and 6 nylon with 66 nylon, and synthetic elastomers prepared from condensation polymerization reactions such as described in the examples.

In addition to their general utility for preparation of fibrids as described above, tube fibridators are particularly useful for special shear precipitation techniques. Thus, formation of fibrids by shear precipitation, at temperatures in excess of the boiling point of one or more of the liquids involved, is possible because the tube fibridator can be operated at elevated temperatures as a closed system. In addition, it is relatively simple to employ temperature differentials in the liquids involved. For example, a hot solution and a cold precipitant can be employed simultaneously to prepare fibrids under different conditions.

A simple form of the tube fibridator consists of a T tube within which polymer solution is fed into a stream of polymer under high shear. A more sophisticated version of the same apparatus is illustrated in the drawings (FIGURE XV). The tube fibridator can be employed to give highly uniform fibrids, because the shear can be precisely and uniformly controlled throughout the system. Calculations for shear rate in apparatus employing the tube fibridator are identical with those for other types of shearing apparatus.

FREENESS NUMBERS

The freeness numbers of aqueous slurries of fibrids is below about 790. The preferred fibrids from "hard" polymers have freeness numbers in the range between about 100 and about 600. The preferred products from "soft" polymers have freeness in the range between about 400 and about 700.

The freeness and many other characteristics of fibrid slurries are similar to those of cellulose pulps used for making paper. The primary distinction is that the slurries are prepared from synthetic polymers. Accordingly, they may be thought of as synthetic "pulps." The properties of the fibrid slurries may be modified by mixing with them a slurry of fibrids from other polymers and/or by mixing with synthetic fiber staple or chopped synthetic fibers, and/or by mixing with rayon staple or staple from cellulose derivatives, and/or by mixing with beaten cellulose and/or natural animal fibers and/or mineral fibers. Many other methods of modifying these slurries are mentioned elsewhere.

ISOLATION OF FIBRIDS

If it is desired, the fibrids prepared from hard polymers may be isolated and dried. The drying conditions required for retention of adequate bonding properties in sheet formation on a papermaking machine are not particularly critical, although it is preferable that these conditions not be drastic. For example, the temperature should be kept low enough to avoid fusing the fibrids into globular masses, since the bonding properties associated with these products would be lost. Also, severe mechanical action should be avoided, since this would tend to break up the fibrids into fines. More care in drying fibrids is required if it is desired that they have bonding properties when redispersed in water identical with those which they possessed prior to drying.

One method of drying which has been found suitable for preparing dried fibrids with adequate bonding properties is to spray-dry a slurry under controlled conditions, e.g., the temperature should not be too close to the melting point and the slurry which is sprayed should be substantially free of solvent for the polymer. A second method is to wash the fibrids with a water-miscible low-boiling organic solvent. The water-miscibility requirement is based on the assumption that the fibrids have been deposited from an aqueous slurry and are still wet. Another suitable method comprises removing water in a centrifuge until the moisture content has been reduced to approximately 100%. The fibrids are then placed in a cone with an air inlet at the apex. Air is admitted at approximately 9 cu. ft./min. to circulate the fibrids. After approximately three minutes the moisture content is reduced to about 50%. The fluffed fibrids are then transferred to an air oven where the moisture content is reduced to approximately 1% by circulating heated air; temperatures in the region of 100° C. are usually suitable.

REDISPERSION OF FIBRIDS

The dried fibrids prepared from "hard" polymers can be redispersed in aqueous media, from which can be made sheet products with substantially the same properties possessed by sheets prepared directly from the original slurry. Redispersing is usually carried out in an apparatus such as the Hollander beater and is aided by the use of wetting agents. The processing economies of preparing the sheet products from the original aqueous slurry are obvious, and this is naturally the preferred method of operation wherever feasible. However, since it may frequently be necessary to ship the fibrids from the location where they are prepared to another location, where they will be converted to sheet products, it is a definite advantage to be able to dry the products to reduce shipping costs. For practical reasons it is sometimes desirable to prepare the fibrids in a size range somewhat larger than that which is optimum for sheet formation to provide ease of handling and shipping. These large fibrids can then be refined by the papermaker prior to use. Sheets prepared from soft polymer fibrids resist redispersion of the fibrid components.

FIBRID SHEETS

An important characteristic of fibrids is their cohesiveness or bonding strength in sheet products. This is quite evident in both wet and dry homosheets. Sheets prepared from "soft" polymer fibrids have a minimum couched wet strength of approximately 0.002 g.p.d. and a minimum dry strength, before pressing, of approximately 0.005 g.p.d. This exists despite a low level of mechanical properties characteristic of the polymers per se, when compared to hard polymers. One characteristic of these sheets, which distinguishes them from homosheet products prepared from hard polymer fibrids is their behavior on rewetting after drying. The sheets from soft polymer fibrids retain a substantial percentage of the dry strength whereas the unpressed, unfused homosheets prepared from hard polymer fibrids drop back more nearly to a strength level of the original wet sheet, a value which is frequently appreciably lower than the dry strength. The wet tenacity of sheets prepared from staple fibers is usually less than $4 \times 10^{-4}$ gram/denier. Sheets prepared from "hard" polymer fibrids have a minimum couched wet tenacity of about 0.002 gram/denier and a minimum dry strength before pressing of about 0.005 gram/denier. A wet strength of as high as 0.02 gram/denier is not unusual for these products. Values expressed as gram/denier may be converted to values expressed as lbs./in./oz./yd.$^2$ by multiplying by 17.

By virtue of their special characteristics, fibrids disperse readily to form stable dispersions which may be used in ordinary papermaking operations without adding surfactants. This permits the use of fibrids in papermaking machinery without modification of the usual processing conditions, and serves to distinguish fibrids from any previously known fiber form of synthetic polymer. Thus, fibrids may be added to the beater and passed through the refiner into the head box onto the screen of a Fourdrinier machine. From there the sheet may be carried to the wet press through drier rolls, calenders, and woundup as a sheet without modifying the normal operating characteristics of the machines as used for making cellulose paper. In addition, the papermaking operation can be integrated with fibrid manufacture by collecting the fibrid on a screen at the exit from the precipitation zone. It is also possible to form shaped articles directly from thick fibrid slurries by slush-molding in patterns or molds.

The advantages of these fibrids in the formation of sheet products comes more apparent when sheet products from hard polymers are compared to those from synthetic polymers in the fiber forms prepared by prior art processes.

Table XVI

| Fiber form | Surface area [1] | Freeness | Wet sheet [2] strength unpress. unfused fibers |
|---|---|---|---|
| Hard polymer fibrids. | Above 2.0 | Below 790 | Above 0.002. |
| Microfibers [3] | Approximately 1.0. | Above 800 | Aqueous slurries and sheets very difficult to form. |
| Air jetted fibers.[4] | 0.5 | do | Do. |
| Fibers from fibrillatable films. | 1.1 | do | $4 \times 10^{-4}$. |
| Staple | Less than 0.5 | do | No greater than 0.001. |

[1] M.$^2$/g.
[2] G.p.d.
[3] Fine, round, dense fibers with a diameter of approximately 2 microns or less.
[4] Equivalent to those described in U.S. 2,438,405.

An important feature of the bonding properties of fibrids is that no heat or pressure is required to develop adequate strength. The geometry of the sheet is determined primarily by the form in which it is held while being dried at room temperature. The strength of sheet products comprising soft polymer fibrids can be increased by heating alone. This is also true to a lesser extent for products comprising hard polymer fibrids, but for these products maximum strength is usually attained by the combination of heat and pressure.

Pressure rolls and solvent treatments, applied as known in the art, generally tend to produce stiffer, less porous sheets. Engraved rolls can be used to produce patterns on these sheets, for example, by forming translucent areas in an opaque background. Another way of introducing a texture of pattern on the sheet is to pass it through a calender which has one roll surfaced with heated fine needles or spikes. Such a treatment may also serve to increase the bonding.

In the preparation of sheet products from soft polymer fibrids, the rate of deposition of the fibrids from their slurry must be considered, since this affects the density of the sheets. Thus, if the rate is very slow, a fluffy mass of loosely-packed fibrids is formed, which has a characteristic open spongy structure with a bulk density of approximately 0.2 lbs./cu. ft. However, by applying full vacuum and depositing the fibrids more rapidly, considerably denser sheets (e.g., up to 8 lbs./cu. ft.) are formed. The nature of the sheets is also determined by the uniformity of the fibrid dispersion. A more uniform dispersion of soft polymer fibrid may sometimes be obtained by the addition of an organic liquid, such as acetone, to the papermaking slurry.

Another feature of fibrids is that they take up the pattern of the screen or fabric on which they are deposited. This permits the formation of a variety of patterns and weave-like finishes on the surface of the sheets produced. For example, by using an 80-mesh twill screen, a basket weave is imprinted on the surface of the sheet. This pattern can be obtained on both sides of the sheet by a variety of methods. For example, a cloth-like surface texture and a fabric-like drape can be obtained by pressing a nylon fiber-copolyamide fibrid sheet between 2 screens. If properly designed, the screen punctures the paper with an arrangement of holes which resemble those between threads in a woven structure.

Another method for obtaining the screen pattern on both sides of a sheet prepared from soft polymer fibrids is to unite two sheets with the screen pattern on the outside while the sheets are still wet and then dry them. The two sheets bond together during the drying process.

Similar pattern effects are observed when fibrids are deposited on woven fabrics, such as glass fabrics or those prepared from synthetic fibers, such as nylon tricot. Composite fabrics of unusual strength are obtained when a glass fabric is used as a base. The fibrids bond themselves to the fabric so strongly that delamination cannot be achieved without destroying the continuity of at least one of the layers. The tear strength of the tricot-backed structure, using soft polymer fibrids, is equal to that of army duck. One application of the technique is the preparation if inexpensive floor mats by depositing fibrids on a woven fiber backing.

FIBRID-BONDED PRODUCTS

When using fibrids as a binder in sheet formation, as little as about 1% fibrids in the final sheet is often highly advantageous. Generally, however, it is preferred to use at least about 5% of the fibrid and at least about 15% fibrid is preferred for maximum strength.

The hand and other properties of sheet products prepared from hard and/or soft fibrids can be controlled and modified in many ways. One very practical method of accomplishing this is to blend the fibrids of this invention with staple fibers. These staple fibers may be derived from cellulosic materials, staple of synthetic polymers, or staple fibers of natural origin. The combination of fibrids with staple generally results in a sheet with higher tear strength. Within this area the properties can be controlled or modified by the choice of polymer for preparing the fibrids, the choice of staple fiber composition and/or length and/or denier.

The properties of fibrid-bonded sheets, whether they be homosheets (i.e., all fibrid) or heterosheets, i.e., sheets from mixtures of fibers and staple, may be controlled or modified by calendering or heating. For example, all fibrid homosheets may be made paper-like by calendering alone. A wide variety of products may be made by the use of a combination of heat and pressure. The properties obtained are controlled by the amount and type (dead load or calender) of pressure applied, calendering temperature, and the like. For example, embossed sheet products may be made by applying pattern platens to calender rolls and calendering with a simultaneous application of heat. Also, water-leaves may be prepared from a properly selected combination of fibrids and staple, which may be dried and pressed at suitable temperatures and pressures to fuse the fibrids, but not the staple, to produce a fiber-reinforced plastic sheet. Another way in which this technique can be used is to prepare a reinforced plastic sheet from a paper prepared from a slurry containing a mixture of fibrids and asbestos fibers. Reinforced plastics can also be prepared from a slurry obtained by using a monomer, such as methyl methacrylate, as a precipitant in the formation of the fibrids which are to be used for reinforcing.

On the other hand, it is possible to increase the bonding strength of fibrid-bonded sheets by the use of heat alone, e.g., by the use of dielectric heating. In many instances this permits an appreciable increase in strength without sacrificing the desirable aesthetic properties of the original sheet. An appreciable increase in the strength of sheets from soft polymer fibrids has also been realized by adding silica.

Other sheet properties, such as absorbency, appearance, reflectance, color, surface smoothness, etc., can be modified by the use of fillers, sizes, dyes, wetting agents, etc. One method for introducing such materials is to deposit a fibrid slurry containing the additive, e.g., an abrasive such as carborundum. The additive may be introduced by incorporating it in the polymer solution prior to fibrid formation. The softness, porosity, and/or permeability of textryls may be modified by incorporating soluble, solid particles, such as common salt, in the fibrid slurry and subsequently washing the salt out of the dried sheet. Soft, light-stable fibrids, from which soft, flexible textryls can be made, are obtained for example, by plasticizing polyacrylonitrile with a non-fugitive plasticizer, such as silver oxide. The light durability of soft textryls prepared from soft polymer fibrids is improved by incorporating powdered UV-absorbing glasses in the fibrids. Stiff, hard sheets prepared from hard polymer fibrids can be converted to the soft, drapable sheets similar to those prepared with soft polymer fibrids. For example, sheets prepared from 6-6 nylon can be reacted with ethylene oxide to convert the 6-6 nylon to a softer, more flexible polymer.

One method for making a modified surface on a fibrid-bonded sheet is by subliming a metal, such as aluminum or silver, onto the surface. Another approach to the preparation of modified sheets of this nature is to pass a fiber through a solution and subsequently pass it through a precipitant under shearing conditions suitable for forming fibrid structures on the surface of the fiber. These fibers may then be chopped and made into sheets on the paper-making machine. Sheets prepared by this method have an unusual combination of properties.

The porous sheets obtained by depositing soft polymer fibrids on a screen have a fabric-like drape and a pleasing soft hand similar to that of suede leather or chamois. The porosity of the sheet and the surface characteristics due to projecting fiber ends avoids the cold disagreeable feel associated with rubber sheets. An unusually pleasing hand is obtained with these sheets by brushing the surface to raise a nap. Another method for modifying the surface characteristics of these sheets is to treat them with modifiers, such as colloidal silica.

Blending soft polymer fibrids with staple fibers results in the formation of a sheet which resembles leather in its tactile and tensile properties. This is particularly true when staple from hard polymers, such as nylon, polyacrylonitrile, and poly(ethylene terephthalate), are used. Use of increasing percentages of these staple fibers tends to produce stiffer sheets. The sheet properties can also be modified by adding "hard" polymer fibrids. Composite sheets containing both hard and soft polymer fibrids also lead to products with leather-like properties, but they are more supply that those obtained by blending soft polymer fibrids with staple.

When using fibrids as a binder in sheet formation, as little as about 1% fibrid in the final fused sheet is often highly advantageous. Generally it is preferred to use at least about 5% fibrid or more. In unfused sheet formation at least about 5% fibrid is usually employed as binder. The use of at least 15% fibrid is preferred for maximum strength.

UTILITY

Products bonded with soft polymer fibrids have many applications. One of these is in the form of elastic apparel. Such applications include outerwear garments such as jackets, coats, skirts, playsuits, under water suits, rainwear, gloves, watch straps, and in certain shoe applications, such as in house slippers, footwear-uppers, and boot and shoe liners. Other apparel and personal items include girdles, elastic fabrics for anklets, wristlets, waistbands, and sweatbands, handbags, sleeping bags, and elastic medical materials, such as surgical and medical bandages. Household uses include antiskid mats, such as rug anchors and tub mats, blankets, shower curtains, and protective covers for such items as coasters, bottles, drinking glasses, luggage, lamp shades, and the bases of lamps, statues, and silver. Further applications are in wall covering, draperies, and in coated fabrics. They may be used in the manufacture of books, such as in book binding or covering whether it be the only cover or as a protective cover for hard-bound books. In connection with applications such as this, it is interesting to note that sheet products made from certain of the elastomer fibrids are heat-sealable. Use as flannel replacements, such as in apparel, pool table covers, and phonographic turn table covers is suggested by the properties of the sheet products. They may be used as linings or inserts, such as fabric interliners, linings for a variety of cases such as those used for scientific instruments, jewelry, musical instruments, etc., and in protective paddings, such as athletic pads and linings for football helmets and hard hats. They may also be used as protective linings in industrial packaging. Additional industrial uses are in electrical and other elastic tapes, as seals for electric switches, handle covers for tools, applicators, seat-covers and upholstery, including home furnishings and automobiles, automobile trim, map papers, gaskets, seals, such as those used for shafts, acoustical insulations, antivibration machinery mounts, chamois type cleaners, and covers for festoon dryer bars.

Sheet products prepared from hard polymer fibrids, or combinations of these fibrids with hard polymer staple, have properties which suggest many possible uses. Thus, the good dimensional stability, excellent resistance to acids and alkalies, relatively low water absorption, good wet strength properties, and resistance to attack by fungus and mold suggest their use in non-woven products utilized in such applications as light weight tarpaulins and tentage material.

Fibrids are obviously useful in papers, particularly for applications such as maps, blueprints, and as packaging materials for use in humid climate. Tests have shown that these papers can be readily marked in the usual manner, such as writing with pencil or ink, typing, or printing, so that they may be used in conventional paper applications. They are also very useful where high wet strength and low moisture sensitivity are desirable in papers.

Many specific combinations are particularly well suited for special applications. For example, papers of particular utility for use as punch cards are made from a combination of poly(ethylene terephthalate) filaments bonded with polystyrene fibrids. Other paper sheets made from poly(ethylene terephthalate) staple and suitable fibrids may be used in loudspeaker cones. Papers with a particularly attractive warm hand are made from a combination of fibers and fibrids from the polyurethane prepared from piperazine and ethylene bischloroformates. An attractive decorative paper is made by combining fibrids with lustrous yarns. Such sheets may be modified further by embossing. Papers made from linear polyethylene fibrids are pressure-coalescible. This permits making a "negative" by typing on the paper, which gives clear letters or an opaque or translucent background.

Paper-like products have many other applications. For example, fibrid-bonded papers may be used as photographic papers, currency, and in typing supplies such as stencil tissue, typewriter ribbons, and carbon papers. Other applications include tracing paper and cloth, hair waving papers, playing cards, tabulating card stock, condenser tissue, twisting tissue for paper yarn, and in tapes, such as medical tapes and surveyors' tapes. Other applications outside the usual paper and tape uses are as paper drapes and curtains, bases for coated fabrics, abrasive backings, diaphragm reinforcements, book covers, both as the sole backing or as covers for other types of book bindings. As an example of a variety of protective cover applications may be mentioned covers for military equipment which is being stored.

An important application for paper-like products is in the field of bagging, particularly for heavy industrial uses. However, additional specific uses are as vacuum cleaner bags, shoot bags for pollination control, sleeping bags, and tea bags.

Other industrial applications include electrical insulation, transformer press boards, and as wrappings for underground pipes. They may also be used as wrappings for food products, such as meat and cheese. Additional applications include filter media, such as filter papers, fuel cells and mold release materials.

Sheet products comprising these fibrids are also ideally suited for use as headliners in automobiles, interliners for non-woven fabrics, and reinforcing agents for rubber goods, such as belting and tires. Fabric-like sheets of a cashmere or suede type are formed by brushing a nap on a sheet containing fibrids from either hard or soft polymer. The properties of many of the polymers used in forming these sheets are such that the sheet products can be molded under the proper conditions and the desired molded form retained upon removal from the molds. Porous sheets of particularly desirable drape and feel are made from sheets in which there has been incorporated a leachable fugitive fibrid. As a specific example may be mentioned nylon sheets containing polyvinyl alcohol, which may be leached out.

Some of the many uses of fibrids have been pointed out, particularly the preparation of paper-like structures on the paper machine. However, by the proper blending with staple fibers, a sheet which resembles leather in its tactile and tensile properties may be obtained on the paper-making machine. This is particularly true when staple from hard polymers, such as nylon, polyacrylonitrile, and poly(ethylene terephthalate) are blended with soft polymer fibrids. The use of increasing percentages of the staple fibers tends to produce stiffer sheets. Another interesting non-woven structure which can be obtained is the flannel to felt-like products produced by blending soft polymer fibrids with crimped staple from these same hard polymers. These structures can be strengthened by a combination of needle punching and pressing of the fibrids.

Interesting products can also be obtained by blending hard and soft polymer fibrids. Many of these blends also produced sheet products with leather-like properties, but these leather products are more supple than those obtained by blending soft polymer fibrids with hard polymer staple.

There are many applications for fibrids other than those in sheet products, however. For example, they may be used as surface modifiers, i.e., modifiers of feel or hand in layered structures. The surface of continuous filament yarns may be modified by passing the yarn, or a web of parallel yarns, through a fibrid slurry and then drying. Higher bulk carpet yarns, for example, could be obtained by this technique. Modified surfaces can also be obtained by applying fibrids by conventional flocking techniques. For example, a non-woven rug structure can be made by flocking fibrids on a wet elastomer fibrid sheet.

Another application is in cigarette filters, in which fibrids made from 6-6 nylon or poly(ethylene terephthalate) might be used. A similar application is the use of batts of fibrids as wadding for shotgun shells. Fibrid bats may also be used as vibration insulation of machine bases and as soundproofing batts. Loose fibrids prepared from hydrophobic polymers might also be used as thermal insulation of the type which is now blown in between walls and into attics. Another thermal insulation application is the use as low-temperature insulation in refrigerators or aircraft.

These products are also suited for other types of insulation, such as electrical insulation. For example, it is possible to insulate wires and cables by molding a fibrid waterleaf around the wire or cable. Another method of insulating wires with these products is to dip the wire in a mixture of short fibers, such as polyacrylonitrile fibers, and acrylic fibrids. Such wires would be particularly useful in sealed unit refrigeration motors. Another approach to the use of these products in the electrical insulation field is to use fibrid-reinforced films for this purpose.

Fibrids may be used in a variety of ways to reinforce many types of products. For example, they may be used as reinforcing agents for paint films, oils, caulking compounds, plasters, plasterboard, roofing cement, and as reinforcing agents in plastics. This latter type of product can be obtained from fibrids by several routes. For example, a fibrid sheet can be soaked in a polymerizable resin-catalyst mixture and a reinforced plastic made by activation of the catalyst. A reinforced plastic coating may be obtained by spraying a slurry of fibrids in a hardenable liquid onto a surface. Fibrids made from heat-convertible polymers would have interesting applications in the reinforcement field. Heat-convertible polymers are those which can be converted to higher melting products by heating at temperatures near their melting point.

Fibrids from post-formable polymers are particularly useful in the fabrication of non-woven structures which can be molded at elevated temperatures, at which they become elastic. Upon cooling the rigid form returns and the object retains the form in which it was held during molding. Water-activatable post-formable polymers are useful in this connection.

Water-soluble or fugitive fibrids have many useful applications, including the introduction of porosity in non-woven fabrics by washing the fabric. Polyacrylamide and amylose fibrids are suitable for use in this application. Another use for certain water-soluble fibrids is as soil conditioners. Batts of these fibrids would be useful as a winter mulch around surface rooted plants. The fibrids would dissolve before the growing season. Other uses for fibrids are as ion exchange materials and as additives for controlling viscosity in drilling muds.

Fibrids may also be used as raw materials for compression molding to give molded objects with unusual properties. One method of utilizing fibrids in the molding operation would be to use formed wire molds to prepare pre-forms for compression molding of either thermosetting or thermoplastic polymers. This process could be used with both reinforced and non-reinforced plastic structures.

In another application fibrids are dispersed through a batt of staple fibers and fused to form a resin-bonded web of the type known in the art. The particular advantage of fibrids in such utility is that because of their fine nature and fibrous qualities they can be uniformly distributed though a batt without any tendency to migrate or settle to the bottom of the structure prior to bonding. In addition, the bonds formed between the fibrid particles and the staple fibers seem to be particularly firm and well fused.

Fibrids and the structures formed therefrom may be modifier in property, such as for instance, insolubilizing through cross-linking, by irradiation with high energy electron beams.

FIBRID UTILITY ON PAPER-MAKING MACHINERY

Typical processes wherein paper-making machinery may be used in producing sheet products from fibrids are illustrated in FIGURES XIII and XIV. As mentioned previously FIGURE XIII is a flow sheet showing a suitable commercial system wherein a slurry of fibrids is fed from "Fibrid Supply" through a "Beater" into a "Stock Tank" where, if desired, a slurry of staple fiber is added from "Staple Supply." At the "Mixer" the resulting fluid mass is agitated to provide uniform dispersion of solids and the amount of liquid present is adjusted. The "Mixer" feeds the "Head Box" of the "Fourdrinier Machine" wherein the waterleaf is laid down, progressing thereafter through the "Wet Press," the "Dryer Rolls," the "Calender" and finally to the "Product Reel." The "Broke," i.e. collection of scraps, is fed through a "Slusher" for recycling to the "Stock Tank."

FIGURE XIV is a diagrammatic representation of the flow sheet showing a supply of suspending liquid 1, feeding fibrid mixing vessel 2 through valve 3 and the staple suspending vessel 4 through valve 5. Each vessel is supplied with an agitator 6. A supply of fibrid is fed to vessel 2 from a "fibrid cake" 7 (a fibrid slurry containing at least 70% fibrid). A supply of yarn 8 is fed through cutter 9 into staple suspending vessel 4. The slurries in each of the suspending vessels are pumped by pumps 10 into mixing T 11, the fibrid slurry passing through a Jordan Refiner 12. The mixed slurry then flows through a slurry distributor 13 and on to moving wire 14, the water passing through the said wire and being removed in part by suction boxes 15. As the wire reaches couch roll 16, a waterleaf 17 of the suspended solids has formed. The wire 14 being continuous passes back over stretch roll 18 and breast roll 19. Water-leaf 17 passes under rider roll 20, through wet press rolls 21, over guide roll 22 to a series of drier rolls 23, to a calender stack 24 and finally to a roll-up 25.

EXAMPLE 189

*Fibrid bonded sheet—Foudrinier machine*

An all nylon paper using nylon fibrids as the binder is prepared on conventional paper-making machinery according to a procedure wherein the fibrids are prepared in a 10" diameter, 16" deep, cylindrical, non-baffled tank with a 2" product outlet placed 7" from the bottom of the tank. The precipitant is stirred at 8000 r.p.m. with a large, 4-bladed stirrer similar in design to those used in the smaller scale experiments described previously. An aqueous glycerol solution containing equal volumes of glycerol and water is metered into the tank at the rate of 2 gallons per minute. A 10% solution of 6–6 nylon in 90% formic acid is metered simultaneously into the tank at the rate of 0.2 gallon per minute. The effluent product is collected in an 800 gallon tank full of water. The product is washed to a neutral pH and damp-dried in a centrifugal washer and drier.

The seventy pounds of fibrids obtained is added to 3230 pounds of water in a Hollander beater. The slurry is beaten for ½ hour with a roll bed-plate clearance adjusted to ½ inch. The clearance is then reduced to 0.01 inch and beating continued for approximately 30 more minutes. The pulp slurry at the end of this period contains about 2% fibrid. After proper dilution, the slurry has a Canadian Standard freeness number of 480. A higher consistency fibrid slurry, i.e., one containing about 4% fibrid, is more suitable for processing in the Hollander beater to produce a refined slurry suitable for blending with a staple fiber suspension for processing on the paper-making machine.

Dry ½ inch 6 d.p.f. 6–6 nylon staple (35 pounds) is added to 600 gallons of water in a conventional stock tank and the mixture stirred slowly (the agitator operates at 8–30 r.p.m.) overnight. Dispersal of the fibers is substantially completed in about 1 hour. To this is added the slurry of fibrids prepared above. These two slurries are stirred together for about 25 minutes in the stock tank before being pumped to the head box.

The mixed slurry is pumped to the head box and passes out through the slice onto the approximately 50-mesh screen of the Fourdrinier table, where the fiber mat or web is formed. The formed sheet, drained and sucked down to a water content of about 85%, is peeled off the wire at the couch roll and passes across a 1-foot gap to a wet press. After being wet-pressed, the sheet crosses a 3-foot gap to the inlet felt of the steam drying section. The rolls are heated with 30 p.s.i. steam. Moisture content of the finished sheet is approximately 4½%. After 10 passes through the calender rolls the sheet has a dry tenacity of 0.09 g.p.d. and a wet strength of 0.02 g.p.d. in the machine direction. The same properties are 0.07 g.p.d. and 0.01 g.p.d., respectively, when measured in the cross direction. The sheet also has a tear strength of 542 grams, a tear factor of 2.6, a burst strength of 36 p.s.i. and a basis weight of 211 g./m.$^2$.

The broke, i.e., scrap which collects during breaks in sheets, is returned to the beater and then pumped back to the stock tank and re-used. The reclaimed pulp is equally processable on the paper machine.

EXAMPLE 190

Fibrid bonded sheet—Fourdrinier machine

A 12.5% solution is prepared by dissolving 10 pounds of a copolyamide containing 40% by weight of hexamethylene adipamide units and 60% by weight of caprolactam units in 70 pounds of ethylene glycol at 105° C. This solution is transferred to a pressure vessel where the temperature is maintained at 80° C. A precipitant solution is prepared by mixing 67 gallons of ethylene glycol with 33 gallons of water and cooling to −6° C.

The polymer solution and precipitant solution are metered separately continuously to a mixing tank. The polymer solution stream is subdivided by means of a manifold feeding system into 50 individual streams, which enter the mixing tank. The precipitant enters the tank as a single stream. As these streams converge and are thoroughly beaten by the mixing action of the stirrer in the tank, a fibrid slurry is continuously formed and drawn off from an outlet at the bottom of the tank. A portion of the fibrid slurry is continuously recycled to the mixing tank while the other portion is continuously collected as a product.

The mixing tank used is a cylindrical stainless steel container 12 inches in diameter and 21 inches high. This tank is equipped with a blade-type stirrer mounted vertically and driven by an air motor (Gast Air Motor Model 8AM) operated at 90 p.s.i.g. The polymer solution is fed in at 1040 ml. per minute and precipitant at 7000 ml. per minute. Hold-up volume in the tank is kept at approximately 8 gallons. The stirrer operates at approximately 2500 r.p.m. 8 pounds of fibrids are collected during approximately ½ hour of operation.

The relatively coarse and slightly frazzled fibrids produced by this process are filtered on an 18″ x 12″ "Eimco" vacuum rotary filter and thoroughly washed with water. The major portion of this filter cake is reslurried with two other filter cakes prepared in a similar manner from the same polymer. The slurry is diluted with water to 0.2% consistency and refined in a disc mill at 0.001 inch clearance in one pass at a current input of 20 amp. and a throughput of 17 gallons per minute. The inlet slurry temperature is 25° C. Sufficient sodium carboxymethylcellulose is added to the refined fibrid slurry to produce a concentration of 0.06%.

A 1.5 d.p.f. nylon tow is coated with a nonionic surface active agent comprising the ethylene oxide condensate of a high molecular weight fatty alcohol (sold under the trademark "Alkanol" HC by E. I. du Pont de Nemours and Company, Wilmington, Del.) and cut into ¼ inch lengths on a Taylor-Stiles tow cutter. These cut fibers are slurried at a consistency of 0.2% in water containing 0.01% carboxymethylcellulose, using a propeller-type mixer. This slurry is then pumped at 15 gallons per minute through an 8″ Bauer disc mill set at 0.002 inch clearance to reduce any fused clumps and non-uniform cuts into individual fibers of substantially uniform dimensions. After refining is completed sodium carboxymethylcellulose is added to give a total concentration of 0.06%. Sufficient sodium hydroxide is added to increase the pH to approximately 10.5.

The fiber and fibrid slurries are then blended by metering each to a different side of a ¾ inch pipe T. The well-mixed slurry then passes directly to the head box of a 30 inch Fourdrinier paper machine. At the head box the consistency of the pulp is 0.14% solids. The temperature is 25° C. and the slurry has a Canadian Standard freeness of 575. A shallow open flume head box is used in conjunction with a 6-inch diameter solid breast roll. Following is a list of the operating conditions of the paper machine.

| | |
|---|---|
| Wire speed | 15 f.p.m. |
| Wire mesh | 70 x 70. |
| Wire inclination | 1/4° up from breast roll. |
| Inlet slurry velocity | 51 f.p.m. |
| Width of deckle strap | 14 in. |
| Shake | Not used. |
| Flat box vacuum | 2 in. of mercury. |
| Couch roll vacuum | 3 in. of mercury. |
| Wet press loading | 4,000 pounds. |
| Number of drier cans used | 15. |
| Average temperatures of driers | 240° F. |
| Maximum temperature of driers | 255° F. |
| Calender | Not used. |

Excellent sheet formation is obtained and the thickness and basis weight variation in the sheet produced are low. The fibrid-reinformed nylon paper has the following properties as wound up on the machine:

| | |
|---|---|
| Basis weight | 2.55 oz./yd.$^2$. |
| Caliper | 0.018 in. |
| Composition | 77.8/19.8/2.4 (fiber/fibrid/moisture). |
| Sheffied air permeablity | 70 c.f.m./in.$^2$/10 p.s.i. |
| Tensile strength in machine direction | 14.0 lbs./in./oz./yd.$^2$. |
| Tongue tear strength in machine direction | 0.605 lbs./oz./yd.$^2$. |

After pressing in a "Carver" press at 170° C. and 100 p.s.i. for 15 seconds the sheet has the following properties:

| | |
|---|---|
| Basis weight | 2.65 oz./yd.$^2$. |
| Caliper | 0.008 in. |
| Composition | 77.8/19.8/2.4 (fiber/fibrid/moisture). |
| Sheffied air permeablity | 45 c.f.m./m.$^2$/10 p.s.i. |
| Tensile strength in machine direction | 17.2 lbs./in./oz./yd.$^2$. |
| Tongue tear strength in machine direction | 0.52 lbs./oz./yd.$^2$. |

Many equivalent modifications will be apparent to those skilled in the art from a reading of the above without a departure from the inventive concept.

This application is a continuation-in-part of U.S. application 635,876, filed January 23, 1957, now abandoned.

What is claimed is:

1. A pulp comprising a plurality of supple, wholly synthetic polymeric particles having one dimension of minor magnitude relative to their largest dimension, a high surface area and possessing (a) an ability to form a waterleaf having a couched wet tenacity of at least about 0.034 lb./in./oz./sg. yd. when the said pulp is deposited from a liquid suspension upon a foraminous surface, which waterleaf, when dried at a temperature below about 50° C., has a dry tenacity at least equal to its couched wet tenacity and (b) an ability, when a plurality of the said particles is deposited concomitantly with staple fibers from a liquid suspension upon a foraminous surface, to bond the said fibers by physical entwinement of the said particles with the said fibers to give a composite waterleaf with a wet tenacity of at least about 0.034 lb./in./oz./sq. yd.

2. The pulp of claim 1 wherein the said polymeric particles have the appearance of beaten cellulose pulp.

3. The pulp of claim 1 wherein the particles are damp-dry.

4. The pulp of claim 1 wherein the particles are bone-dry.

5. The pulp of claim 1 containing a plurality of staple fibers.

6. The pulp of claim 1 in aqueous suspension having a Canadian Standard freeness of between about 90 and 790 and wherein the synthetic polymer particles have a fiber coarseness test denier no greater than about 15.

7. The pulp of claim 6 containing a plurality of staple fibers.

8. The pulp of claim 1 wherein the synthetic polymer has an initial modulus of at least 0.9 gram per denier.

9. The pulp of claim 8 wherein the said synthetic polymer is a thermosetting resin.

10. The pulp of claim 8 wherein the said synthetic polymer is a condensation polymer.

11. The pulp of claim 10 wherein the said condensation polymer contains amide linkages.

12. The pulp of claim 11 wherein the said polymer is polyhexamethylene adipamide.

13. The pulp of claim 11 wherein the said polymer is poly(metaphenylene isophthalamide).

14. The pulp of claim 11 wherein the said polymer is a copolyamide of about 20% polyhexamethylene adipamide and about 80% polycaproamide.

15. The pulp of claim 11 wherein the said polymer is a copolyamide of polyhexamethylene adipamide wherein from about 15 to about 40% of the amide nitrogen atoms contain methoxy methylene substituents.

16. The pulp of claim 10 wherein the said condensation polymer contains ester linkages.

17. The pulp of claim 16 wherein the said polymer is a copolyester of ethylene terephthalate and ethylene isophthalate, the ratio of ethylene terephthalate units to ethylene isophthalate units being about 80:20.

18. The pulp of claim 10 wherein the said condensation polymer contains urethane linkages.

19. The pulp of claim 18 wherein adjacent urethane linkages are connected by an ethylene radical.

20. The pulp of claim 10 wherein the said condensation polymer contains urea linkages.

21. The pulp of claim 8 wherein the said synthetic polymer is an addition polymer.

22. The pulp of claim 21 wherein the said addition polymer is a polymer of acrylonitrile.

23. The pulp of claim 21 wherein the polymer is a copolymer containing about 94% acrylonitrile and about 6% methylacrylate.

24. The pulp of claim 21 wherein the said polymer is a reaction product of a mixture of monomers comprising (a) from 20 to 80% of acrylonitrile, (b) from 1.5 to 15% of an alphaolefinic carboxylic acid selected from the class consisting of acrylic, methacrylic, ethacrylic, phenylacrylic, crotonic, itaconic, gluconic, and maleic and (c) 80 to 20% of an ester of said alphaolefinic carboxylic acid and a saturated aliphatic monohydric alcohol having 1 to 12 carbon atoms.

25. The pulp of claim 21 wherein the said addition polymer is a copolymer containing 30% acrylonitrile and 70% styrene.

26. The pulp of claim 25 wherein the said copolymer contains 1% of the condensation polymer of sodium naphthalene sulfonate and formaldehyde.

27. The pulp of claim 1 wherein the synthetic polymer has an initial modulus less than 0.9 gram per denier.

28. The pulp of claim 27 wherein the said synthetic polymer is a plasticized addition polymer.

29. The pulp of claim 28 wherein the said addition polymer is polyvinylchloride.

30. The pulp of claim 27 wherein the said synthetic polymer is a condensation elastomer.

31. The pulp of claim 30 wherein the said synthetic condensation elastomer is a copolyester.

32. The pulp of claim 30 wherein the said synthetic condensation elastomer is a copolyamide.

33. The pulp of claim 1 wherein the said polymeric particles contain inert, unfusible particles.

34. The process of preparing a sheet structure which comprises depositing on a foraminous surface and from aqueous suspension a pulp comprising a plurality of supple, wholly synthetic polymeric particles having one dimension of minor magnitude relative to their largest dimension, a high surface area and possessing (a) an ability to form a waterleaf having a couched wet tenacity of at least about 0.034 lb./in./oz./sq. yd. when the said pulp is deposited from a liquid suspension upon a foraminous surface, which waterleaf, when dried at a temperature below about 50° C., has a dry tenacity at least equal to its couched wet tenacity and (b) an ability, when a plurality of the said particles is deposited concomitantly with staple fibers from a liquid suspension upon a foraminous surface, to bond the said fibers by physical entwinement of the said particles with the said fibers to give a composite waterleaf with a wet tenacity of at least about 0.034 lb./in./oz./sq. yd.

35. The process of claim 34 wherein the said pulp contains natural fiber.

36. The process of claim 35 wherein the natural fiber is a cellulosic pulp.

37. The process of claim 34 wherein the said pulp contains a synthetic staple fiber.

38. A solid shaped structure comprising a plurality of supple, wholly synthetic polymeric particles having one dimension of minor magnitude relative to their largest dimension, a high surface area and a fiber coarseness test denier no greater than about 15, the said particles being engaged in contiguous continuity by mutual physical entwinement of abutting particles; the said particles being further characterized by an ability to form a waterleaf having a couched wet tenacity of at least about 0.034 lb./in./oz./sq. yd. when a pulp of the said particles is deposited from a liquid suspension upon a foraminous surface, which waterleaf, when dried at a temperature below about 50° C. has a dry tenacity at least equal to its couched wet tenacity.

39. The structure of claim 38 in the form of a sheet consisting essentially of the said polymeric particles.

40. The sheet of claim 39 wherein the said particles are formed from a synthetic polymer having an initial modulus less than 0.9 gram per denier.

41. The sheet product of claim 40 wherein the said synthetic polymer is a condensation elastomer.

42. The sheet product of claim 40 wherein the said synthetic polymer is an addition polymer.

43. The sheet product of claim 40 wherein the said synthetic polymer is a plasticized polyvinylchloride.

44. A shaped structure comprising bonded fibers wherein the said fibers are bonded by physical entwinement between the said fibers and a plurality of supple, wholly synthetic polymeric particles having one dimension of minor magnitude relative to their largest dimension, a large surface area and a fiber coarseness denier no greater than about 15, the said particles being further characterized by an ability to form a waterleaf having a couched wet tenacity of at least about 0.034 lb./in./oz./sq. yd. when a pulp of the said particles is deposited from a liquid suspension upon a foraminous surface, which waterleaf, when dried at a temperature below about 50° C., has a dry tenacity at least equal to its couched wet tenacity.

45. The shaped structure of claim 44 wherein the said synthetic polymer is a thermosetting resin.

46. The shaped structure of claim 44 wherein the said physically entwined particles have been fused.

47. The structure of claim 44 in the form of a sheet.

48. The sheet of claim 47 wherein the said entwined particles are fused.

49. The sheet of claim 48 wherein the said entwined particles are fused free of pressure.

50. The sheet of claim 48 wherein the said entwined particles are fused while subjected to impressed pressure.

51. The sheet of claim 47 in the form of a patterned structure comprising a plurality of areas of reduced sheet density wherein the localized basis weight is substantially less than 0.3 oz./sq. yd. and a plurality of areas of higher sheet density wherein the localized basis weight is substantially in excess of the localized basis weight of the areas of reduced sheet density, the said areas of reduced sheet density being surrounded and interconnected by the said areas of higher sheet density.

52. The sheet structure of claim 51 wherein the said physically entwined particles have been fused.

53. The sheet of claim 47 wherein the said entwined particles contain inert, insoluble particles.

54. The sheet of claim 53 wherein the inert, insoluble particles comprise oxygen-containing inorganic compounds.

55. The sheet of claim 53 wherein the inert, insoluble particles are silicaceous.

56. The sheet of claim 55 wherein the inert, insoluble particles are complex silicates.

57. The sheet of claim 56 wherein the complex silicate is asbestos.

58. The sheet of claim 47 having a basis weight of less than 1.0 oz./yd.$^2$.

59. The sheet of claim 47 wherein the said bonded fibers are formed from a wholly synthetic polymer.

60. The sheet of claim 59 wherein the said wholly synthetic polymer is a condensation polymer.

61. The sheet of claim 60 wherein the condensation polymer is a polyamide.

62. The sheet of claim 61 wherein the said entwined particles are formed from a copolyamide.

63. The sheet of claim 62 wherein the said entwined particles have been fused.

64. The sheet of claim 61 wherein the polyamide is polyhexamethylene adipamide.

65. The sheet of claim 61 wherein the said wholly synthetic polymer is polycaproamide.

66. The sheet of claim 65 wherein the said entwined particles are fused.

67. The sheet of claim 61 wherein the said entwined particles are formed from a synthetic polymer having an initial modulus of less than 0.9 gram per denier, the said bonded fibers being in the form of staple and comprising from about 5 to about 95% by weight of the said sheet.

68. The sheet of claim 60 wherein the condensation polymer is a polyester.

69. The sheet of claim 68 wherein the said entwined particles are formed from a copolyester.

70. The sheet of claim 69 wherein the said copolyester is a copolyester of ethylene terephthalate and ethylene isophthalate, the ratio of ethylene terephthalate units to ethylene isophthalate units being about 80-20.

71. The sheet of claim 70 wherein the said entwined particles have been fused.

72. The sheet of claim 68 wherein the polyester is polyethylene terephthalate.

73. The sheet of claim 47 wherein the said wholly synthetic polymer is an addition polymer.

74. The sheet of claim 73 wherein the said entwined particles are formed from an addition polymer which contains at least 80% vinyl chloride units.

75. The sheet of claim 74 wherein the said entwined particles have been fused.

76. The sheet of claim 73 wherein the said addition polymer is an acrylic polymer.

77. The sheet of claim 76 wherein the said entwined particles are formed from an addition copolymer containing from about 20% to about 80% acrylonitrile.

78. The sheet of claim 77 wherein the said entwined particles have been fused.

79. The sheet of claim 76 wherein the said entwined particles are formed from a synthetic polymer having an initial modulus of less than 0.9 gram per denier.

80. The sheet of claim 76 wherein the said acrylic polymer is a copolymer containing about 94% acrylonitrile and 6% methyl acrylate.

81. The sheet of claim 47 wherein the said bonded fibers are formed from man-made polymers.

82. The sheet of claim 81 wherein the said man-made polymer is glass.

83. The sheet of claim 81 wherein the said man-made polymer is derived from cellulose.

84. The sheet of claim 83 wherein the said man-made polymer is regenerated cellulose.

85. The sheet of claim 47 wherein the said bonded fibers are natural fibers.

86. The sheet of claim 85 wherein the said natural fibers are cellulosic.

87. The sheet of claim 86 wherein the said cellulosic fibers are wood pulp.

88. The sheet of claim 87 wherein the said entwined particles are formed from polyhexamethylene adipamide.

89. A sheet structure comprising a plurality of integral layered waterleaves wherein in each of two adjacent layers at least one contains a plurality of supple, wholly synthetic polymeric particles having one dimension of minor magnitude relative to their largest dimension, a large surface area and a fiber coarseness denier no greater than about 15, the said particles being further characterized by an ability to form a waterleaf having a couched wet tenacity of at least about 0.034 lb./in./oz./sq. yd. when a pulp of the said particles is deposited from a liquid suspension upon a foraminous surface, which waterleaf, when dried at a temperature below about 50° C., has a dry tenacity at least equal to its couched wet tenacity.

90. The sheet of claim 89 wherein a waterleaf containing the said polymeric particles is adjacent to a film produced from a wholly synthetic polymeric material.

91. The sheet of claim 89 wherein a waterleaf containing the said polymeric particles is adjacent to a waterleaf consisting essentially of a fibrous material.

92. The sheet of claim 91 wherein the said fibrous material is cellulosic paper.

References Cited in the file of this patent

UNITED STATES PATENTS

| | | |
|---|---|---|
| 1,881,419 | Munroe | Oct. 4, 1932 |
| 2,252,557 | Czerwin | Aug. 12, 1941 |
| 2,342,387 | Catlin | Feb. 22, 1944 |
| 2,374,575 | Brubaker | Apr. 24, 1945 |
| 2,623,033 | Snyder | Dec. 23, 1952 |
| 2,626,214 | Osborne | Jan. 20, 1953 |
| 2,670,267 | Bredeson | Feb. 23, 1954 |
| 2,708,617 | Magat et al. | May 17, 1955 |
| 2,798,283 | Magat et al. | July 9, 1957 |
| 2,810,646 | Wooding | Oct. 22, 1957 |

UNITED STATES PATENT OFFICE
CERTIFICATION OF CORRECTION

Patent No. 2,999,788                          September 12, 1961

Paul Winthrop Morgan

It is hereby certified that error appears in the above numbered patent requiring correction and that the said Letters Patent should read as corrected below.

Column 1, lines 38 and 49, for "0.34 lb./in.", each occurrence, read -- 0.034 lbs./in. --; column 2, line 38, for "0.85 lb./in." read 0.085 lbs./in. --; column 5, line 61, for "about" read -- above --; column 7, line 69, for "Elmerdorf" read -- Elmendorf --; column 9, line 57, for "materials" read -- material --; column 12, line 3, for "Th" read -- The --; columns 15 and 16, Table I, Ex. No. 42, column 7 thereof, for "10,770" read -- 10,700 --; same Table I, Ex. No. 44, column 12 thereof, for "00.3" read -- 0.03 --; same Table I, Ex. No. 89, column 8 thereof, for "7,5" read -- 7.5 --; column 22, line 35, for "moduls" read -- modulus --; lines 40 and 43, for "elastometer", each occurrence, read -- elastomer --; line 57, for "dried a 120° C." read -- dried at 120° C. --; line 62, for "0.01 g.p.d. an" read -- 0.01 g.p.d., an --; column 23, line 48, for "non-ionic agent" read -- non-ionic wetting agent --; column 35, line 58, for "SHEETS FORM" read -- SHEETS FROM --; column 36, line 26, for "0.29 lb. in./" read -- 0.29 lb./in. --; column 37, line 8, for "0.08" read -- 0.8 --; line 25, for "28%" read -- 78% --; column 50, line 27, for "U.S. 2,438,405" read -- U.S. 2,483,405 --; column 51, line 14, for "preparation if" read -- preparation of --; column 52, line 45, for "more supply that" read -- more supple than --; line 52, for "at least 15%" read -- at least about 15% --; column 55, line 46, for "though a" read -- through a --; line 52, for "modifier" read -- modified --; column 56, line 20, for "Foudrinier", in italics, read -- Fourdrinier --, in italics; column 58, line 20, for "reinformed" read -- reinforced --; column 61, line 55, for the claim reference numeral "47" read -- 59 --.

Signed and sealed this 3rd day of April 1962.

(SEAL)

Attest:

ERNEST W. SWIDER                          DAVID L. LADD
Attesting Officer                             Commissioner of Patents